(12) United States Patent
Lu et al.

(10) Patent No.: US 12,724,584 B2
(45) Date of Patent: Sep. 1, 2026

(54) SYNCHRONOUS PLAYBACK OF MEDIA CONTENT BY OFF-NET PORTABLE PLAYBACK DEVICES

(71) Applicant: Sonos, Inc., Santa Barbara, CA (US)

(72) Inventors: Cheng Lu, Boston, MA (US); Hrishikesh Gossain, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 100 days.

(21) Appl. No.: 18/695,946

(22) PCT Filed: Sep. 27, 2022

(86) PCT No.: PCT/US2022/044917
§ 371 (c)(1),
(2) Date: Mar. 27, 2024

(87) PCT Pub. No.: WO2023/055742
PCT Pub. Date: Apr. 6, 2023

(65) Prior Publication Data

US 2024/0394012 A1 Nov. 28, 2024

Related U.S. Application Data

(60) Provisional application No. 63/278,883, filed on Nov. 12, 2021, provisional application No. 63/249,192, filed on Sep. 28, 2021.

(51) Int. Cl.
*H04B 3/00* (2006.01)
*G06F 3/16* (2006.01)
(Continued)

(52) U.S. Cl.
CPC ............... *G06F 3/165* (2013.01); *H04R 3/12* (2013.01); *H04R 27/00* (2013.01);
(Continued)

(58) Field of Classification Search
CPC ........... G06F 3/165; H04R 3/12; H04R 27/00; H04R 2227/003; H04R 2227/005; H04R 2420/07
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
WO 200153994 7/2001
(Continued)

OTHER PUBLICATIONS

AudioTron Quick Start Guide, Version 1.0, Mar. 2001, 24 pages.
(Continued)

*Primary Examiner* — Ammar T Hamid
(74) *Attorney, Agent, or Firm* — Akerman LLP

(57) ABSTRACT

Disclosed embodiments include a portable playback device performing functions comprising: (i) after receiving an indication to operate in a playback group while the first portable playback device is connected to a network device via a Personal Area Network (PAN) and not connected to a first Wireless Local Area Network (WLAN), establishing a second WLAN for the playback group; and (ii) after a second portable playback device has joined the second WLAN operated by the first portable playback device, streaming audio content received via the PAN connection from the first network device to the second portable playback device via the second WLAN operated by the first portable playback device, and playing the audio content in a groupwise manner with the second portable playback device. Other embodiments include portable playback
(Continued)

devices performing similar functions via a peer-to-peer wireless link rather than the second WLAN.

20 Claims, 22 Drawing Sheets

(51) Int. Cl.
*H04R 3/12* (2006.01)
*H04R 27/00* (2006.01)
*H04W 12/06* (2021.01)

(52) U.S. Cl.
CPC ..... *H04W 12/068* (2021.01); *H04R 2227/003* (2013.01); *H04R 2227/005* (2013.01); *H04R 2420/07* (2013.01)

(58) Field of Classification Search
USPC ....................................................... 381/80, 77
See application file for complete search history.

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 10,142,122 B1 | 11/2018 | Hill et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2007/0142944 A1 | 6/2007 | Goldberg et al. | |
| 2012/0294199 A1 | 11/2012 | Anchan | |
| 2015/0095774 A1 | 4/2015 | Bates et al. | |
| 2016/0357503 A1 | 12/2016 | Triplett et al. | |
| 2019/0191246 A1* | 6/2019 | Born | H04R 5/033 |
| 2019/0207825 A1* | 7/2019 | Millington | H04L 41/22 |
| 2021/0058266 A1* | 2/2021 | Shoesmith | H04L 12/282 |

FOREIGN PATENT DOCUMENTS

| | | | | |
|---|---|---|---|---|
| WO | 2003093950 A2 | 11/2003 | | |
| WO | WO-2021042014 A1 * | 3/2021 | ......... | H04L 41/0893 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Search Report issued in PCT/US2022/044917 dated Jan. 4, 2023 (6 pages).
Written Opinion of the International Searching Authority issued in PCT/US2022/044917 dated Jan. 4, 2023 (16 pages).

* cited by examiner

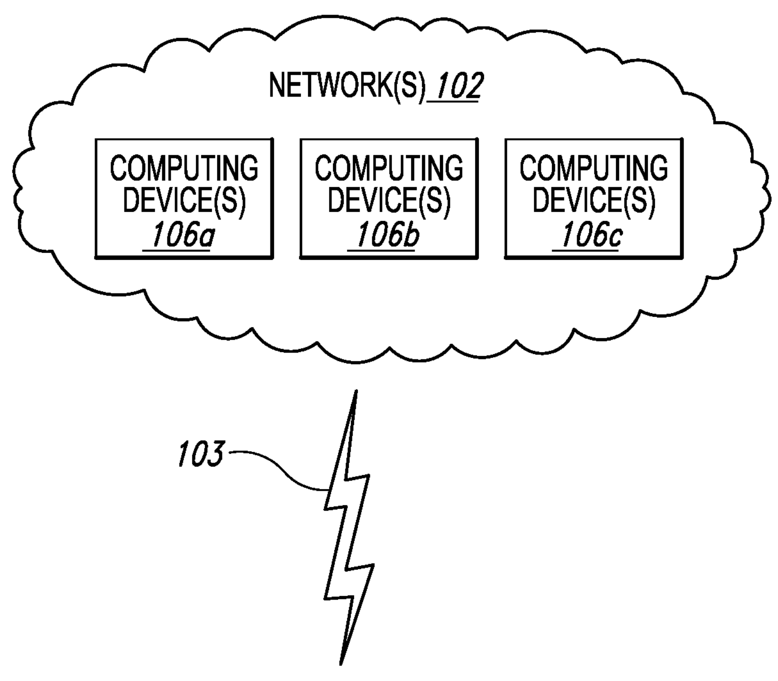
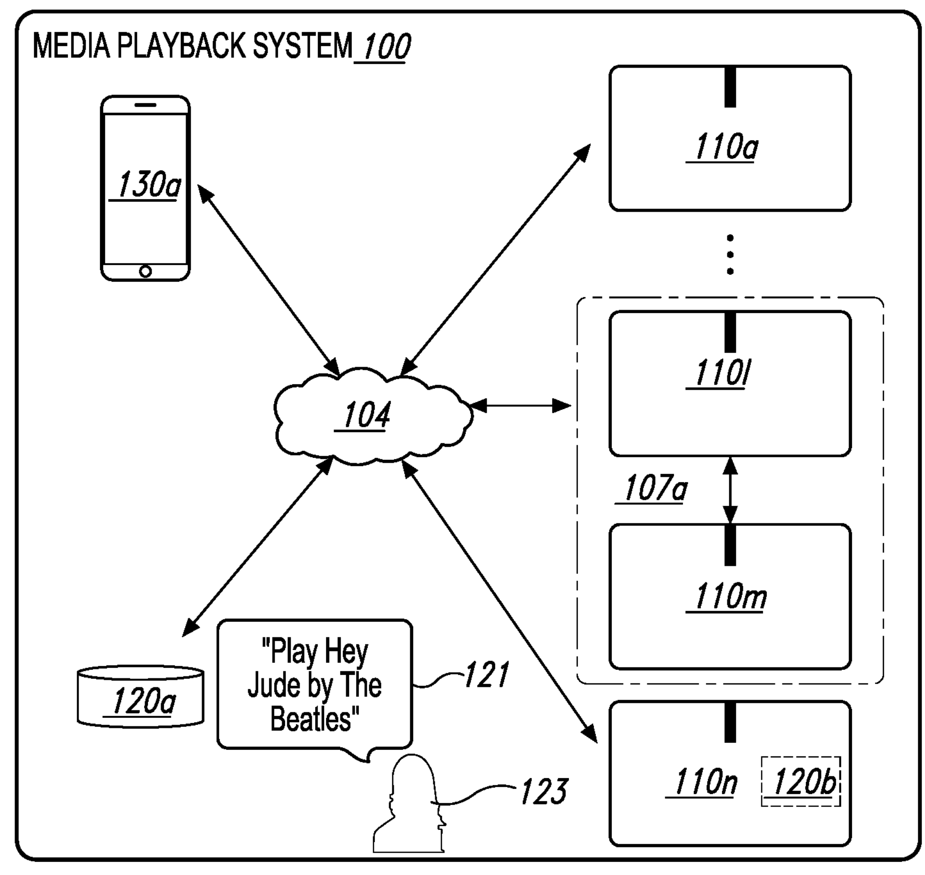
Fig. 1B

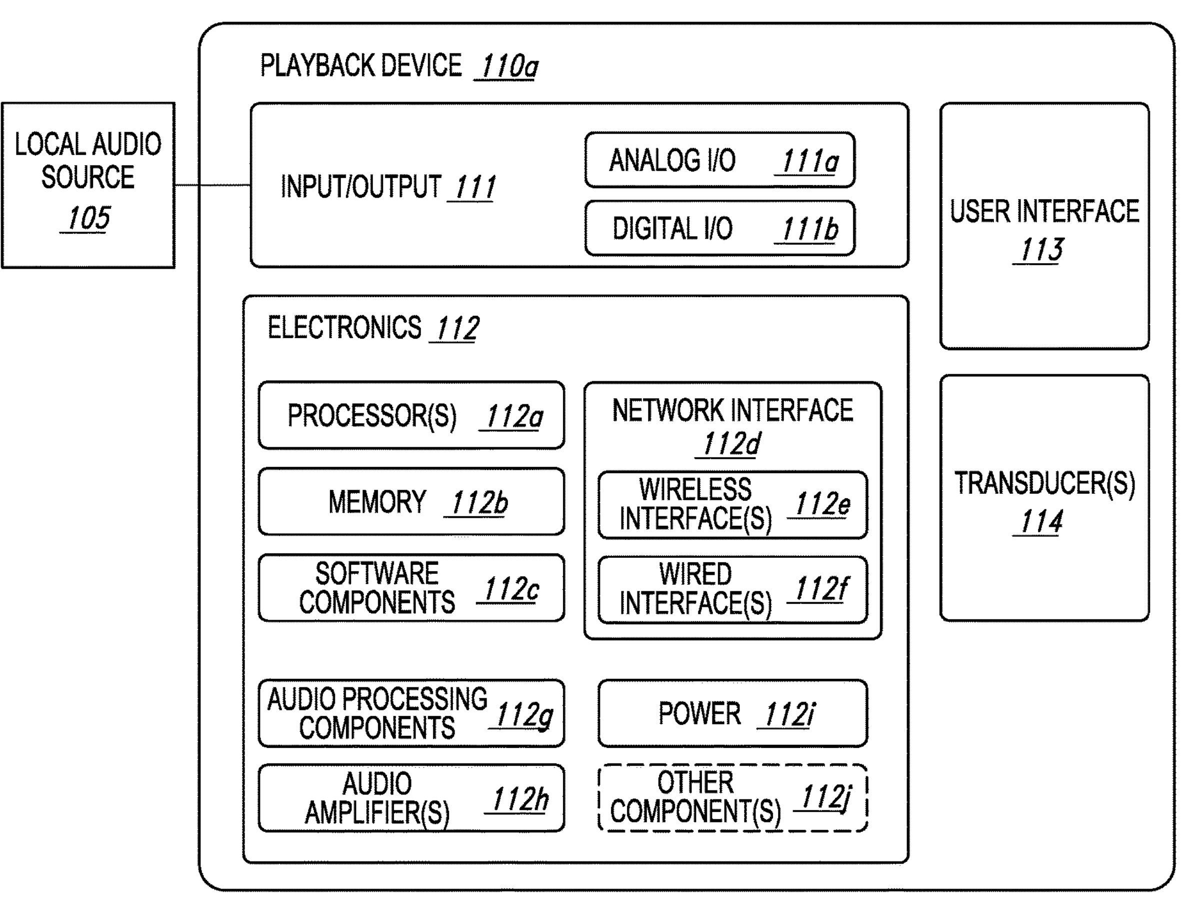
Fig. 1C
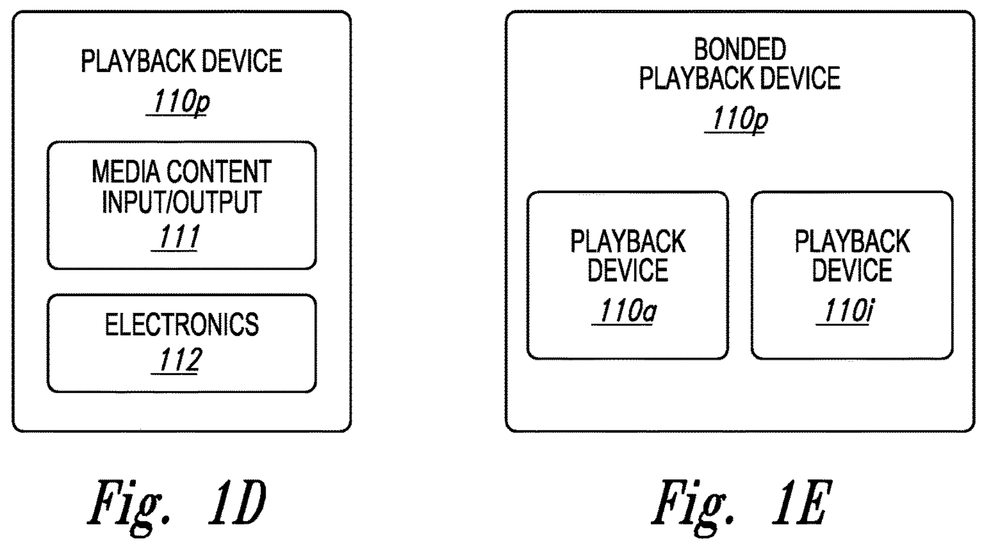
Fig. 1D
Fig. 1E

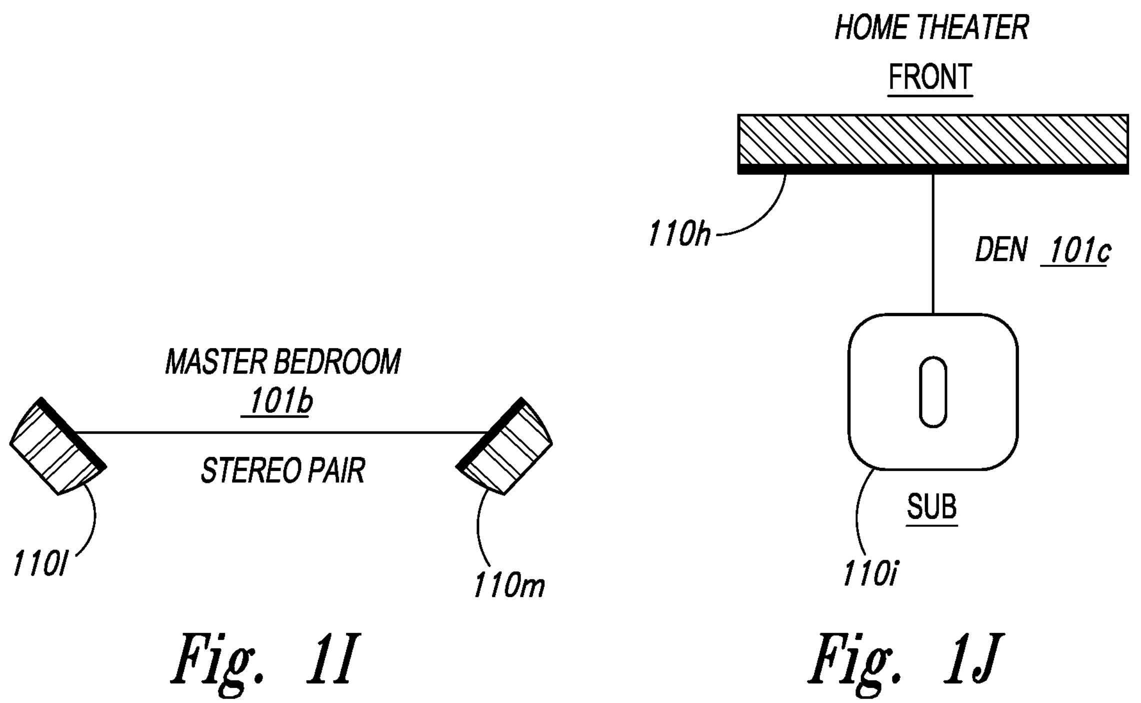
Fig. 1I
Fig. 1J
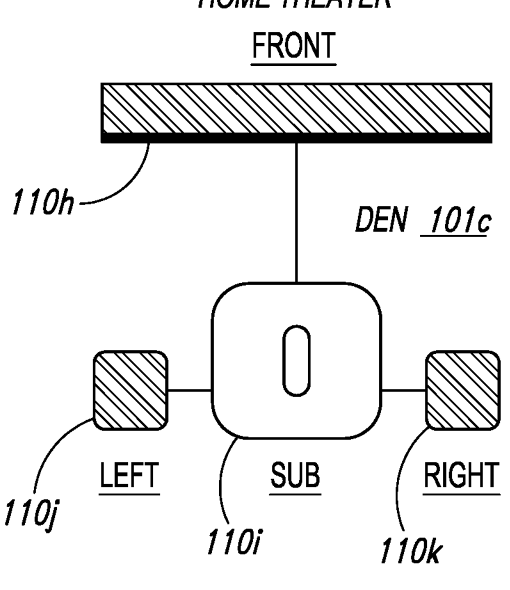
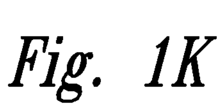
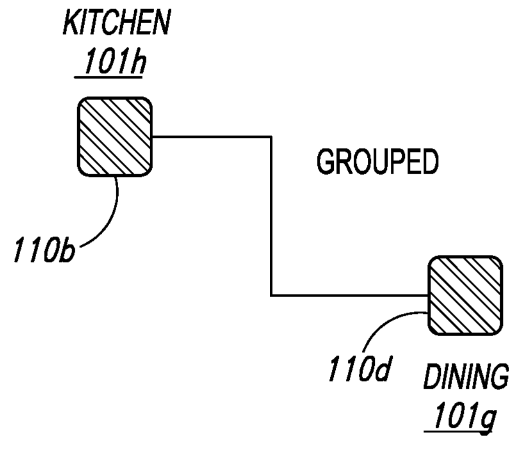
Fig. 1L 216b
216
216j
216a
212
216h
216g
216g
216e
216i
210

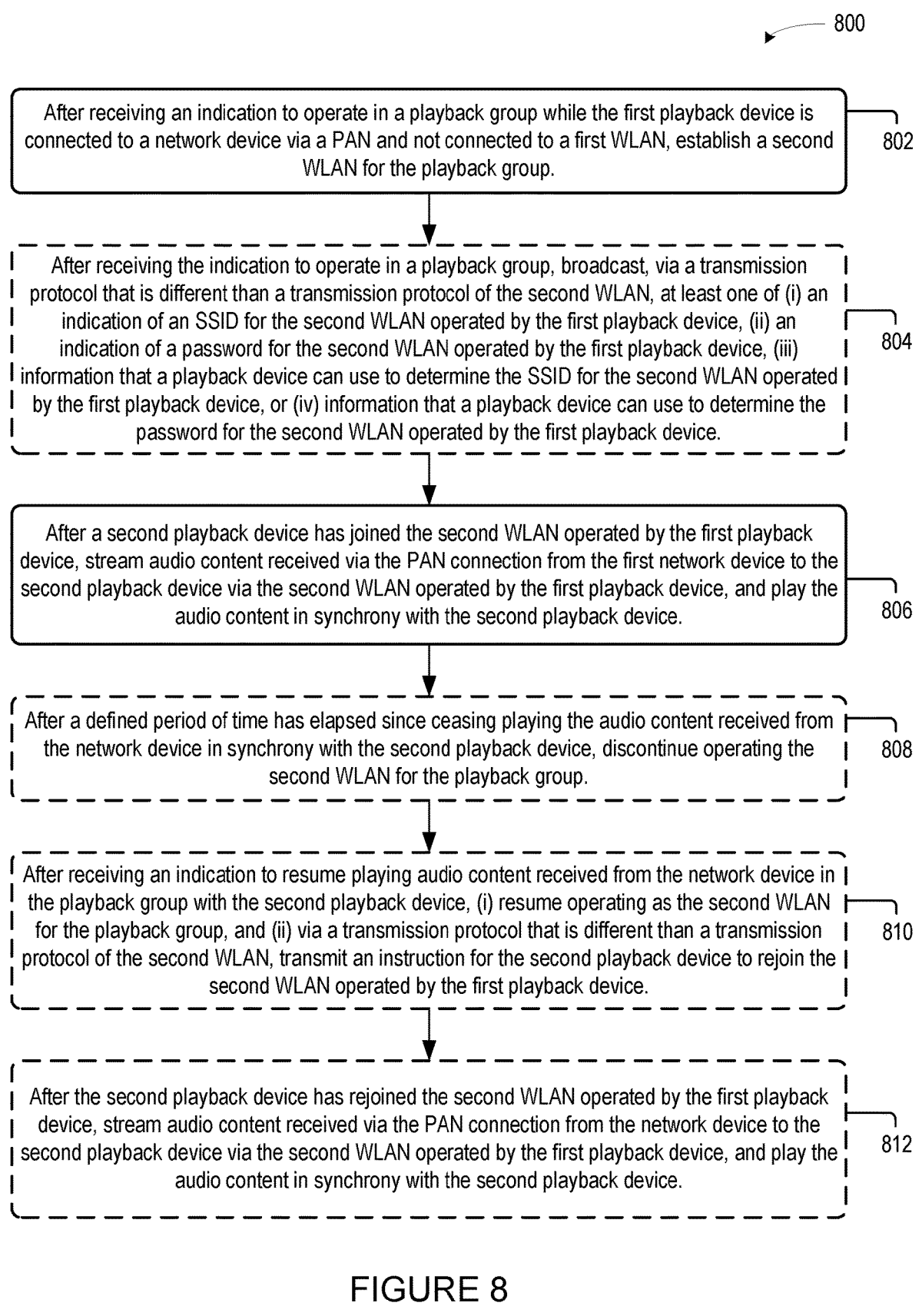

800

After receiving an indication to operate in a playback group while the first playback device is connected to a network device via a PAN and not connected to a first WLAN, establish a second WLAN for the playback group. — 802

After receiving the indication to operate in a playback group, broadcast, via a transmission protocol that is different than a transmission protocol of the second WLAN, at least one of (i) an indication of an SSID for the second WLAN operated by the first playback device, (ii) an indication of a password for the second WLAN operated by the first playback device, (iii) information that a playback device can use to determine the SSID for the second WLAN operated by the first playback device, or (iv) information that a playback device can use to determine the password for the second WLAN operated by the first playback device. — 804

After a second playback device has joined the second WLAN operated by the first playback device, stream audio content received via the PAN connection from the first network device to the second playback device via the second WLAN operated by the first playback device, and play the audio content in synchrony with the second playback device. — 806

After a defined period of time has elapsed since ceasing playing the audio content received from the network device in synchrony with the second playback device, discontinue operating the second WLAN for the playback group. — 808

After receiving an indication to resume playing audio content received from the network device in the playback group with the second playback device, (i) resume operating as the second WLAN for the playback group, and (ii) via a transmission protocol that is different than a transmission protocol of the second WLAN, transmit an instruction for the second playback device to rejoin the second WLAN operated by the first playback device. — 810

After the second playback device has rejoined the second WLAN operated by the first playback device, stream audio content received via the PAN connection from the network device to the second playback device via the second WLAN operated by the first playback device, and play the audio content in synchrony with the second playback device. — 812

FIGURE 8

SYNCHRONOUS PLAYBACK OF MEDIA CONTENT BY OFF-NET PORTABLE PLAYBACK DEVICES

CROSS-REFERENCE TO RELATED APPLICATIONS

This application is a 35 U.S.C. § 371 National Stage Application that claims priority to Patent Cooperation Treaty App. PCT/US2022/044917, titled "Synchronous Playback Of Media Content By Off-Net Portable Playback Devices", filed on Sep. 27, 2022, which is currently pending; PCT/US2022/044917 claims priority under 35 U.S.C. § 119(e) to (i) U.S. Prov. App. 63/278,883, titled "Synchronous Playback of Media Content by Off-Net Portable Playback Devices", filed Nov. 12, 2021, and (ii) U.S. Prov. App. 63/249,192, titled "Synchronous Playback of Media Content by Off-Net Portable Playback Devices", filed Sep. 28, 2021. The entire contents of Apps. PCT/US2022/044917; 63/278,883; and 63/249,192 are incorporated herein by reference.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1B shows a schematic diagram of the media playback system of FIG. 1A and one or more networks.

FIG. 1C shows a block diagram of a playback device.

FIG. 1D shows a block diagram of a playback device.

FIG. 1E shows a block diagram of a network microphone device.

FIGS. 1-I through 1L show schematic diagrams of corresponding media playback system zones.

FIG. 8 shows an example method according to some embodiments.

Figure 1A:
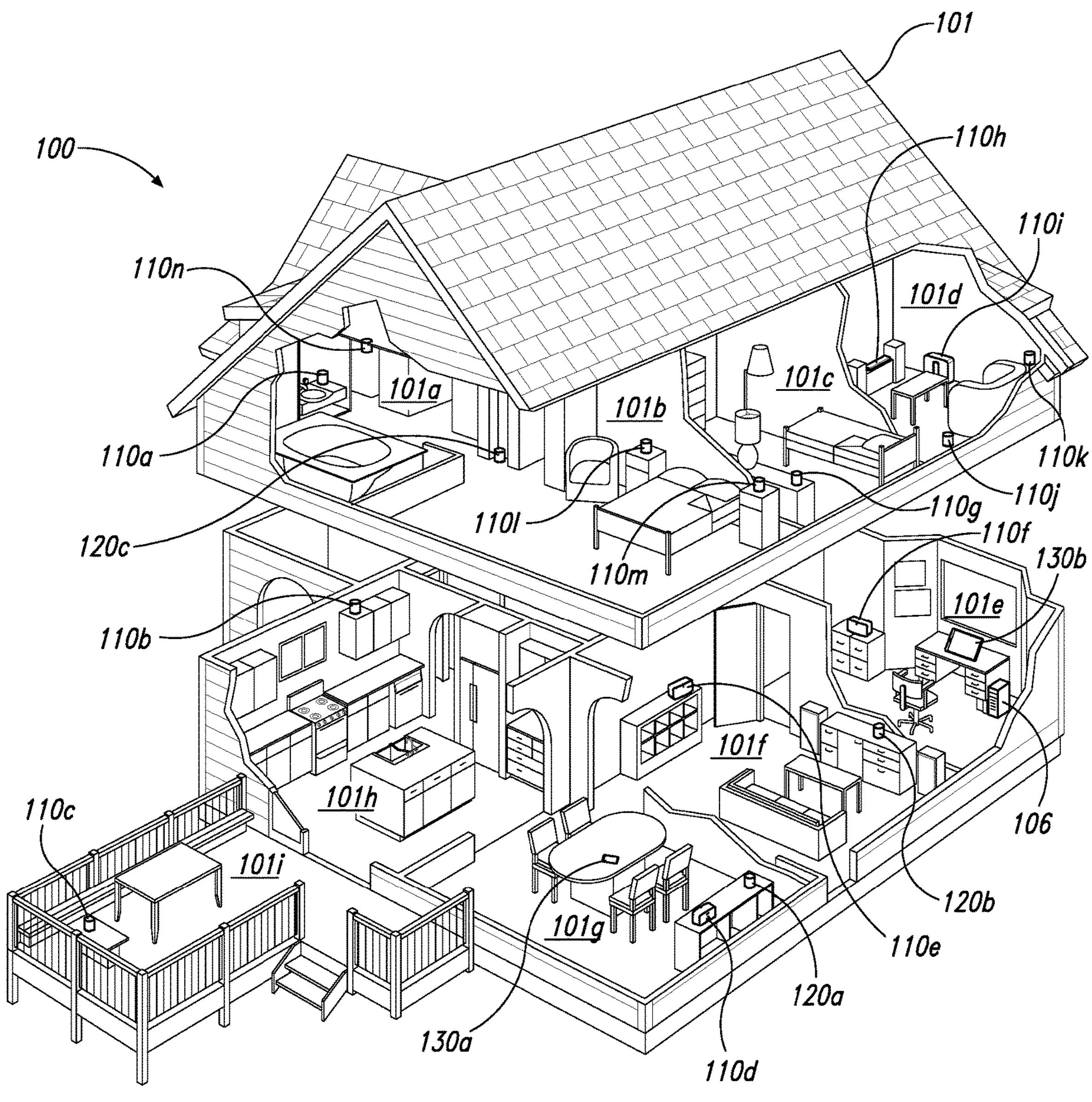
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

SONOS Inc. has been a pioneer in the field of media synchronization. For instance, SONOS Inc. invented multi-room synchronization that enables a user to easily configure multiple wireless playback devices to playback an audio stream in synchrony. Aspects of playing media in synchrony are disclosed and described in U.S. Pat. No. 8,234,395 titled "System and Method for Synchronizing Operations Among a Plurality of Independently Clocked Digital Data Processing Devices," issued on Jul. 31, 2012, which is incorporated herein by reference in its entirety. Accordingly, users can place multiple playback devices within their home and enjoy an audio stream throughout their home (or any portion thereof) without having to hassle with manipulating physical cables between players.

SONOS Inc. has appreciated that conventional portable playback devices are generally only capable of standalone playback when operating away from a Wireless Local Area Network (WLAN) via which the portable playback devices normally operate, referred to herein as being taken "off-net." For instance, a conventional portable playback device taken outside a home of a user to a remote beach is generally only capable of standalone playback of an audio stream received over a BLUETOOTH Classic communication link. While such a limited experience may be acceptable in certain situations (e.g., personal listening outside the home on a beach), that limited experience is unacceptable for other situations (e.g., an outdoor party, outdoor movie night with a projector on a screen, etc.).

Accordingly, aspects of the present disclosure describe techniques to extend audio synchronization technologies that SONOS Inc. pioneered to portable playback devices operating in any of a variety of operating conditions (e.g., at a beach, at a park, etc.). For instance, aspects of the disclosure relate to techniques that enable multiple portable playback devices to create playback groups, join playback groups, and/or play back audio content in a groupwise manner when those portable playback devices are taken away from the WLAN via which they normally operate (e.g., away from their "home WLAN"). As a result, users are empowered to enhance their listening experience while in off-net locations by grouping multiple portable playback devices together.

In some embodiments, when two or more portable playback devices are away from the WLAN via which they normally operate, one of the portable playback devices: (i) establishes and operates a temporary WLAN via which the two or more portable playback devices can transmit and receive audio information and control signaling that the portable playback devices can use to form a playback group and play audio content in a groupwise manner, and (ii) begins operating as a group coordinator for the playback group comprising the two or more portable playback devices. Each of the other portable playback devices of the two or more portable playback devices: (i) searches for and connects to the temporary WLAN established by the portable playback device operating as the group coordinator, and (ii) begins operating as a group member in the synchrony group comprising the two or more portable playback devices.

In some embodiments, the temporary WLAN established to communicate audio and/or control signaling between the first and second portable playback devices may be replaced with another communication mechanism. For instance, the first and second portable playback devices may establish a peer-to-peer wireless link, such as a WiFi Direct wireless link (sometimes referred to as a WiFi peer-to-peer (P2P) wireless link). In such instances, the first portable playback device may, in facilitating synchronous playback of audio: (i) establish a connection between the first portable playback device and the second portable playback device via a peer-to-peer wireless link between the first portable playback device and the second portable playback device, and (ii) begin operating as a group coordinator for a playback group comprising at least the first and second portable playback devices. Further, the second portable playback device may: (i) exchange data (e.g., authentication data) with the first portable playback device required to establish the connection to the first portable playback device via the peer-to-peer wireless link, and (ii) begin operating as a group member in the synchrony group comprising at least the first and second portable playback devices.

Unlike traditional arrangements where configuring a device to connect to a temporary WLAN and/or configuring a peer-to-peer wireless link between two devices requires a user to enter network name (e.g., SSID) and authentication credentials (e.g., a password), embodiments disclosed herein enable devices to join a network by using a network name (e.g., an SSID) and authentication credentials (e.g., a password) that is based on configuration information known to the playback devices so that a user is not required to manually enter a network name or password to configure a temporary WLAN and/or peer-to-peer wireless link.

For example, in some embodiments where the playback devices are members of the same media playback system, and thus, the playback devices have the system identifier (e.g., a Household Identifier (HHID) or similar), then one or more parameters for a temporary WLAN or peer-to-peer wireless link (e.g., name(s), credential(s), identifier(s), etc.) may be based on the system identifier as described in detail herein. Alternatively, in embodiments where the playback devices may not be members of the same media playback system such that they do not have the same system identifier, one of the playback devices can share any of the one or more parameters that another playback device can use to join the temporary WLAN or establish the peer-to-peer wireless link. Such parameter(s) may be shared, for example, via a short-range wireless communication (e.g., Near-Field Communication (NFC) communications, BLUETOOTH LOW ENERGY (BLE) broadcasts, etc.) that can be received by other playback devices within proximity of the playback device. And playback devices that receive the wireless communication can use the data contained in the broadcast to join the temporary WLAN or peer-to-peer wireless link.

In operation, in both the temporary WLAN and peer-to-peer wireless link embodiments summarized above, once the playback group has been formed, the group coordinator performs functions for initiating and controlling groupwise playback of audio content by the group coordinator and the group members. In some embodiments, the group coordinator functions include: (i) obtaining audio information from an audio source via a Personal Area Network (PAN) link (e.g., Bluetooth or other PAN network link) to a smartphone, tablet, smart watch, or other (typically mobile) computing device; (ii) generating playback timing for the audio information, where the portable playback devices in the playback group (including the group coordinator) use the audio information and the playback timing to play audio content based on the audio information in a groupwise fashion; (iii) transmitting the audio information and the playback timing information to all the portable playback devices in the playback group; and (iv) playing the audio content based on the audio information in synchrony with the other portable playback devices in the playback group.

In some embodiments, the group coordinator functions additionally include distributing clock timing to all the portable playback devices in the playback group, where the portable playback devices in the playback group (including the group coordinator) use the clock timing, the audio information, and the playback timing to play audio content based on the audio information in a groupwise fashion. In some embodiments, however, clock timing or some other common clock reference may be generated and provided by a device other than the group coordinator. For example, in some embodiments, the clock timing may be provided by another group member or perhaps another device separate from the playback group, e.g., a smartphone, tablet computer, smartwatch, or other computing device.

Accordingly, some embodiments include a first portable playback device operating as a group coordinator, where the first portable playback device is configured to perform functions comprising: (i) after receiving an indication to operate in a playback group while the first portable playback device is connected to a network device via a Personal Area Network (PAN) and not connected to a first Wireless Local Area Network (WLAN), establishing a second WLAN for the playback group and operating as a group coordinator for the playback group; and (ii) after a second portable playback device has joined the second WLAN operated by the first portable playback device and joined the playback group as a group member, streaming audio content received via the PAN connection from the first portable playback device (i.e., the group coordinator) to the second portable playback device (i.e., the group member) via the second WLAN operated by the first portable playback device (i.e., the group coordinator), and playing the audio content in a groupwise manner with the second portable playback device (i.e., the group member). In embodiments where the first portable playback device and second portable playback device are members of the same media playback system, the first portable playback device is configured to use the system identifier of the media playback system to generate a network name and password for the second WLAN and the second portable playback device is configured use the system identifier of the media playback system to locate/detect the second WLAN and generate a password for joining the second WLAN.

Further embodiments additionally or alternatively include a first portable playback device operating as a group coordinator, where the first portable playback device is configured to perform functions comprising: (i) after receiving an indication to operate in a synchrony group with at least a second playback device while the first playback device is connected to a network device via a Personal Area Network (PAN) and not connected to a Wireless Local Area Network (WLAN), establishing a connection with the second playback device via a peer-to-peer wireless link between the first playback device and the second playback device, and (ii) after establishing the connection with the second playback device via the peer-to-peer wireless link between the first playback device and the second playback device, streaming audio content received via the PAN connection from the first playback device to the second playback device over the connection via the peer-to-peer wireless link, and playing the audio content in synchrony with the second playback device. In embodiments where the first portable playback device and second portable playback device are members of the same media playback system, the first portable playback device is configured to use the system identifier of the media playback system to generate a network name and password for the peer-to-peer wireless link and the second portable playback device is configured use the system identifier of the media playback system to locate/detect the peer-to-peer wireless link and generate a password for establishing a connection over the peer-to-peer wireless link. In some embodiments, the peer-to-peer wireless link comprises a point-to-point link between two playback devices. In some embodiments, the peer-to-peer link comprises a point-to-multipoint link between one playback device and two or more other playback devices.

Further, some embodiments include a first portable playback device operating as a group member, where the first portable playback device is configured to perform functions comprising: (i) after receiving an indication to operate in a playback group while the first portable playback device is not receiving audio content via a Personal Area Network (PAN) communications session with a network device and not connected to a first Wireless Local Area Network (WLAN), searching for a second WLAN having a known Service Set Identifier (SSID) operated by a second portable playback device (i.e., a group coordinator) to join; (ii) after identifying the second WLAN having the known SSID operated by the second portable playback device (i.e., the group coordinator) to join, using a password known by the first portable playback device to join the second WLAN operated by the second portable playback device; and (iii) after joining the second WLAN operated by the second portable playback device, joining the playback group as a group member, processing a stream of audio content received from the second portable playback device (i.e., the group coordinator), and playing the audio content streamed from the second portable playback device in synchrony with playback of the audio content by the second portable playback device.

Still further embodiments additionally or alternatively include a first portable playback device operating as a group coordinator, where the first portable playback device is configured to perform functions comprising: (i) after receiving an indication to operate in a synchrony group with at least a second portable playback device while the first portable playback device is not receiving audio content via a Personal Area Network (PAN) communications session with a network device and not connected to a Wireless Local Area Network (WLAN), searching for a signal indicating availability of connecting to the second portable playback device via a peer-to-peer wireless link between the first portable playback device and the second portable playback device, where the peer-to-peer wireless link has a Service Set Identifier (SSID) known by the first portable playback device; (ii) after identifying the peer-to-peer wireless link having the known SSID, using a password known by the first portable playback device to establish a connection with the second portable playback device via the peer-to-peer wireless link; and (iii) after establishing the connection with the second portable playback device via the peer-to-peer wireless link, processing a stream of audio content received from the second portable playback device over the connection via the peer-to-peer wireless link, and playing the audio content streamed from the second portable playback device in synchrony with playback of the audio content by the second portable playback device.

It should be appreciated that the techniques described herein to establish a communication mechanism between multiple players over which audio and/or control signal information may be communicated to facilitate synchronous playback may be advantageously employed in situations separate and apart from the context of portable playback devices operating in an Off-net situation (e.g., at a beach, at a park, etc.). In some embodiments, such techniques may be advantageously employed by multiple stationary playback devices to reduce traffic over an access point (AP) of a user's WLAN. For example, two playback devices may be part of a bonded group, such as a stereo pair, and both have a connection to the user's WLAN. In this example, the two playback devices may establish a peer-to-peer communication link (separate from the user's WLAN) between them while maintaining the connection to the user's WLAN. The peer-to-peer communication link may be employed to communicate data between the two players in the bonded group (e.g., audio data, control signaling, etc.) while the WLAN may be employed to communicate with devices outside the bonded group (e.g., cloud servers associated with streaming services, control devices, etc.). As a result, a significant volume of network traffic that would otherwise pass over the AP of the user's WLAN during synchronous playback is shifted to the separate peer-to-peer communication link. Such a reduction in network traffic advantageously may improve reliability of the media playback system (e.g., by reducing instances of packets being dropped by the AP due to network congestion) and/or enable the media playback system to support larger and/or more complex synchrony groups (e.g., because the amount of network traffic passing over the AP to support a given synchrony group may be reduced). Accordingly, the techniques described herein are not limited in application to portables in Off-net operating scenarios.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the patio 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 11-1M.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

FIG. 1B is a schematic diagram of the media playback system 100 and a cloud network 102. For ease of illustration, certain devices of the media playback system 100 and the cloud network 102 are omitted from FIG. 1B. One or more communications links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communications links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through IM.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communications links configured to carry analog signals) and/or a digital I/O 111*b* (e.g., one or more wires, cables, or other suitable communications links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communications links comprising, for example, a radio frequency (RF), infrared, WiFi, Bluetooth, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communications link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio information from an audio source (e.g., one or more of the computing devices 106*a-c* (FIG. 1B)), and/or another one of the playback devices 110. In some embodiments, the operations further include causing the playback device 110*a* to send audio information to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio processing components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY: 1," "PLAY: 3," "PLAY: 5," "PLAYBAR," "PLAYBASE," "CONNECT: AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

Figures 1F, 1G, 1H:
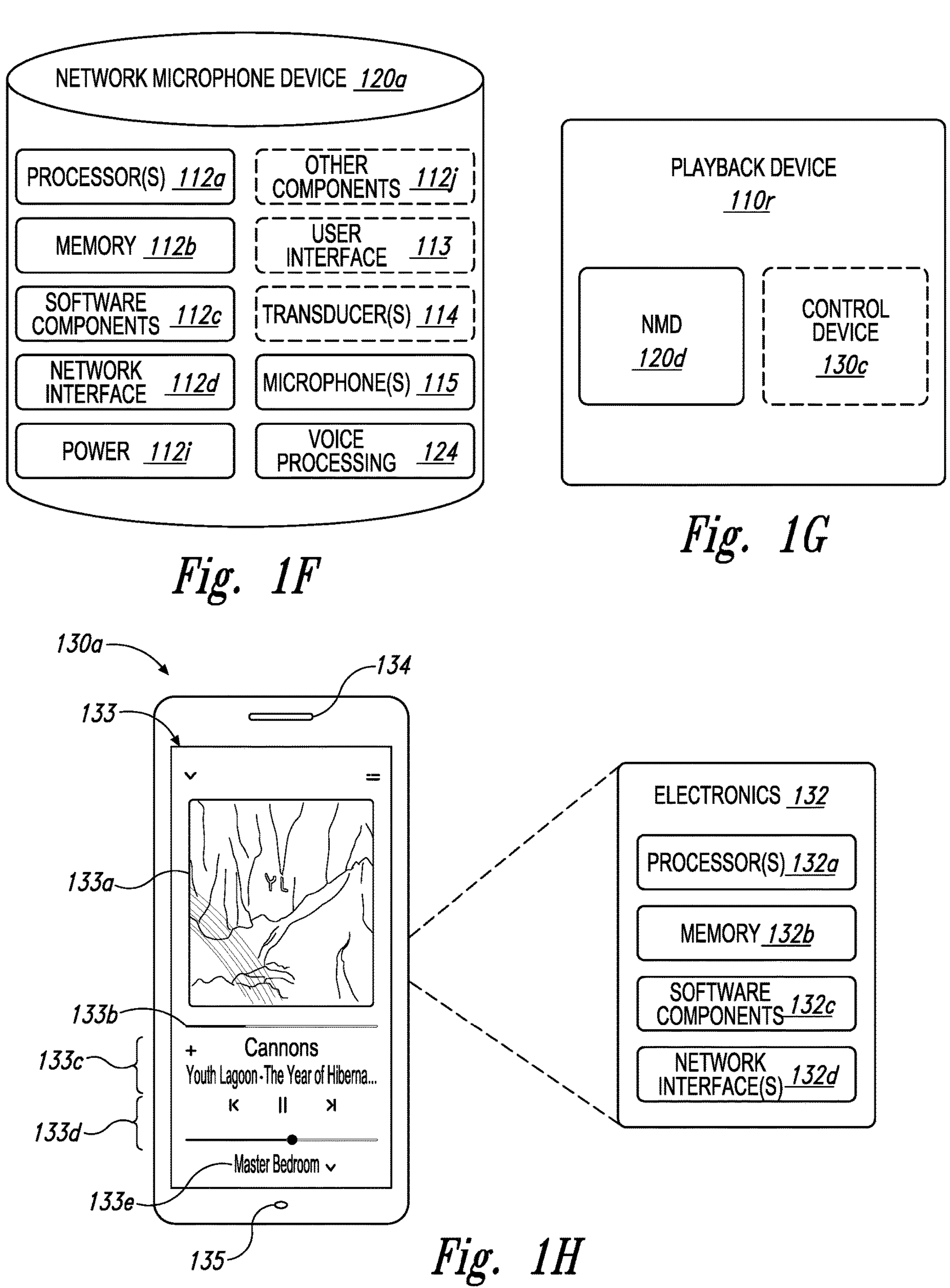
FIG. 1F shows a block diagram of a network microphone device.
FIG. 1G shows a block diagram of a playback device.
FIG. 1H shows a partially schematic diagram of a control device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio processing components 112*g* (FIG. 1C), the transducers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 304 to one or more of playback devices. The network interface 132*d* can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate 'control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™. an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1M:
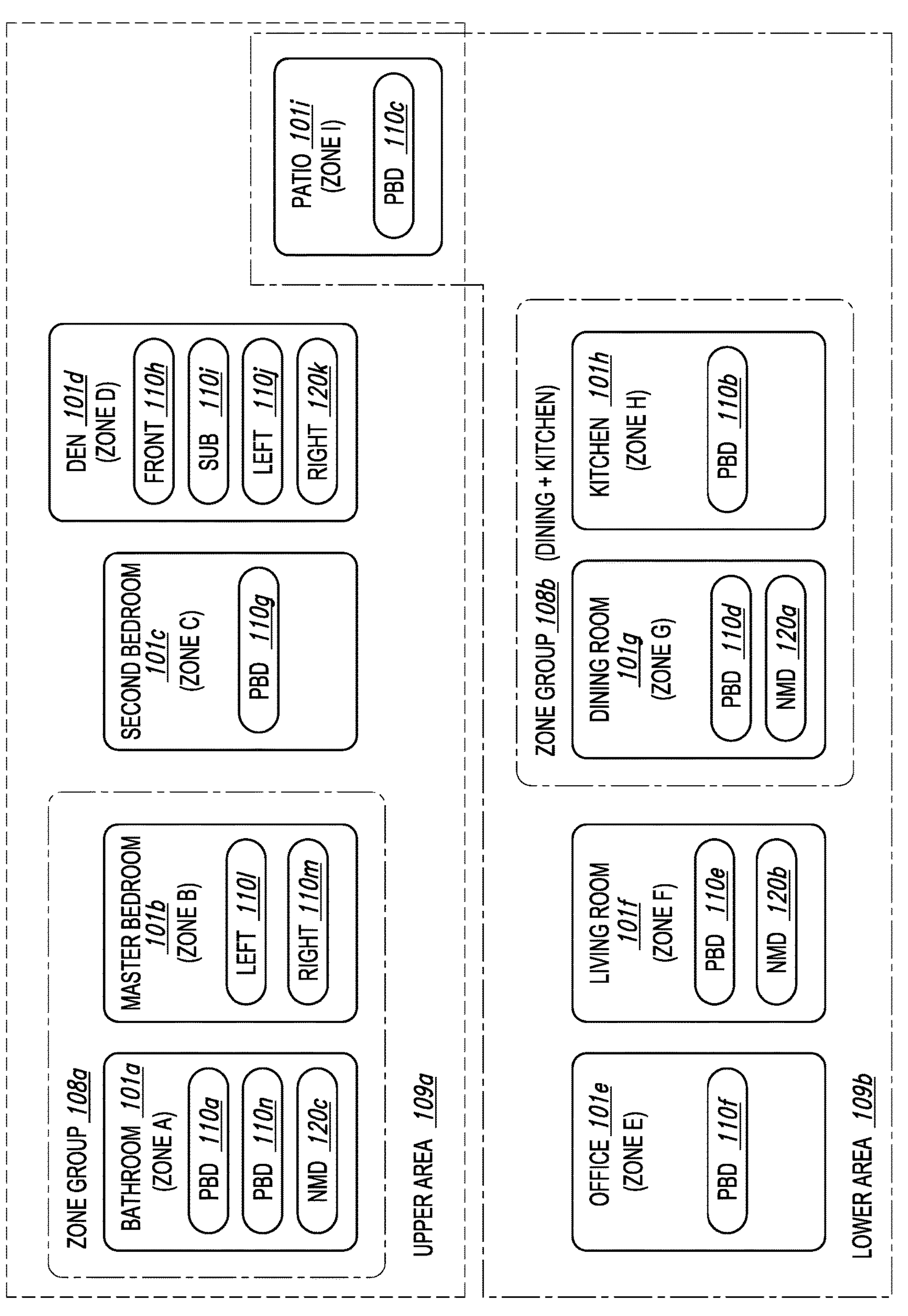
FIG. 1M shows a schematic diagram of media playback system areas.

FIGS. 1-1 through IM show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*l* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be merged to form a merged group or a zone group 108*b*. The merged playback devices 110*g* and 110*h* may not be specifically assigned different playback responsibilities. That is, the merged playback devices 110*h* and 110*i* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 1M. In some embodiments, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
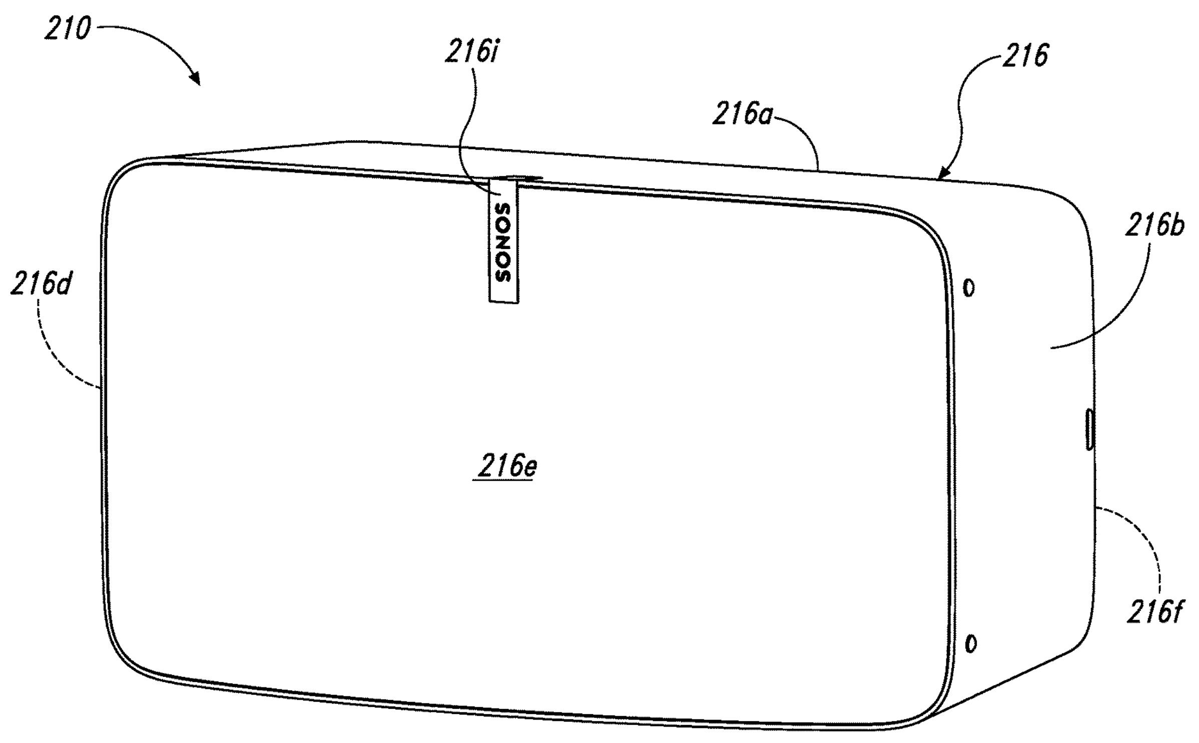
FIG. 2A shows a front isometric view of a playback device configured in accordance with aspects of the disclosed technology.
Figure 2B:
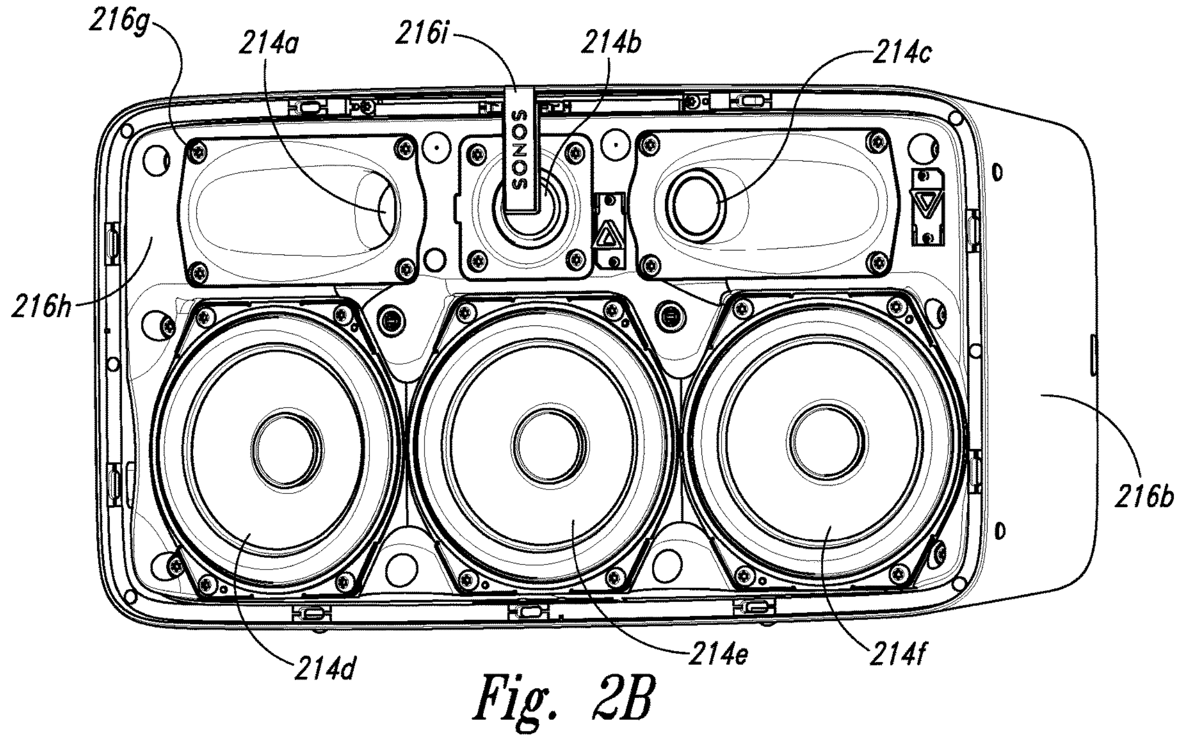
FIG. 2B shows a front isometric view of the playback device of FIG. 3A without a grille.
Figure 2C:
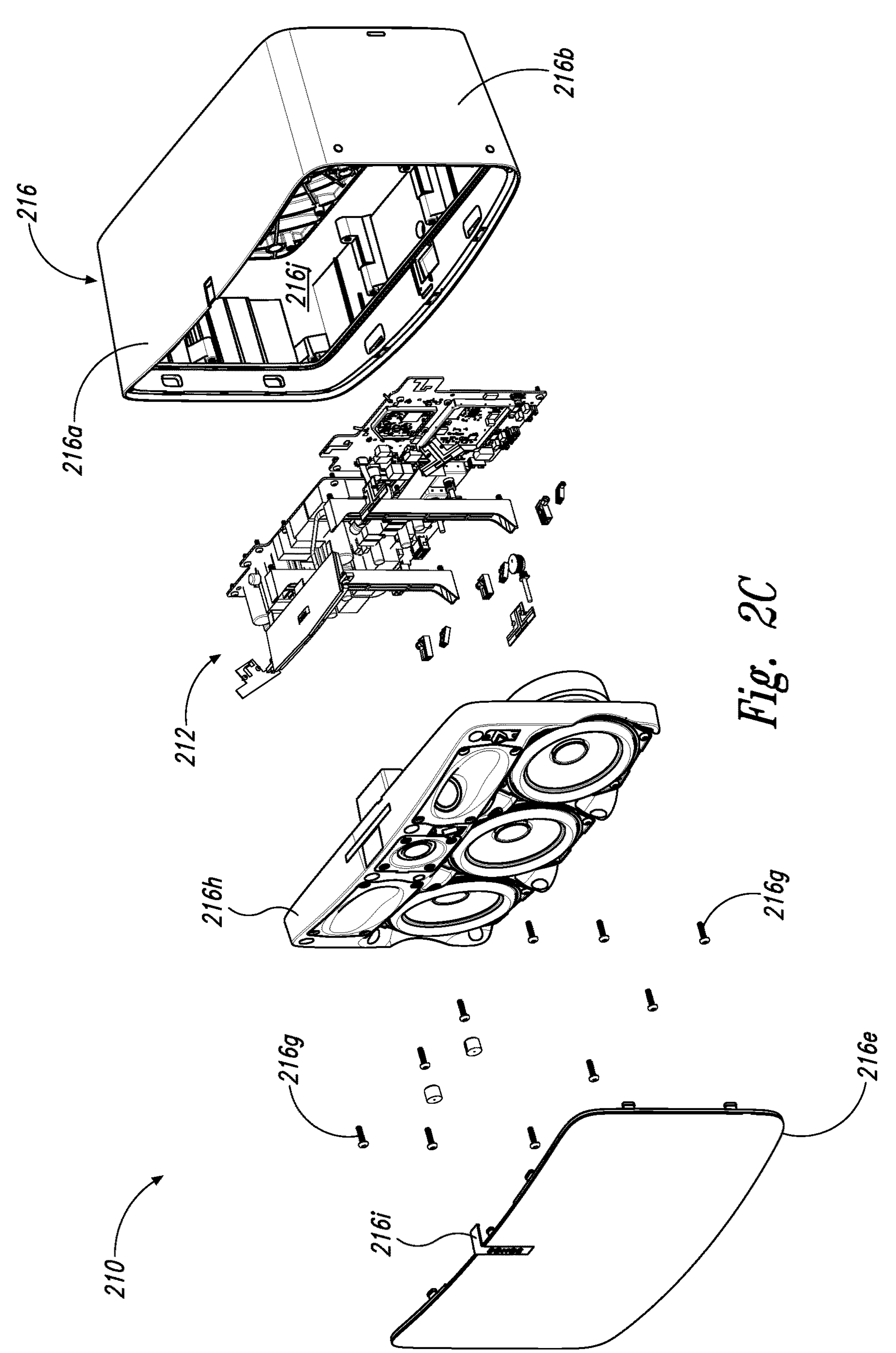
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some embodiments, however, the playback device 210 omits the filter 216*i*. In other embodiments, the playback device 210 includes one or more additional filters aligned with the transducers 214*b* and/or at least another of the transducers 214.

Figures 3A, 3B:
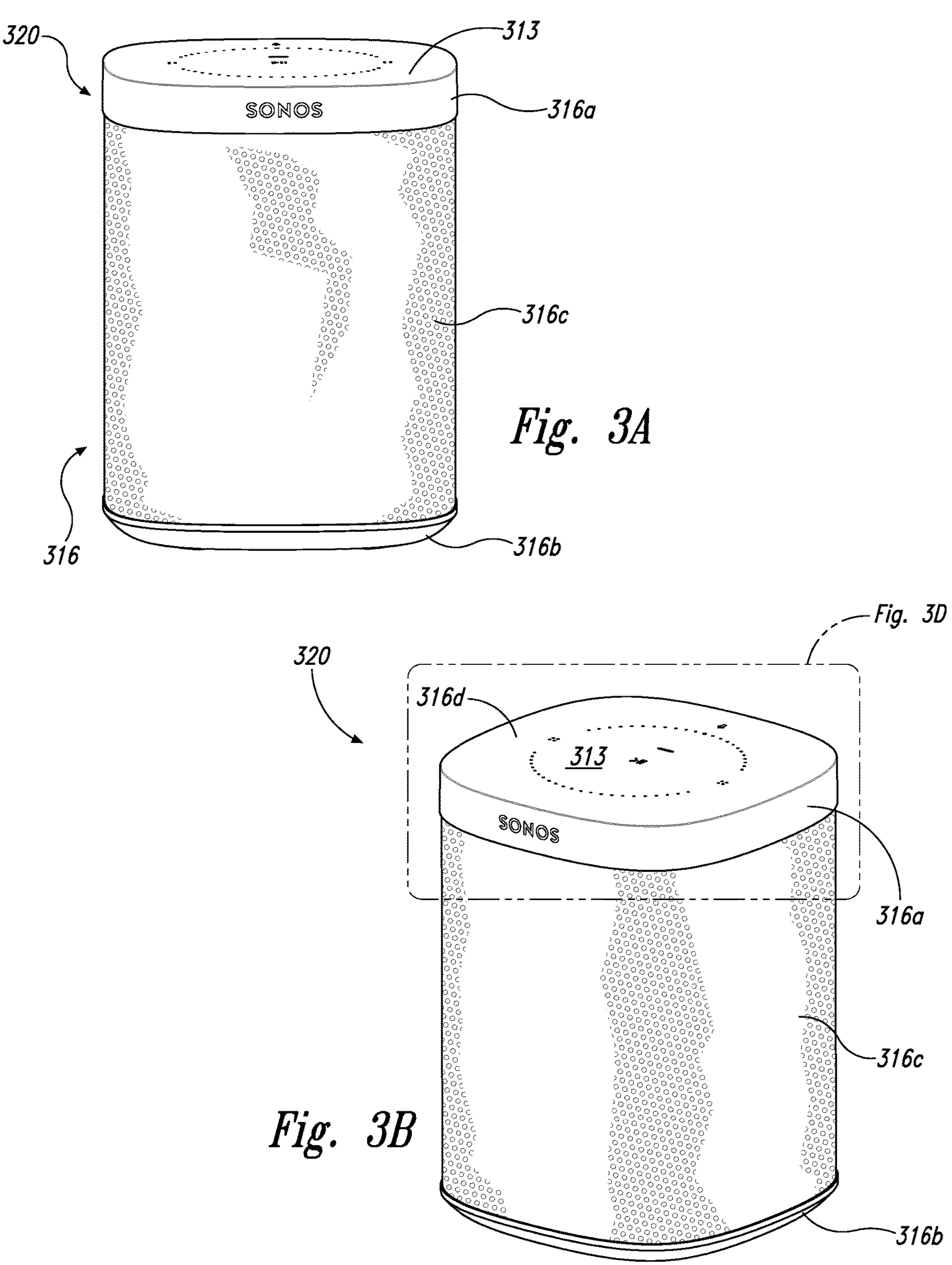
FIG. 3A shows a front view of a network microphone device configured in accordance with aspects of the disclosed technology.
FIG. 3B shows a side isometric view of the network microphone device of FIG. 3A.
Figure 3C:
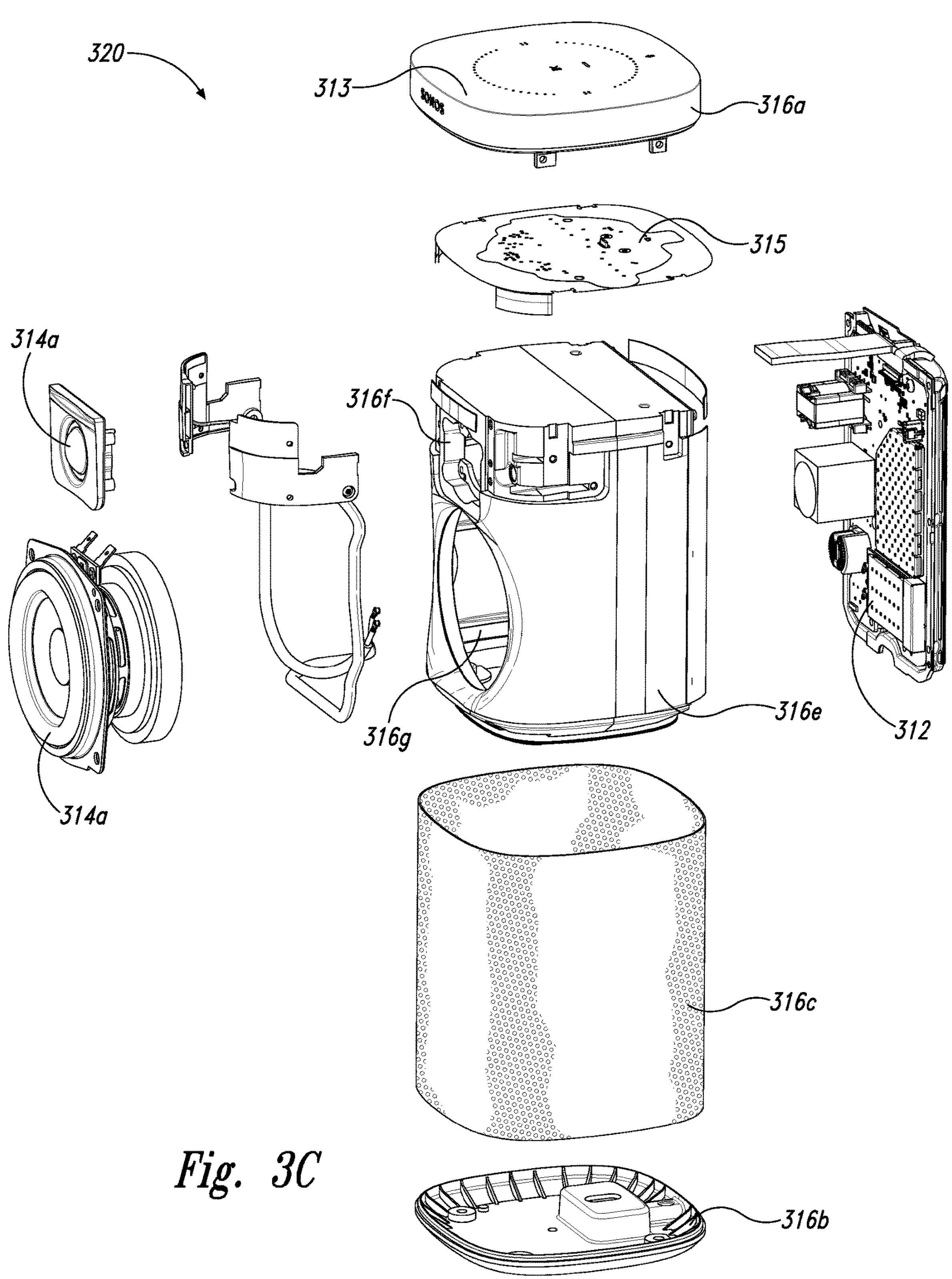
FIG. 3C shows an exploded view of the network microphone device of FIGS. 3A and 3B.
Figure 3D:
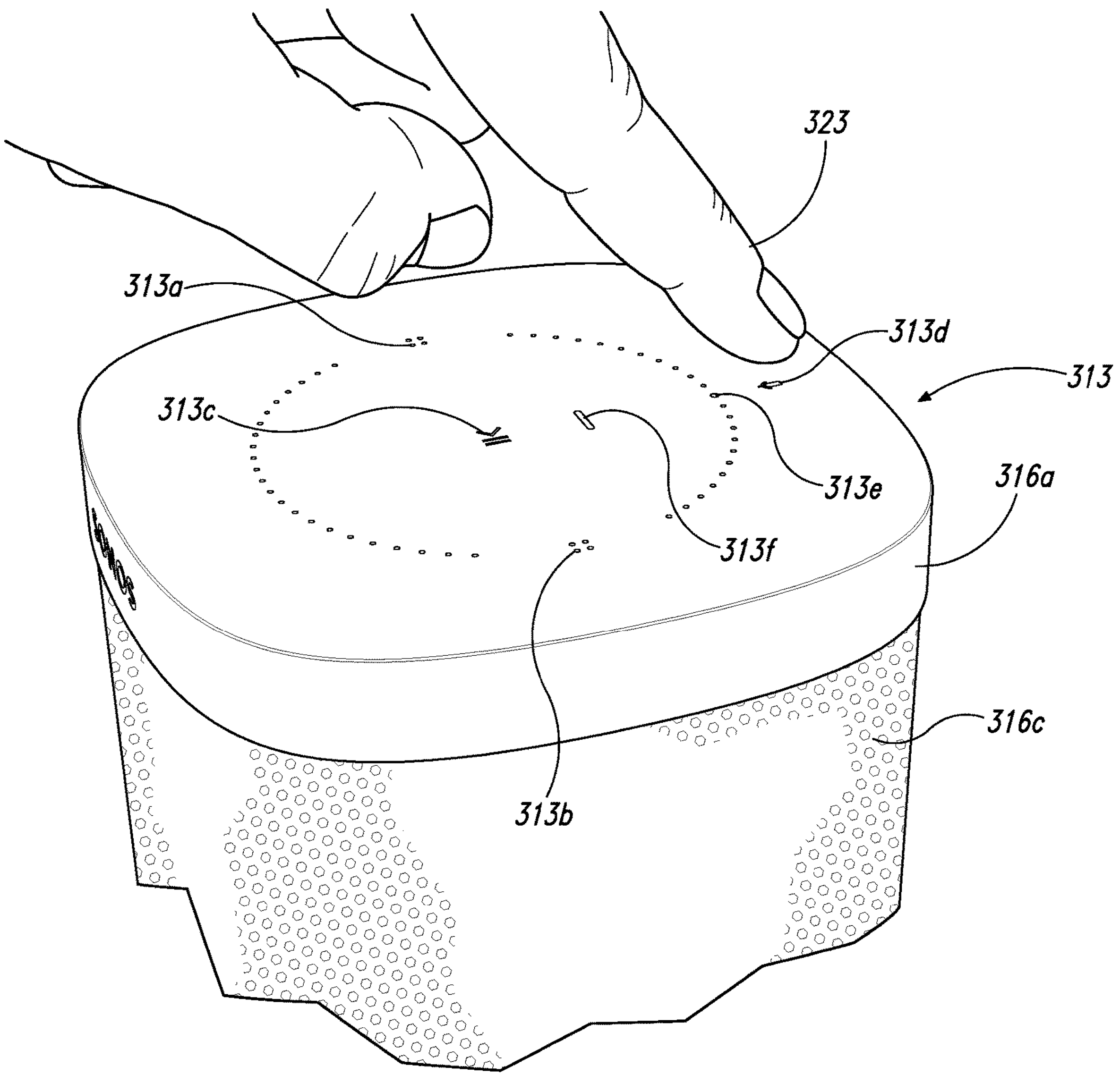
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316*a*, a lower portion 316*b* and an intermediate portion 316*c* (e.g., a grille). A plurality of ports, holes or apertures 316*d* in the upper portion 316*a* allow sound to pass through to one or more microphones 315 (FIG. 3C) positioned within the housing 316. The one or more microphones 316 are configured to received sound via the apertures 316*d* and produce electrical signals based on the received sound. In the illustrated embodiment, a frame 316*e* (FIG. 3C) of the housing 316 surrounds cavities 316*f* and 316*g* configured to house, respectively, a first transducer 314*a* (e.g., a tweeter) and a second transducer 314*b* (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314*a* and 314*b* altogether.

Electronics 312 (FIG. 3C) includes components configured to drive the transducers 314*a* and 314*b*, and further configured to analyze audio information corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112*a*, the memory 112*b*, the software components 112*c*, the network interface 112*d*, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313*a* (e.g., a previous control), a second control surface 313*b* (e.g., a next control), and a third control surface 313*c* (e.g., a play and/or pause control). A fourth control surface 313*d* is configured to receive touch input corresponding to activation and deactivation of the one or microphones 315. A first indicator 313*e* (e.g., one or more light emitting diodes (LEDs) or another suitable illuminator) can be configured to illuminate only when the one or more microphones 315 are activated. A second indicator 313*f* (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313*e*, omitting the second indicator 313*f*. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figures 3E, 3F:
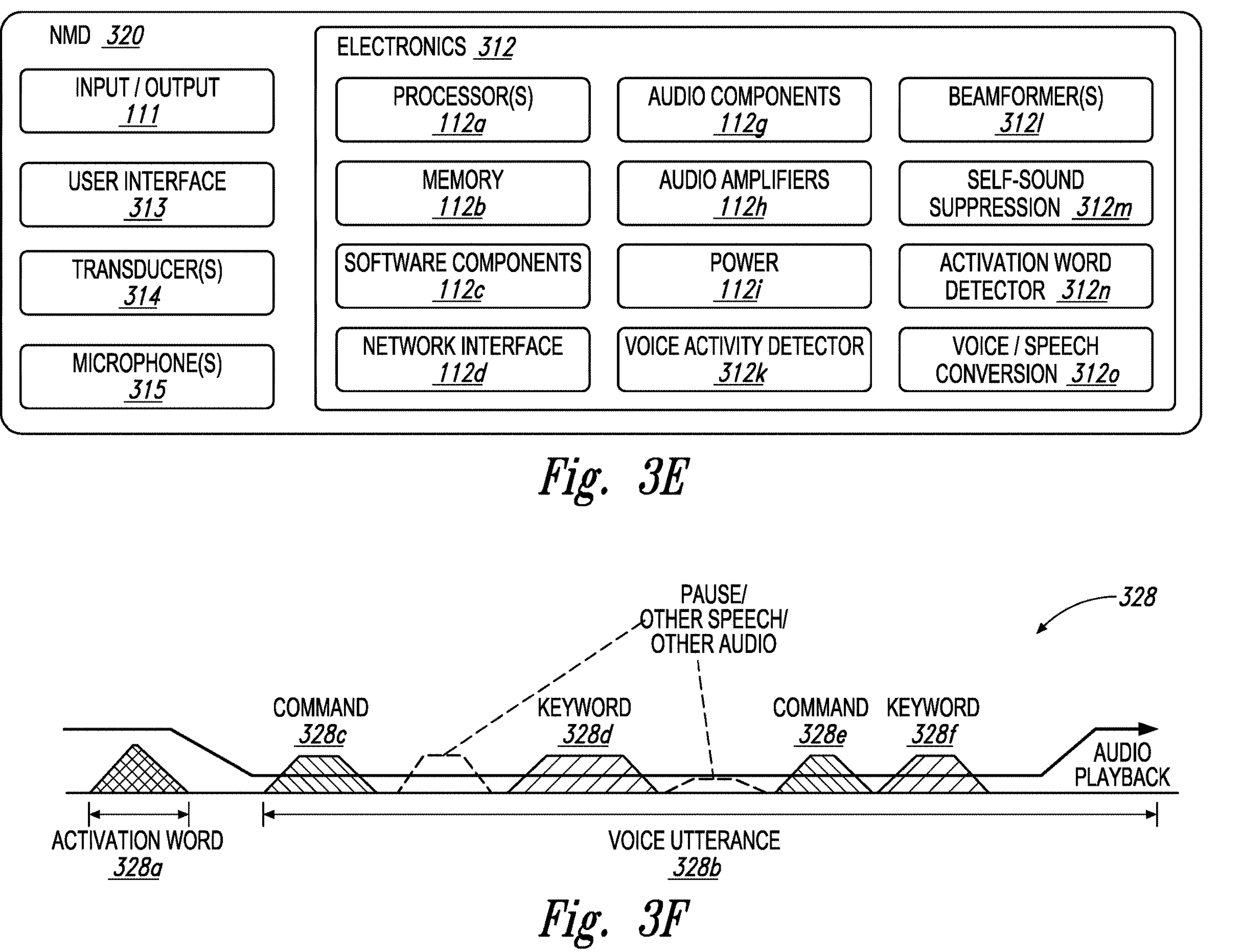
FIG. 3E shows a block diagram of the network microphone device of FIGS. 3A-3D
FIG. 3F shows a schematic diagram of an example voice input.

FIG. 3E is a functional block diagram showing additional features of the NMD 320 in accordance with aspects of the disclosure. The NMD 320 includes components configured to facilitate voice command capture including voice activity detector component(s) 312*k*, beam former components 312*l*, acoustic echo cancellation (AEC) and/or self-sound suppression components 312*m*, activation word detector components 312*n*, and voice/speech conversion components 3120 (e.g., voice-to-text and text-to-voice). In the illustrated embodiment of FIG. 3E, the foregoing components 312*k*-3120 are shown as separate components. In some embodiments, however, one or more of the components 312*k*-3120 are subcomponents of the processors 112*a*.

The beamforming and self-sound suppression components 312*l* and 312*m* are configured to detect an audio signal and determine aspects of voice input represented in the detected audio signal, such as the direction, amplitude, frequency spectrum, etc. The voice activity detector activity components 312*k* are operably coupled with the beamforming and AEC components 312*l* and 312*m* and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312*n* are configured to monitor and analyze received audio to determine if any activation words (e.g., wake words) are present in the received audio. The activation word detector components 312*n* may analyze the received audio using an activation word detection algorithm. If the activation word detector 312*n* detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312*n* runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312*n* may run the received audio through the activation word detection algorithm for each supported voice service in parallel.

The speech/text conversion components 3120 may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

FIG. 3F is a schematic diagram of an example voice input 328 captured by the NMD 320 in accordance with aspects of the disclosure. The voice input 328 can include a activation word portion 328*a* and a voice utterance portion 328*b*. In some embodiments, the activation word 557*a* can be a known activation word, such as "Alexa," which is associated with AMAZON's ALEXA®. In other embodiments, however, the voice input 328 may not include a activation word.

In some embodiments, a network microphone device may output an audible and/or visible response upon detection of the activation word portion 328*a*. In addition or alternately, an NMB may output an audible and/or visible response after processing a voice input and/or a series of voice inputs.

The voice utterance portion 328*b* may include, for example, one or more spoken commands (identified individually as a first command 328*c* and a second command 328*e*) and one or more spoken keywords (identified individually as a first keyword 328*d* and a second keyword 328*f*). In one example, the first command 328*c* can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328*b* can include other information, such as detected pauses (e.g., periods of non-speech) between words spoken by a user, as shown in FIG. 3F. The pauses may demarcate the locations of separate commands, keywords, or other information spoke by the user within the voice utterance portion 328*b*.

In some embodiments, the media playback system 100 is configured to temporarily reduce the volume of audio content that it is playing while detecting the activation word portion 557*a*. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figures 4A, 4B, 4C, 4D:
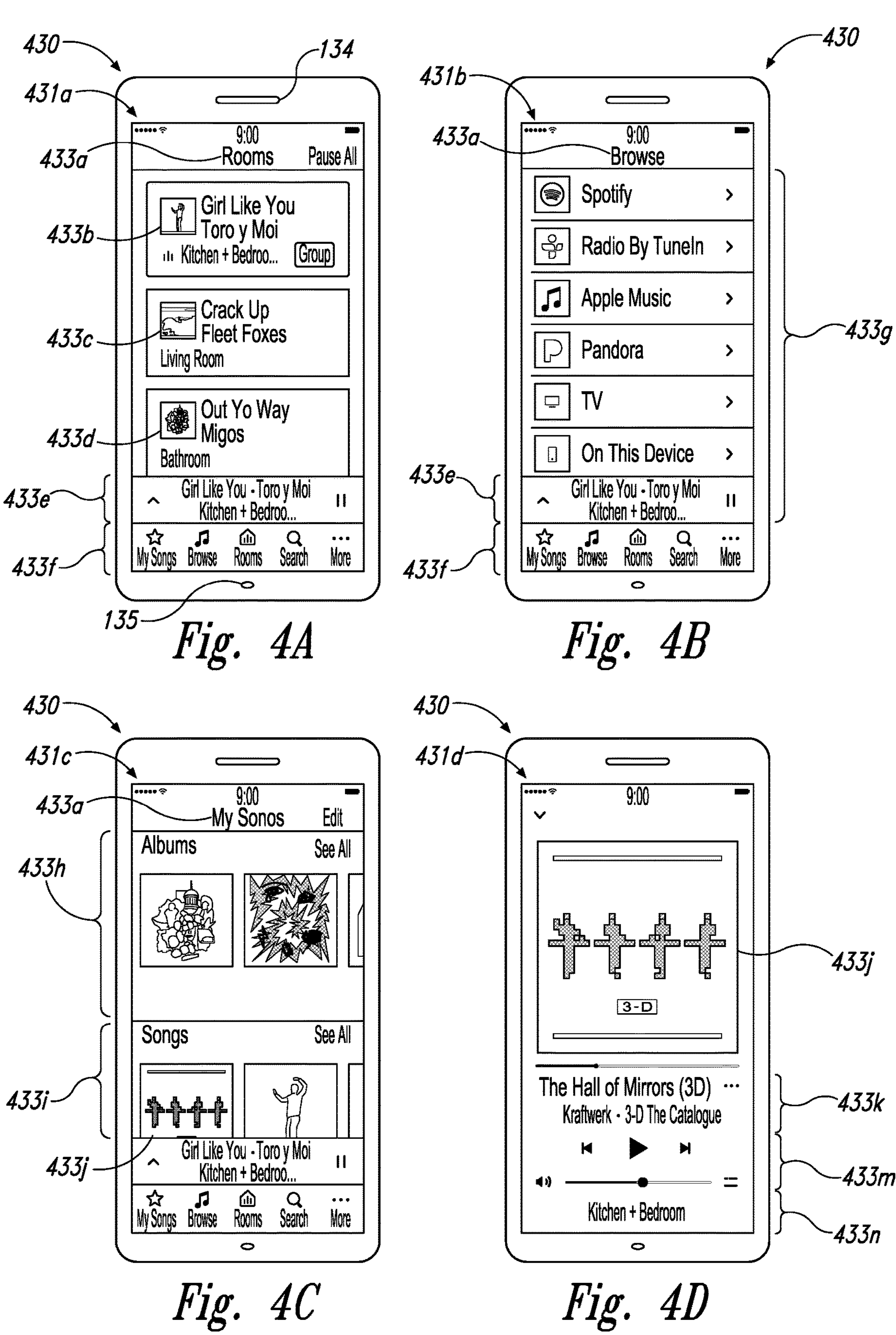
FIGS. 4A-4D show schematic diagrams of a control device in various stages of operation in accordance with aspects of the disclosed technology.

FIGS. 4A-4D are schematic diagrams of a control device 430 (e.g., the control device 130*a* of FIG. 1H, a smartphone, a tablet, a dedicated control device, an IoT device, and/or another suitable device) showing corresponding user interface displays in various states of operation. A first user interface display 431*a* (FIG. 4A) includes a display name 433*a* (i.e., "Rooms"). A selected group region 433*b* displays audio content information (e.g., artist name, track name, album art) of audio content played back in the selected group and/or zone. Group regions 433*c* and 433*d* display corresponding group and/or zone name, and audio content information audio content played back or next in a playback queue of the respective group or zone. An audio content region 433*e* includes information related to audio content in the selected group and/or zone (i.e., the group and/or zone indicated in the selected group region 433*b*). A lower display region 433*f* is configured to receive touch input to display one or more other user interface displays. For example, if a user selects "Browse" in the lower display region 433*f*, the control device 430 can be configured to output a second user interface display 431*b* (FIG. 4B) comprising a plurality of music services 433*g* (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433*f*, the control device 430 can be configured to output a third user interface display 431*c* (FIG. 4C). A first media content region 433*h* can include graphical representations (e.g., album art) corresponding to individual albums, stations, or playlists. A second media content region 433*i* can include graphical representations (e.g., album art) corresponding to individual songs, tracks, or other media content. If the user selections a graphical representation 433*j* (FIG. 4C), the control device 430 can be configured to begin play back of audio content corresponding to the graphical representation 433*j* and output a fourth user interface display 431*d* fourth user interface display 431*d* includes an enlarged version of the graphical representation 433*j*, media content information 433*k* (e.g., track name, artist, album), transport controls 433*m* (e.g., play, previous, next, pause, volume), and indication 433*n* of the currently selected group and/or zone name.

Figure 5:
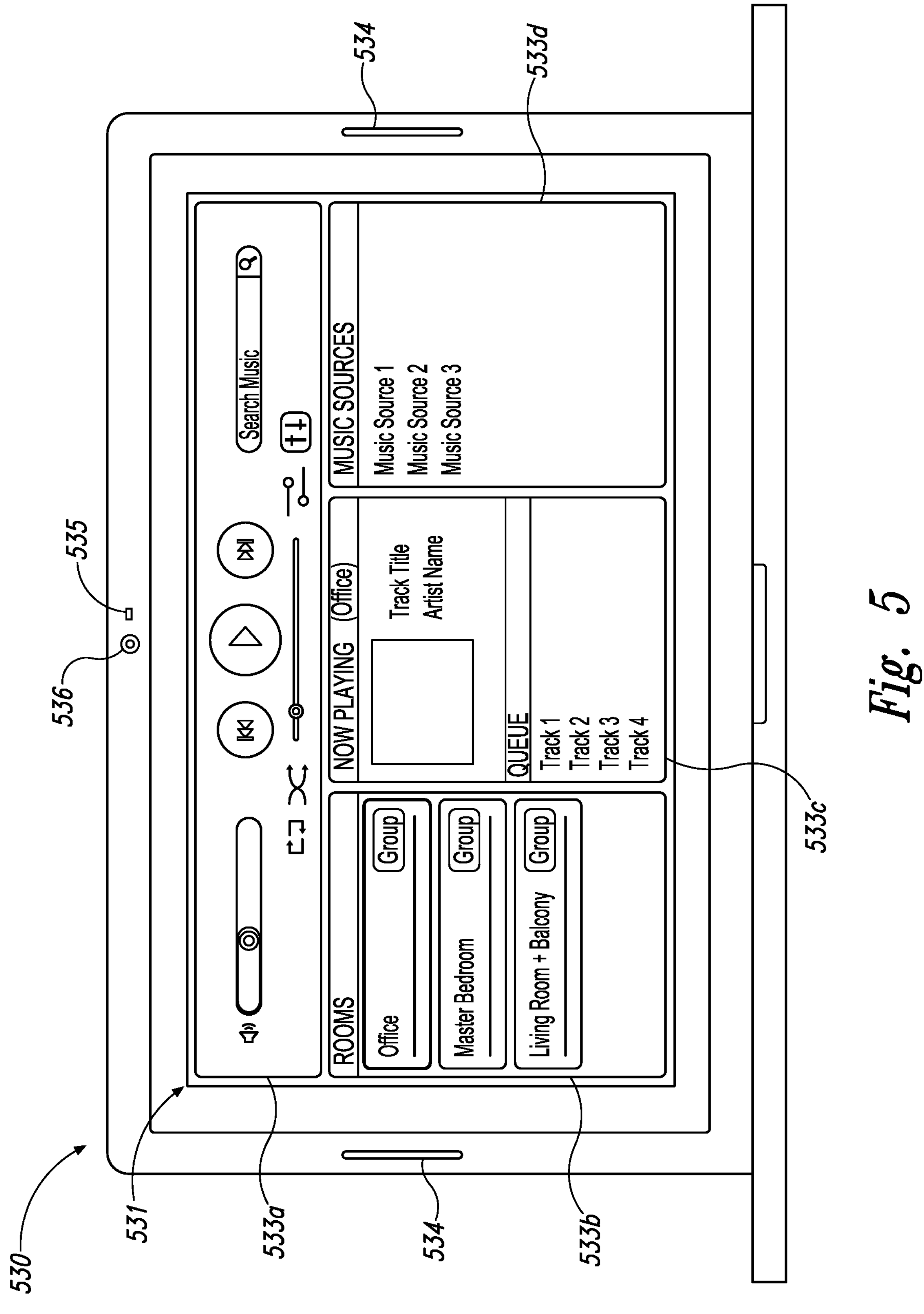
FIG. 5 shows a front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533*a*, a playback status region 533*b*, a playback zone region 533*c*, a playback queue region 533*d*, and a media content source region 533*e*. The transport control region comprises one or more controls for controlling media playback including, for example, volume, previous, play/pause, next, repeat, shuffle, track position, crossfade, equalization, etc. The audio content source region 533*e* includes a listing of one or more media content sources from which a user can select media items for play back and/or adding to a playback queue.

The playback zone region 533*b* can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
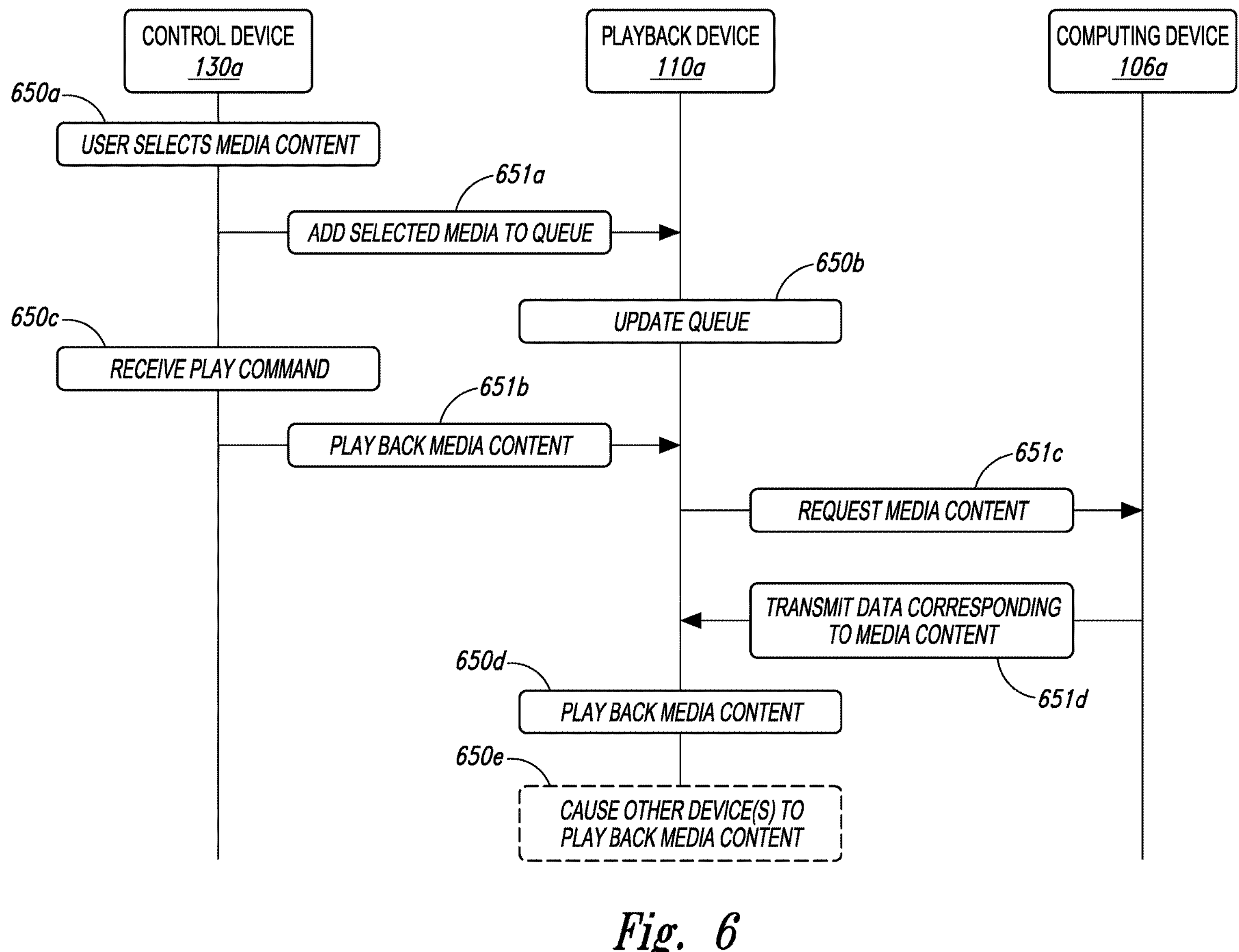
FIG. 6 shows a message flow diagram of a media playback system.

FIG. 6 is a message flow diagram illustrating data exchanges between devices of the media playback system 100 (FIGS. 1A-1M).

At step 650*a*, the media playback system 100 receives an indication of selected media content (e.g., one or more songs, albums, playlists, podcasts, videos, stations) via the control device 130*a*. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130*a* transmits a message 651*a* to the playback device 110*a* (FIGS. 1A-1C) to add the selected media content to a playback queue on the playback device 110*a*.

At step 650*b*, the playback device 110*a* receives the message 651*a* and adds the selected media content to the playback queue for play back.

At step 650*c*, the control device 130*a* receives input corresponding to a command to play back the selected media content. In response to receiving the input corresponding to the command to play back the selected media content, the control device 130*a* transmits a message 651*b* to the playback device 110*a* causing the playback device 110*a* to play back the selected media content. In response to receiving the message 651*b*, the playback device 110*a* transmits a message 651*c* to the first computing device 106*a* requesting the selected media content. The first computing device 106*a*, in response to receiving the message 651*c*, transmits a message 651*d* comprising data (e.g., audio data, video data, a URL, a URI) corresponding to the requested media content.

At step 650*d*, the playback device 110*a* receives the message 651*d* with the data corresponding to the requested media content and plays back the associated media content.

At step 650*e*, the playback device 110*a* optionally causes one or more other devices to play back the selected media content. In one example, the playback device 110*a* is one of a bonded zone of two or more players (FIG. 1M). The playback device 110*a* can receive the selected media content and transmit all or a portion of the media content to other devices in the bonded zone. In another example, the playback device 110*a* is a coordinator of a group and is configured to transmit and receive timing information from one or more other devices in the group. The other one or more devices in the group can receive the selected media content from the first computing device 106*a*, and begin playback of the selected media content in response to a message from the playback device 110*a* such that all of the devices in the group play back the selected media content in synchrony.

IV. Overview of Example Embodiments

As mentioned above, when two or more portable playback devices in a media playback system are moved away from the WLAN via which the portable playback devices normally operate (i.e., outside of the transmission/reception range of their home WLAN), it is desirable for those portable playback devices to still be able to play audio content in synchrony with each other even though the portable playback devices are not connected to their home WLAN, e.g., even while the portable playback devices are "off-net."

In some embodiments, when two or more portable playback devices are away from the WLAN via which they normally operate (i.e., away their "home WLAN"), one of the portable playback devices: (i) establishes and operates a temporary WLAN via which the two or more portable playback devices can transmit and receive audio information and control signaling that the portable playback devices can use to form a playback group and play audio content in synchrony, and (ii) begins operating as a group coordinator for the playback group comprising the two or more portable playback devices. Each of the other portable playback devices of the two or more portable playback devices: (i) searches for and connects to the temporary WLAN established by the portable playback device operating as the group coordinator, and (ii) begins operating as a group member in the playback group comprising the two or more portable playback devices.

In operation, the group coordinator performs functions for initiating and controlling groupwise playback of audio content by the group coordinator and the group members. In some embodiments, the group coordinator functions include: (i) obtaining audio information from an audio source via a Personal Area Network (PAN) link (e.g., Bluetooth or other PAN network link) to a smartphone, tablet, smartwatch or other computing device; (ii) generating playback timing for the audio information, where the portable playback devices in the playback group (including the group coordinator) use the audio information and the playback timing to play audio content based on the audio information in a groupwise fashion; (iii) playing the audio content based on the audio information in synchrony with the other portable playback devices in the playback group; and (iv) transmitting the audio information and the playback timing information to all the portable playback devices in the playback group.

In some embodiments, the group coordinator functions additionally include distributing clock timing to all the portable playback devices in the playback group, where the portable playback devices in the playback group (including the group coordinator) use the clock timing, the audio information, and the playback timing to play audio content based on the audio information in a groupwise fashion. In some embodiments, however, clock timing or some other common clock reference may be generated and provided by a device other than the group coordinator. For example, in some embodiments, the clock timing may be provided by another group member or perhaps another device separate from the playback group, e.g., a smartphone, tablet computer, smartwatch, or other computing device.

V. Technical Features

In some embodiments, at least some aspects of the technical solutions derive from the technical structure and organization of the audio information, the playback timing, and clock timing that the portable playback devices use to play audio content from audio sources in synchrony with each other or in some other groupwise fashion, including how portable playback devices generate and/or use playback timing based on clock timing and play audio content based on playback timing and clock timing.

Therefore, to aid in understanding certain aspects of the disclosed technical solutions, certain technical details of the audio information, playback timing, and clock timing, as well as how portable playback devices generate and/or use playback timing and clock timing for playing audio content are described below. Except where noted, the technical details of the audio information, playback timing, and clock timing described herein are the same or substantially the same for the examples shown and described herein with reference to FIGS. 7-9.

a. Audio Content

Audio content may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a streaming video service, or any other source of audio-visual media content now known or later developed; (iv) text-to-speech or other audible content from a voice assistant service (VAS), such as Amazon Alexa or other VAS services now known or later developed; and/or (v) audio content from a telephone, video phone, video/teleconferencing system or other application configured to allow users to communicate with each other via audio and/or video.

In some embodiments, a group coordinator (sometimes referred to as a "sourcing" device) obtains any of the aforementioned types of audio content from an audio source via an interface on the group coordinator, e.g., one of the group coordinator's network interfaces, a "line-in" analog interface, a digital audio interface, or any other interface suitable for receiving audio content in digital or analog format now known or later developed. In some embodiments, the group coordinator obtains any of the aforementioned types of audio content via a Personal Area Network (PAN) link (e.g., a Bluetooth or other PAN link) from a computing device (.g., a smartphone, tablet computer, smartwatch, or other computing device).

An audio source is any system, device, or application that generates, provides, or otherwise makes available any of the aforementioned audio content to a group coordinator.

As mentioned earlier, an portable playback device that receives or otherwise obtains audio information from an audio source for playback and/or distribution to other portable playback devices in a playback group is sometimes referred to herein as the group coordinator or "sourcing" device for the playback group. One function of the group coordinator of a playback group is to process received audio information for playback and/or distribution to group members of the playback group for groupwise playback.

In some embodiments, the group coordinator transmits the processed audio information to all the other group members in the playback group. In some embodiments, the group coordinator transmits the audio information to a multicast network address, and all the group members configured to play the audio content (i.e., the group members of the playback group) receive the audio information via that multicast address.

In some embodiments, the group coordinator receives audio information from an audio source in digital form, e.g., via a stream of packets. In some embodiments, individual packets in the stream have a sequence number or other identifier that specifies an ordering of the packets. In operation, the group coordinator uses the sequence number or other identifier to detect missing packets and/or to reassemble the packets of the stream in the correct order before performing further processing. In some embodiments, the sequence number or other identifier that specifies the ordering of the packets is or at least comprises a timestamp indicating a time when the packet was created. The packet creation time can be used as a sequence number based on an assumption that packets are created in the order in which they should be subsequently played out.

For example, in some embodiments, individual packets from an audio source may include both a timestamp and a sequence number. The timestamp is used to place the incoming packets of audio information in the correct order, and the sequence number is mainly used to detect packet losses. In operation, the sequence numbers increase by one for each Real-time Transport Protocol (RTP) packet transmitted from the audio source, and timestamps increase by the time "covered" by an RTP packet. In instances where a portion of audio content is split across multiple RTP packets, multiple RTP packets can have the same timestamp.

In some embodiments, the group coordinator does not change the sequence number or identifier of a received packet during processing. In some embodiments, the group coordinator reorders at least a first set of packets in a first packet stream received from an audio source (an inbound stream) based on each packet's sequence identifier, extracts audio information from the received packets, reassembles a bitstream of audio information from the received packets, and then repacketizes the reassembled bitstream into a second set of packets (an outbound stream), where packets in the second set of packets have sequence numbers and/or timestamps that differ from the sequence numbers and/or timestamps of the packets in the first set of packets (or first stream).

In some embodiments, individual packets in the second stream are a different length (i.e., shorter or longer) than individual packets in the first stream. In some embodiments, reassembling a bitstream from the incoming packet stream and then subsequently repacketizing the reassembled bitstream into a different set of packets facilitates uniform processing and/or transmission of audio content by the group coordinator and uniform processing by the group members that receive the audio information from the group coordinator. However, for some delay-sensitive audio information, reassembly and repacketization may be undesirable, and therefore, in some embodiments, the group coordinator may not perform reassembly and repacketization for some (or all) audio information that it receives before playing the audio information and/or transmitting the audio information to other playback devices/group members.

b. Playback Timing

In some embodiments, the portable playback devices disclosed and described herein use playback timing to play audio content in synchrony with each other. An individual portable playback device can generate playback timing and/or playback audio content according to playback timing, based on the portable playback device's configuration in the playback group. The sourcing portable playback device (acting as a group coordinator) that generates the playback timing for audio content also transmits that generated playback timing to all the playback devices that are configured to play the audio content (the group members).

In some embodiments, the group coordinator transmits playback timing separately from the audio information. In some embodiments, the group coordinator transmits the playback timing to all the group members by transmitting the playback timing to a multicast network address for the playback group, and all the group members receive the playback timing via the playback group's multicast address. In some embodiments, the group coordinator transmits the playback timing to each group member by transmitting the playback timing to each group member's unicast network address.

In some embodiments, the playback timing is generated for individual frames (or packets) of audio information. As described above, in some embodiments, the audio information is packaged in a series of frames (or packets) where individual frames (or packets) comprise a portion of the audio information. In some embodiments, the playback timing for the audio information includes a playback time for each frame (or packet) of audio information. In some embodiments, the playback timing for an individual frame (or packet) is included within the frame (or packet), e.g., in the header of the frame (or packet), in an extended header of the frame (or packet), and/or in the payload portion of the frame (or packet).

In some embodiments, the playback time for an individual frame (or packet) is identified within a timestamp or other indication. In such embodiments, the timestamp (or other indication) represents a time to play the one or more portions of audio information within that individual frame (or packet).

In operation, when the playback timing for an individual frame (or packet) is generated, the playback timing for that individual frame (or packet) is a future time relative to a current clock time of a reference clock at the time that the playback timing for that individual frame (or packet) is generated.

In operation, an portable playback device tasked with playing particular audio content will play the portion(s) of the particular audio content within an individual frame (or packet) at the playback time specified by the playback timing for that individual frame (or packet), as adjusted to accommodate for differences between the clock timing and a clock at the portable playback device that is tasked with playing the audio content, as described in more detail below.

c. Clock Timing

The portable playback devices disclosed and described herein use clock timing to generate playback timing for audio information and/or to play the audio content based on the audio information and the generated playback timing.

In some embodiments, the group coordinator uses clock timing from a reference clock (e.g., a device clock, a digital-to-audio converter clock, a playback time reference clock, or any other clock) to generate playback timing for audio information that the group coordinator receives from an audio source. The reference clock can be a "local" clock at the group coordinator or a "remote" clock at a separate network device, e.g., another playback device, a computing device, or another network device configured to provide clock timing for use by (i) a group coordinator to generate playback timing and/or (ii) the group coordinator and group members to play back audio content.

In some embodiments, all of the portable playback devices tasked with playing particular audio content in synchrony (i.e., all the group members in a playback group) use the same clock timing from the same reference clock to play back that particular audio content in synchrony with each other. In some embodiments, portable playback devices use the same clock timing to play audio content that was used to generate the playback timing for the audio content. The reference clock may be a local clock of the group coordinator, but the reference clock could also be a clock at a different device, such as a group member or a computing device (.g., a smartphone, tablet computer, smartwatch, or other computing device).

In operation, the device that generates the clock timing also transmits the clock timing to all the portable playback devices that need to use the clock timing for generating playback timing and/or playing back audio content. In some embodiments, the device that generates the clock timing (e.g., the group coordinator in some embodiments) transmits the clock timing to a multicast network address, and all the portable playback devices configured to generate playback timing and/or play audio content (e.g., the group coordinator and/or the group members) receive the clock timing via that multicast address. In some embodiments, the device that generates the clock timing alternatively transmits the clock timing to each unicast network address of each portable playback device in the playback group.

In some embodiments, the device that generates the clock timing is the portable playback device configured to operate as the group coordinator for the playback group. And in operation, the group coordinator of the playback group transmits the clock timing to all the group members of the playback group. The group coordinator and the group members all use the clock timing and the playback timing to play audio content in a groupwise manner. In some embodiments, the group coordinator and the group members all use the clock timing and the playback timing to play audio content in synchrony with each other.

d. Generating Playback Timing by the Group Coordinator

In some embodiments, the group coordinator: (i) generates playback timing for audio information based on clock timing from a local clock at the group coordinator, and (ii) transmits the generated playback timing to all the other group members in the playback group. In operation, when generating playback timing for an individual frame (or packet), the group coordinator adds a "timing advance" to the current clock time of a local clock at the group coordinator that the group coordinator is using for generating the playback timing.

In some embodiments, the "timing advance" is based on an amount of time that is greater than or equal to the sum of (i) the network transit time required for frames and/or packets comprising audio information transmitted from the group coordinator to arrive at all the other group members and (ii) the amount of time required for all the other group members to process received frames/packets from the group coordinator for playback.

In some embodiments, the group coordinator determines a timing advance by sending one or more test packets to one or more (or perhaps all) of the other group members, and then receiving test response packets back from those one or more group members. In some embodiments, the group coordinator and the one or more group members negotiate a timing advance via multiple test and response messages. In some embodiments with more than two group members, the group coordinator determines a timing advance by exchanging test and response messages with all of the group members, and then setting a timing advance that is sufficient for the group member having the longest total of network transmit time and packet processing time.

In some embodiments, the timing advance is less than about 50 milliseconds. In some embodiments, the timing advance is less than about 20-30 milliseconds. And in still further embodiments, the timing advance is less than about 10 milliseconds. In some embodiments, the timing advance remains constant after being determined, or at least constant for the duration of a synchronous playback session. In other embodiments, the group coordinator can change the timing advance in response to a request from a group member indicating that a greater timing advance is required (e.g., because the group member is not receiving packets comprising portions of audio content until after one or more other group members have already played the portions of audio content) or a shorter timing advance would be sufficient (e.g., because the group member is buffering more packets comprising portions of audio content than necessary to provide consistent, reliable playback).

As described in more detail below, all the playback devices in a playback group configured to play the audio content in synchrony will use the playback timing and the clock timing to play the audio content in synchrony with each other.

e. Generating Playback Timing with Clock Timing from a Remote Clock

In some embodiments, the group coordinator may generate playback timing for audio information based on clock timing from a "remote" clock at another network device, e.g., another playback device, another computing device (e.g., a smartphone, tablet computer, smartwatch, or other computing device configurable to provide clock timing sufficient for use by the group coordinator generate playback timing and/or playback audio content). Generating playback timing based on clock timing from a remote clock at another network device is more complicated than generating playback timing based on clock timing from a local clock in embodiments where the same clock timing is used for both (i) generating playback timing and (ii) playing audio content based on the playback timing.

In embodiments where the group coordinator generates playback timing for audio information based on clock timing from a remote cock, the playback timing for an individual frame (or packet) is based on (i) a "timing offset" between (a) a local clock at the group coordinator that the group coordinator uses for generating the playback timing and (b) the clock timing from the remote reference clock, and (ii) a "timing advance" based on an amount of time that is greater than or equal to the sum of (a) the network transit time required for packets transmitted from the group coordinator to arrive at the group members and (b) the amount of time required for all of those group members to process frames and/or packets comprising audio information received from the group coordinator for playback.

For an individual frame (or packet) containing a portion (s) of the audio information, the group coordinator generates playback timing for that individual frame (or packet) by adding the sum of the "timing offset" and the "timing advance" to a current time of the local clock at the group coordinator that the group coordinator uses to generate the playback timing for the audio information. In operation, the "timing offset" may be a positive or a negative offset, depending on whether the local clock at the group coordinator is ahead of or behind the remote clock providing the clock timing. The "timing advance" is a positive number because it represents a future time relative to the local clock time, as adjusted by the "timing offset."

By adding the sum of the "timing advance" and the "timing offset" to a current time of the local clock at the group coordinator that the group coordinator is using to generate the playback timing for the audio information, the group coordinator is, in effect, generating the playback timing relative to the remote clock.

In some embodiments, and as described above, the "timing advance" is based on an amount of time that is greater than or equal to the sum of (i) the network transit time required for frames and/or packets comprising audio information transmitted from the group coordinator to arrive at all other group members and (ii) the amount of time required for all the other group members to process received frames/packets from the sourcing playback device for playback.

In some embodiments, the group coordinator determines a timing advance via signaling between the group coordinator and one or more group members, as described previously. Further, in some embodiments, the timing advance is less than about 50 milliseconds, less than about 20-30 milliseconds, or less than about 10 milliseconds, depending on the audio content playback latency requirements because different audio content may have different latency requirements. For example, audio content having associated video content may have lower latency requirements than audio content that does not have associated video content because audio content associating with video content must be synchronized with its corresponding video content whereas audio content that is not associated with video content need not be synchronized with any corresponding video content. In some embodiments, the timing advance remains constant after being determined, or at least constant for the duration of a playback session. And in some embodiments, the group coordinator can change the timing advance based on further signaling between the group coordinator (generating the playback timing) and one or more group members (that are using the playback timing to play audio content).

As described in more detail below, all the playback devices configured to play the audio content in synchrony will use the playback timing and the clock timing to play the audio content in synchrony with each other.

f. Playing Audio Content Using Local Playback Timing and Local Clock Timing

In some embodiments, the group coordinator is configured to play audio content in synchrony with one or more group members. And if the group coordinator is using clock timing from a local clock at the group coordinator to generate the playback timing, then the group coordinator will play the audio content using locally-generated playback timing and the locally-generated clock timing. In operation, the group coordinator plays an individual frame (or packet) comprising portions of the audio information when the local clock that the group coordinator used to generate the playback timing reaches the time specified in the playback timing for that individual frame (or packet).

For example, recall that when generating playback timing for an individual frame (or packet), the group coordinator device adds a "timing advance" to the current clock time of the reference clock used for generating the playback timing. In this instance, the reference clock used for generating the playback timing is a local clock at the group coordinator. So, if the timing advance for an individual frame is, for example, 30 milliseconds, then the group coordinator plays the portion (e.g., a sample or set of samples) of audio information in an individual frame (or packet) 30 milliseconds after creating the playback timing for that individual frame (or packet).

In this manner, the group coordinator plays audio content based on the audio information by using locally-generated playback timing and clock timing from a local reference clock at the group coordinator. As described further below, by playing the portion(s) of the audio information of an individual frame and/or packet when the clock time of the local reference clock reaches the playback timing for that individual frame or packet, the group coordinator plays that portion(s) of the audio content corresponding to the audio information in that individual frame and/or packet in synchrony with other group members in the playback group.

g. Playing Audio Content Using Local Playback Timing and Remote Clock Timing

As mentioned earlier, in some embodiments, a group coordinator generates playback timing for audio information based on clock timing from a remote clock, i.e., a clock at another network device separate from the group coordinator, e.g., another playback device, or another computing device (e.g., a smartphone, laptop, media server, or other computing device configurable to provide clock timing sufficient for use by a playback device generate playback timing and/or playback audio content). Because the group coordinator used clock timing from the "remote" clock to generate the playback timing for the audio content, the group coordinator also uses the clock timing from the "remote" clock to play the audio content. In this manner, the group coordinator plays audio content using the locally-generated playback timing and the clock timing from the remote clock.

Recall that, in embodiments where the group coordinator generates playback timing for audio content based on clock timing from a remote clock, the group coordinator generates the playback timing for an individual frame (or packet) based on (i) a "timing offset" based on a difference between (a) a local clock at the group coordinator and (b) the clock timing from the remote clock, and (ii) a "timing advance" comprising an amount of time that is greater than or equal to the sum of (a) the network transit time required for frames/packets transmitted from the group coordinator to arrive at all the group members and (b) the amount of time required for all of the group members to process frames and/or packets comprising audio information received from the group coordinator for playback. And further recall that the group coordinator transmits the generated playback timing to all of the group members in the playback group tasked with playing the audio content in synchrony.

In this scenario, to play an individual frame (or packet) of audio content in synchrony with the one or more other group members, the group coordinator subtracts the "timing offset" from the playback timing for that individual frame (or packet) to generate a "local" playback time for playing the audio content based on the audio information within that individual frame (or packet). After generating the "local" playback time for playing the portion(s) of the audio content corresponding to the audio information within the individual frame (or packet), the group coordinator plays the portion(s) of the audio content corresponding to the audio information in the individual frame (or packet) when the local clock that the group coordinator is using to play the audio content reaches the "local" playback time for that individual frame (or packet). By subtracting the "timing offset" from the playback timing to generate the "local" playback time for an individual frame, the group coordinator effectively plays the portion(s) of audio content corresponding to the audio information in that frame/packet with reference to the clock timing from the remote clock.

h. Playing Audio Content Using Remote Playback Timing and Local Clock Timing

Recall that, in some embodiments, the group coordinator transmits the audio information and the playback timing for the audio information to one or more group members. If the group member that receives (i.e., the receiving group member) the audio information and playback timing from the group coordinator is the same group member that provided clock timing to the group coordinator that the group coordinator used for generating the playback timing, then the receiving group member in this instance plays audio content using the audio information and playback timing received from the group coordinator (i.e., remote playback timing) and the group member's own clock timing (i.e., local clock timing). Because the group coordinator used clock timing from a clock at the receiving group member to generate the playback timing, the receiving group member also uses the clock timing from its local clock to play the audio content. In this manner, the receiving group member plays audio content using the remote playback timing (i.e., from the group coordinator) and the clock timing from its local clock (i.e., its local clock timing).

To play an individual frame (or packet) of the audio information in synchrony with the group coordinator (and every other playback device that receives the playback timing from the group coordinator and clock timing from the receiving group member), the receiving group member (i) receives the frames (or packets) comprising the portions of the audio information from the group coordinator, (ii) receives the playback timing for the audio information from the group coordinator (e.g., in the frame and/or packet headers of the frames and/or packets comprising the portions of the audio information or perhaps separately from the frames and/or packets comprising the portions of the audio information), and (iii) plays the portion(s) of the audio information in the individual frame (or packet) when the local clock that the receiving group member used to generate the clock timing reaches the playback time specified in the playback timing for that individual frame (or packet) received from the group coordinator.

Because the group coordinator uses the "timing offset" (which is the difference between the clock timing at the receiving group member and the clock timing at the group coordinator in this scenario) when generating the playback timing, and because this "timing offset" already accounts for differences between timing at the group coordinator and the receiving group member, the receiving group member in this scenario plays individual frames (or packets) comprising portions of the audio information when the receiving group member's local clock (that was used to generated the clock timing) reaches the playback time for an individual frame (or packet) specified in the playback timing for that individual frame (or packet).

And because the receiving group member plays frames (or packets) comprising portions of the audio information according to the playback timing, and because the group coordinator plays the same frames (or packets) comprising portions of the audio information according to the playback timing and the determined "timing offset," the receiving group member and the group coordinator play the same frames (or packets) comprising audio information corresponding to the same portions of audio content in synchrony, i.e., at the same time or at substantially the same time.

i. Playing Audio Content Using Remote Playback Timing and Remote Clock Timing

Recall that, in some embodiments, the sourcing portable playback device (e.g., which in many cases may be the group coordinator) transmits the audio information and the playback timing for the audio information to one or more other portable playback devices in the playback group. And further recall that, in some embodiments, the network device providing the clock timing can be a different device than the portable playback device providing the audio information and playback timing (i.e., the sourcing portable playback device, which in many cases may be the group coordinator). Portable playback devices that receive the audio information, the playback timing, and the clock timing from one or more other devices are configured to play the audio content using the playback timing from the device that provided the playback timing (i.e., remote playback timing) and clock timing from a clock at the device that provided the clock timing (i.e., remote clock timing). In this manner, the receiving group member in this instance plays audio content based on audio information by using remote playback timing and remote clock timing.

To play an individual frame (or packet) of the audio information in synchrony with every other portable playback device tasked with playing audio content in the playback group, the receiving portable playback device (i) receives the frames (or packets) comprising the portions of the audio information, (ii) receives the playback timing for the audio information (e.g., in the frame and/or packet headers of the frames and/or packets comprising the portions of the audio information or perhaps separately from the frames and/or packets comprising the portions of the audio information), (iii) receives the clock timing, and (iv) plays the portion(s) of the audio information in the individual frame (or packet) when the local clock that the receiving portable playback device uses for audio content playback reaches the playback time specified in the playback timing for that individual frame (or packet), as adjusted by a "timing offset."

In operation, after the receiving portable playback device receives clock timing, the receiving portable playback device determines a "timing offset" for the receiving portable playback device. This "timing offset" comprises (or at least corresponds to) a difference between the "reference" clock that was used to generate the clock timing and a "local" clock at the receiving portable playback device that the receiving portable playback device uses to play the audio content. In operation, each portable playback device that receives the clock timing from another device calculates its own "timing offset" based on the difference between its local clock and the clock timing, and thus, the "timing offset" that each portable playback device determines is specific to that particular portable playback device.

In some embodiments, when playing the audio content, the receiving portable playback device generates new playback timing (specific to the receiving portable playback device) for individual frames (or packets) of audio information by adding the previously determined "timing offset" to the playback timing for each received frame (or packet) comprising portions of audio information. With this approach, the receiving portable playback device converts the playback timing for the received audio information into "local" playback timing for the receiving portable playback device. Because each receiving portable playback device calculates its own "timing offset," each receiving portable playback device's determined "local" playback timing for an individual frame is specific to that particular portable playback device.

And when the "local" clock that the receiving portable playback device is using for playing back the audio content reaches the "local" playback time for an individual frame (or packet), the receiving portable playback device plays the audio information (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the audio content.

Because the receiving portable playback device plays frames (or packets) comprising portions of the audio information according to the playback timing as adjusted by the "timing offset" relative to the clock timing, and because the device providing the playback timing generated the playback timing for those frames (or packets) relative to the clock timing and (if applicable) plays the same frames (or packets) comprising portions of the audio information according to the playback timing and its determined "timing offset," the receiving portable playback device and the device that provided the playback timing (e.g., the group coordinator in some embodiments) play the same frames (or packets) comprising the same portions of the audio information in synchrony with each other, i.e., at the same time or at substantially the same time.

VI. Example Embodiments

The example embodiments described herein illustrate portable playback devices configured to, among other features, establish a WLAN via which to facilitate synchronous playback of audio content by several portable playback devices, join a WLAN established by another portable playback device, and play audio content in synchrony with one or more other portable playback devices via a WLAN established by a portable playback device.

Figure 7A:
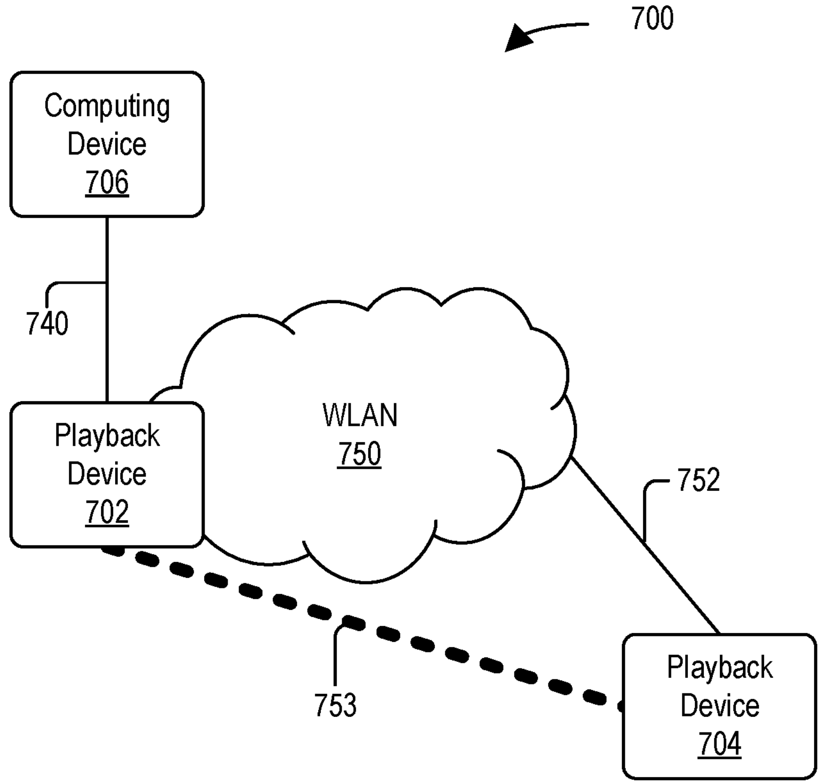
FIG. 7A shows an example configuration of a media playback system according to some embodiments.

FIG. 7A shows an example configuration of a media playback system 700 comprising portable playback devices 702, 704 configured to play audio content in synchrony with each other according to some embodiments.

The media playback system 700 includes portable playback devices 702 and 704. The portable playback devices 702 and 704 may be the same as or similar to any of the playback devices (and/or networked microphone devices) disclosed and described herein except that portable playback devices 702 and 704 are portable and can be powered via a standard electrical wall outlet or via rechargeable batteries.

Similar to other playback devices (and networked microphone devices) described herein, portable playback device 702 includes one or more network interfaces configured to facilitate communication over at least one Personal Area Network (PAN) and at least one Wireless Local Area Network (WLAN). Portable playback device 702 also includes one or more processors and tangible, non-transitory computer-readable media storing program instructions that are executable by the one or more processors to cause the playback device 702 to perform the playback device functions disclosed and described herein.

Likewise, portable playback device 704 also includes one or more network interfaces configured to facilitate communication over at least one Personal Area Network (PAN) and at least one Wireless Local Area Network (WLAN). Portable playback device 704 also includes one or more processors and tangible, non-transitory computer-readable media storing program instructions that are executable by the one or more processors to cause the portable playback device 704 to perform the portable playback device functions disclosed and described herein.

Most of the time, the portable playback devices 702 and 704 are connected to a WLAN with access to the Internet (e.g., at a home, office, etc.), referred to herein as the "home WLAN." When connected to the home WLAN, each of the portable playback devices can (i) communicate with other playback devices, portable playback devices, and computing devices on the home WLAN, and (ii) stream audio content from Internet sources via the home WLAN. Additionally, when connected to the home WLAN, the portable playback devices may frequently sit on a charging base or otherwise be connected to electrical power to (i) power the portable playback device and (ii) charge each portable playback device's rechargeable batteries.

In some embodiments, all of the playback devices (including portable playback devices) in a media playback system are associated with a system identifier for the media playback system. In operation, the system identifier may include a household identifier (HHID) and/or any other identifier known by all the playback devices of the media playback system. As explained below, in embodiments where the portable playback devices are associated with the system identifier for the media playback system, the portable playback devices can use the system identifier (e.g., a HHID or other identifier) in connection with (i) establishing an away-from-home WLAN, (ii) joining an away-from-home WLAN established by another portable playback device, and/or (iii) playing audio in synchrony with other portable playback devices while away from their home WLAN.

As discussed above, a conventional portable playback device is not able to play audio in synchrony with other portable playback devices while in an off-net location. For example, a user may only be able to playback audio via one portable playback device at a time when taking portable playback devices to a park, a backyard, or anywhere else where the portable playback devices are outside of the range of the home WLAN. Accordingly, the portable playback devices 702 and 704 shown in FIGS. 7A-7C address this shortcoming of conventional portable playback devices and provide for such a mechanism of synchronous playback.

In FIG. 7A, portable playback device 702 is configured to receive audio information from computing device 706 via a PAN link 740. The computing device 706 may comprise a smartphone, a tablet computer, a smart watch, or any other computing device now known or later developed that is capable of transmitting audio information to a playback device via a PAN link.

The PAN link may comprise Bluetooth (e.g., Bluetooth Classic, Bluetooth Low Energy, etc.) or any other type of link supported by any other type of PAN protocol now known or later developed that is capable of supporting the transmission of audio information.

In operation, the computing device 706 functions as an audio information source for the portable playback devices 702 and 704. As the audio information source, the computing device 706 can (i) transmit audio information that is stored locally on the computing device 706 from the computing device 706 to the portable playback device 702, and/or (ii) transmit audio information to the portable playback device 702 that the computing device is streaming (or has streamed) from an Internet-accessible source (e.g., Spotify, Pandora, etc.).

Once the PAN link 740 is established between the portable playback device 702 and the computing device 706, a user can indicate to the portable playback device 702 that the user wants to group the portable playback device 702 with another playback device (e.g., portable playback device 704) for groupwise playback. In some embodiments, the indication that the user wants to group the portable playback device 702 with another playback device comprises manipulation of the portable playback device 702 or any portion thereof (e.g., actuation of a physical button on the portable playback device 702, moving the playback device with a specific motion (e.g., shaking) as detected via an accelerometer, etc.). In some embodiments, the indication that the user wants to group the portable playback device 702 with another playback device comprises a message and/or command received by the portable playback device 702, e.g., a software message/command received from the computing device 706, a voice command spoken by the user and processed by the portable playback device 702, or any other type of indication now known or later developed that is suitable for indicating to the portable playback device 702 that a user wishes to group the portable playback device 702 with another playback device (e.g., portable playback device 704) for groupwise playback.

After receiving and/or detecting the indication that a user wishes to group the portable playback device 702 with another playback device for groupwise playback (and perhaps in response to receiving the indication), portable playback device 702 establishes WLAN 750.

In some embodiments, WLAN 750 comprises a WLAN that operates according a WiFi protocol, where the WLAN 750 has a service set identifier (SSID) and a password. In some embodiments, the portable playback device 702 may additionally operate as a routing gateway between the PAN link 740 and the WLAN 750, thereby allowing the computing device 706 to send/receive data (e.g., audio information, control signaling, or other data) to playback devices that join or otherwise connect to the WLAN 750, e.g., portable playback device 704.

In some embodiments, the SSID for WLAN 750 is based on a system identifier associated with the media playback system of which portable playback devices 702 and 704 are members. For example, in some embodiments, the SSID for WLAN 750 is the HHID of the media playback system. Alternatively, the SSID may include only a portion of the HHID of the media playback system. Alternatively, the SSID may comprise a hash of the HHID with another value that is known by both portable playback devices 702 and 704. In some embodiments, the SSID for the WLAN 750 can be any value known by both the portable playback devices 702 and 704 or any value that can be calculated or otherwise determined by portable playback devices 702 and 704 based on a number or other value that is known to both portable playback devices 702 and 704.

In some embodiments, a password for WLAN 750 is also based on the system identifier associated with the media playback system of which portable playback devices 702 and 704 are members. For example, in some embodiments, the password for WLAN 750 is the HHID of the media playback system. Alternatively, the password may include only a portion of the HHID of the media playback system. Alternatively, the password may comprise a hash of the HHID with another value that is known by both portable playback devices 702 and 704. For example, the password may comprise a hash of the HHID and the password of the home WLAN. In some embodiments, the password for the WLAN 750 can be any value known by both the portable playback devices 702 and 704 or any value that can be calculated or otherwise determined by portable playback devices 702 and 704 based on a number or other value that is known to both portable playback devices 702 and 704.

Once portable playback device 702 has established WLAN 750, one or more additional playback devices can join WLAN 750. In operation WLAN 750 performs substantially the same function as the home WLAN in terms of providing a network infrastructure via which portable playback devices can send/receive clock timing, audio information, and playback timing associated with the audio information for the purpose of playing audio in a groupwise fashion.

If the portable playback device 702 receives and/or detects the indication that a user wishes to group the portable playback device 702 with another playback device for groupwise playback, but the portable playback device 702 is not already connected to the computing device 706 (or some other computing device) via PAN link 740, then rather than establishing a WLAN (e.g., WLAN 750), the portable playback device 702 will instead search for a WLAN having the SSID based at least in part on the HHID (or other system identifier) of the media playback system.

For instance, in the example shown in FIG. 7A, the portable playback device 704 is not connected to a computing device via a PAN link. Therefore, when the portable playback device 704 receives and/or detects an indication that a user wishes to group the portable playback device 704 with another playback device for groupwise playback, then the portable playback device 704 searches for a WLAN having an SSID that is known to the portable playback device 704.

In the example shown in FIG. 7A, after the portable playback device 704 has received and/or detected an indication that a user wishes to group the portable playback device 704 with another playback device for groupwise playback (and/or perhaps in response to receiving and/or detecting such an indication), then the portable playback device 704 searches for the SSID of WLAN 750, which is based on the system identifier of the media playback system of which the portable playback device 704 is a member. Once the portable playback device 704 has detected WLAN 750 (based on the SSID), then the portable playback device 704 uses the password of WLAN 750 to connect to WLAN 750.

Because the SSID and the password of WLAN 750 are both already known (or at least readily determinable) by the portable playback device 704, the portable playback device 704 can join WLAN 750 without a user needing to enter WiFi network interface and/or login credentials in connection with connecting the portable playback device 704 to the WLAN 750. Instead, the portable playback device 704 can search for and join WLAN 750 after (or perhaps in response to) receiving the indication that the user wishes to group the portable playback device 704 with another playback device for groupwise playback.

As described above, the indication can comprise any one or more of (i) actuation of a physical switch/button (not shown) on portable playback device 704, (ii) receipt of a message and/or command from computing device 706 instructing portable playback device 704 to join WLAN 750, and/or (iii) receipt of a message and/or command from portable playback device 702 instructing portable playback device 704 to join WLAN 750.

In some scenarios, the portable playback device 704 may not be a member of the same media playback system as portable playback device 702. For example, the portable playback device 704 may belong to a different user and/or otherwise be a member of and/or associated with a different media playback system. In such a scenario, if the portable playback device 704 looks for an SSID based on the identifier (e.g., HHID or other identifier) of its media playback system, it will be looking for a different SSID than the SSID of WLAN 750. Therefore, in some embodiments, portable playback device 702 may be additionally or alternatively configured to transmit, broadcast, or otherwise advertise the SSID of WLAN 750 via a short range transmission. In some embodiments, portable playback device 702 may additionally transmit, broadcast, or otherwise advertise the password for WLAN 750 via short transmission as well. Other playback devices within proximity of the short range transmission can receive the short range transmission comprising the SSID for WLAN 750 (and the password too in some embodiments), and then use the SSID (and password) to join WLAN 750. The short range transmission may comprise any of a Bluetooth or Bluetooth Low Energy transmission, a Near Field Communication (NFC) bump, or any other short range wireless transmission now known or later developed that is suitable for sharing an SSID (and perhaps password, too) between and among playback devices.

In some embodiments, rather than sending the SSID and/or password for WLAN 750 via the short range transmission, portable playback device 702 may instead transmit one or messages comprising information that another playback device (e.g., portable playback device 704) can use to determine the SSID and/or password. For example, the portable playback device 702 may send information that can be used to determine the SSID and/or password based on a hash function known to all the playback devices, e.g., a hash function that is known by all playback devices from the same manufacturer.

After portable playback device 704 has joined WLAN 750, then portable playback device 702 and portable playback device 704 form a playback group (e.g., a synchrony group, stereo pair, bonded group, or other grouping) where portable playback device 702 functions as the group coordinator for the playback group and portable playback device 704 functions as a group member of the playback group.

For example, the portable playback device 702 (functioning as the group coordinator) obtains audio information from the computing device 706 via the PAN link 740 and distributes the audio information to portable playback device 704 (functioning as a group member) via WLAN 750 to portable playback device 704 via link 752. The audio information may be any of the various types of audio information from any of the various audio sources disclosed herein. In some embodiments, the portable playback device 702 (as the group coordinator) additionally generates and distributes playback timing for the audio information via WLAN 750 according to any of the playback timing generation and distribution methods disclosed herein. And in some embodiments, the portable playback device 702 (as the group coordinator) additionally generates and distributes clock timing to portable playback device 704 via WLAN 750 via any of the clock timing generation and distribution methods disclosed herein. In operation, portable playback device 702 and portable playback device 704 play audio content in synchrony with each other based on the clock timing, audio information, and playback timing information according to any of the synchronous playback methods disclosed and described herein.

In alternative embodiments, the computing device 706 may establish WLAN 750 instead of portable playback device 702. In such embodiments, the computing device 706 functions as a group coordinator for the playback group while portable playback device 702 and portable playback device 704 are group members of the playback group. In some embodiments, while the computing device 706 is performing the group coordinator function, the computing device transmits clock timing, audio information, and playback timing to portable playback devices 702 and 704, but the computing device 706 does not play audio content in a groupwise manner with portable playback devices 702 and 704.

In the alternative embodiments where the computing device 706 rather than the portable playback device 702 establishes WLAN 750, the computing device 706 may establish WLAN 750 after (or perhaps in response to) receiving an indication that a user wishes to group portable playback device 702 with one or more other playback devices into a playback group. In operation, the computing device 706 may receive such an indication from the portable playback device 702. For example, the portable playback device 702 may transmit such an indication to the computing device 706 after (or perhaps in response to) the actuation and/or activation of a button or switch (not shown) on portable playback device 702. The computing device 706 may alternatively receive such an indication via a user command received via a graphical user interface (GUI) of the computing device 706.

In some embodiments, if the playback group stops playing audio content for some period of time (e.g., playback has been paused), then one or both of the portable playback devices 702 and 704 may enter into a sleep mode. When portable playback device 702 enters into sleep mode, the portable playback device 702 also stops operating WLAN 750. Once WLAN 750 stops operating, then portable playback device 704 can no longer maintain a connection to WLAN 750 and will also stop operating as a group member of the playback group with portable playback device 702.

To facilitate a fast re-establishment of the playback group when playback of the audio content is un-paused (or resumed), the portable playback device 702 in some embodiments can transmit a "wake up" message to portable playback device 704 (and any other playback devices that were members of the playback group with portable playback device 702 before portable playback device 702 entered the sleep mode). After receiving the "wake up" message (or perhaps in response to receiving the "wake up" message) from portable playback device 702, portable playback device 704 rejoins WLAN 750 and starts operating as a group member of the playback group with portable playback device 702.

In some embodiments, portable playback device 702 transmits the "wake up" message to the portable playback device 704 (and any other playback devices that were in the playback group with portable playback device 702 before portable playback device 702 entered the sleep mode) via different transmission protocol than the protocol of WLAN 750. For example, for embodiments where WLAN 750 operates according to one or more WiFi protocols, portable playback device 702 may transmit the "wake up" message via Bluetooth, Bluetooth Low Energy, or another protocol suitable for transmitting "wake up" messages. In some embodiments, portable playback device 702 broadcasts a "wake up" message that all other playback devices within range of portable playback device 702 can receive and, if applicable, respond to by rejoining WLAN 750 and rejoining the playback group with portable playback device 702.

Recall from earlier that the playback devices can set up either a temporary WLAN or a peer-to-peer wireless link via which to form a playback group and distribute audio content and control signaling/information for playing the audio content together in a groupwise fashion.

Thus, in some embodiments, after portable playback device 702 receives an indication to operate in a synchrony group with at least portable playback device 704 while portable playback device 702 is connected to computing device 706 via PAN link 740 (and not connected to a WLAN), rather than establishing WLAN 750, portable playback device 702 instead establishes a connection with portable playback device 704 via a peer-to-peer wireless link 753 between portable playback device 702 and portable playback device 704.

And after establishing the connection with portable playback device 704 via the peer-to-peer wireless link 753 between portable playback device 702 and portable playback device 704, portable playback device 702 (*i*) streams audio content received via the PAN link 740 from portable playback device 702 to portable playback device 704 over the connection via the peer-to-peer wireless link 753, and (ii) plays the audio content in synchrony with portable playback device 704.

In some embodiments, the peer-to-peer wireless link 753 between portable playback device 702 and portable playback device 704 comprises at least one of a WiFi link, a WiFi Direct link (sometimes referred to as a WiFi Peer-to-Peer (P2P) link), any 802.11 protocol, or any other type of peer-to-peer wireless link now known or later developed that is suitable for transmitting and receiving the data (e.g., audio data and control data) required to facilitate playback of audio by portable playback device 702 and portable playback device 704 in a groupwise manner as described herein. In some embodiments, the peer-to-peer wireless link comprises a point-to-point link between two playback devices. In some embodiments, the peer-to-peer link comprises a point-to-multipoint link between one playback device and two or more other playback devices.

In some embodiments where the peer-to-peer wireless link 753 operates according a WiFi protocol, the peer-to-peer wireless link has a service set identifier (SSID) and a password required to establish a connection between portable playback device 702 and portable playback device 704. In some embodiments, portable playback device 702 may additionally operate as a routing gateway between the PAN link 740 and the peer-to-peer wireless link 753, thereby allowing the computing device 706 to send/receive data (e.g., audio information, control signaling, or other data) to portable playback device 704 via the peer-to-peer wireless link 753.

In some embodiments, the SSID for peer-to-peer wireless link 753 is based on a system identifier associated with the media playback system of which portable playback devices 702 and 704 are members. For example, in some embodiments, the SSID for peer-to-peer wireless link 753 is the HHID of the media playback system. Alternatively, the SSID may include only a portion of the HHID of the media playback system. Alternatively, the SSID may comprise a hash of the HHID with another value that is known by both portable playback devices 702 and 704. In some embodiments, the SSID for the peer-to-peer wireless link 753 can be any value known by both the portable playback devices 702 and 704 or any value that can be calculated or otherwise determined by portable playback devices 702 and 704 based on a number or other value that is known to both portable playback devices 702 and 704.

In some embodiments, a password for establishing a connection via the peer-to-peer wireless link 753 is also based on the system identifier associated with the media playback system of which portable playback devices 702 and 704 are members. For example, in some embodiments, the password is the HHID of the media playback system. Alternatively, the password may include only a portion of the HHID of the media playback system. Alternatively, the password may comprise a hash of the HHID with another value that is known by both portable playback devices 702 and 704. For example, the password may comprise a hash of the HHID and the password of the home WLAN. In some embodiments, the password can be any value known by both the portable playback devices 702 and 704 or any value that can be calculated or otherwise determined by portable playback devices 702 and 704 based on a number or other value that is known to both portable playback devices 702 and 704 by virtue of their both being associated with the same media playback system.

In some embodiments, when one or more additional playback devices are to join the playback group with the portable playback devices 702 and 704, portable playback device 702 may establish one or more corresponding connections with each of the one or more additional playback devices via one or more corresponding peer-to-peer wireless links between portable playback device 702 and each of the one or more additional playback devices, e.g., as separate point-to-point links or as a point-to-multipoint peer-to-peer network. In operation peer-to-peer wireless links between portable playback device 702 and other playback devices in a playback group perform substantially the same function as the home WLAN in terms of providing a network infrastructure via which portable playback devices can send/receive clock timing, audio information, and playback timing associated with the audio information for the purpose of playing audio in a groupwise fashion.

In peer-to-peer wireless link embodiments, if the portable playback device 702 receives and/or detects an indication that a user wishes to group the portable playback device 702 with another playback device for groupwise playback, but the portable playback device 702 is not already connected to the computing device 706 (or some other computing device) via PAN link 740, then rather than establishing a peer-to-peer wireless link with portable playback device 704, the portable playback device 702 will instead search for a peer-to-peer wireless link having an SSID based at least in part on the HHID (or other system identifier) of the media playback system.

For instance, in the example shown in FIG. 7A, the portable playback device 704 is not connected to a computing device via a PAN link. Therefore, in peer-to-peer wireless link embodiments, when the portable playback device 704 receives and/or detects an indication that a user wishes to group the portable playback device 704 with another playback device for groupwise playback, then the portable playback device 704 searches for a peer-to-peer wireless having an SSID that is known to the portable playback device 704.

In the example shown in FIG. 7A, after the portable playback device 704 has received and/or detected an indication that a user wishes to group the portable playback device 704 with another playback device for groupwise playback (and/or perhaps in response to receiving and/or detecting such an indication), then the portable playback device 704 searches for a peer-to-peer wireless link having a SSID that is based on the system identifier of the media playback system of which the portable playback device 704 is a member. Once the portable playback device 704 has detected or otherwise determined that it can establish a connection with portable playback device 702 via a peer-to-peer wireless link having the known SSID), then the portable playback device 704 uses a known password to establish a connection with portable playback device 702 via peer-to-peer wireless link 753. For example, and as explained earlier, the known password may be based on any one or more of the HHID, the password for the home WLAN, at least a portion of the HHID, at least a portion of the password of the home WLAN, a hash of the HHID, a hash of the password of the home WLAN, or any other data that is known by or can be determined by the portable playback devices 702 and 704.

Because the SSID and the password for creating a connection via the peer-to-peer wireless link 753 are both already known (or at least readily determinable) by the portable playback device 704, the portable playback device 704 can establish a connection with portable playback device 702 via the peer-to-peer wireless link 753 without a user needing to enter wireless link configuration details and/or login credentials in connection with establishing the connection between portable playback device 704 and portable playback device 702 via peer-to-peer wireless link 753. Instead, the portable playback device 704 can search for the SSID associated with the peer-to-peer wireless link 753 and establish a connection with portable playback device 702 via peer-to-peer wireless link 753 after (or perhaps in response to) receiving the indication that the user wishes to group the portable playback device 704 with portable playback device 702 for groupwise playback.

As described above, the indication can comprise any one or more of (i) actuation of a physical switch/button (not shown) on portable playback device 704, (ii) receipt of a message and/or command from computing device 706 instructing portable playback device 704 to join a playback group in general or with portable playback 702 in particular, and/or (iii) receipt of a message and/or command from portable playback device 702 instructing portable playback device 704 to establish a connection with portable playback device 702 via peer-to-peer wireless link 753.

In some scenarios, the portable playback device 704 may not be a member of the same media playback system as portable playback device 702. For example, the portable playback device 704 may belong to a different user and/or otherwise be a member of and/or associated with a different media playback system. In such a scenario, if the portable playback device 704 looks for an SSID based on the identifier (e.g., HHID or other identifier) of its media playback system, it will be looking for a different SSID than the SSID required for establishing a connection with portable playback device 702 via peer-to-peer wireless link 753. Therefore, in some embodiments, portable playback device 702 may be additionally or alternatively configured to transmit, broadcast, or otherwise advertise the SSID for peer-to-peer wireless link 753 via a short range transmission. In some embodiments, portable playback device 702 may additionally transmit, broadcast, or otherwise advertise the password required for establishing a connection via peer-to-peer wireless link 753 via short transmission as well. Other playback devices within proximity of the short range transmission can receive the short range transmission comprising the SSID for peer-to-peer wireless link 753 (and the password too in some embodiments), and then use the SSID (and password) to establish a connection via peer-to-peer wireless link 753. The short range transmission may comprise any of a Bluetooth or Bluetooth Low Energy transmission, a Near Field Communication (NFC) bump, or any other short range wireless transmission now known or later developed that is suitable for sharing an SSID (and perhaps password, too) between and among playback devices.

In some embodiments, rather than sending the SSID and/or password for peer-to-peer wireless link 753 via the short range transmission, portable playback device 702 may instead transmit one or messages comprising information that another playback device (e.g., portable playback device 704) can use to determine the SSID and/or password. For example, the portable playback device 702 may send information that can be used to determine the SSID and/or password based on a hash function known to all the playback devices, e.g., a hash function that is known by all playback devices from the same manufacturer.

After portable playback device 704 has joined established a connection with portable playback device 702 via peer-to-peer wireless link 753, then portable playback device 702 and portable playback device 704 form a playback group (e.g., a synchrony group, stereo pair, bonded group, or other grouping) where portable playback device 702 functions as the group coordinator for the playback group and portable playback device 704 functions as a group member of the playback group.

For example, the portable playback device 702 (functioning as the group coordinator) obtains audio information from the computing device 706 via the PAN link 740 and transmits the audio information to portable playback device 704 (functioning as a group member) via peer-to-peer wireless link 753. The audio information may be any of the various types of audio information from any of the various audio sources disclosed herein. In some embodiments, the portable playback device 702 (as the group coordinator) additionally generates and transmits playback timing for the audio information via peer-to-peer wireless link 753 according to any of the playback timing generation and distribution methods disclosed herein. And in some embodiments, the portable playback device 702 (as the group coordinator) additionally generates and transmits clock timing to portable playback device 704 via peer-to-peer wireless link 753 via any of the clock timing generation and distribution methods disclosed herein. In operation, after establishing the connection between portable playback device 702 and portable playback device 702 via peer-to-peer wireless link 753, portable playback device 702 and portable playback device 704 play audio content in synchrony with each other based on the clock timing, audio information, and playback timing information according to any of the synchronous playback methods disclosed and described herein.

In alternative embodiments, the computing device 706 may establish peer-to-peer wireless links with each of portable playback device 702 and portable playback device 704 instead of portable playback device 702 establishing peer-to-peer wireless link 753 with portable playback device 704. In such embodiments, the computing device 706 functions as a group coordinator for the playback group while portable playback device 702 and portable playback device 704 are group members of the playback group. In some embodiments, while the computing device 706 is performing the group coordinator function, the computing device transmits clock timing, audio information, and playback timing (i) to portable playback device 702 via a first peer-to-peer wireless link between computing device 706 and portable playback device 702 and (i) to portable playback device 704 via a first peer-to-peer wireless link between computing device 706 and portable playback device 704. However, the computing device 706 may not play audio content in a groupwise manner with portable playback devices 702 and 704.

In the alternative embodiments where the computing device 706 rather than the portable playback device 702 establishes peer-to-peer wireless links for supporting the playback group, the computing device 706 may establish the peer-to-peer wireless links after (or perhaps in response to) receiving an indication that a user wishes to group portable playback device 702 with one or more other playback devices into a playback group. In operation, the computing device 706 may receive such an indication from the portable playback device 702. For example, the portable playback device 702 may transmit such an indication to the computing device 706 after (or perhaps in response to) the actuation and/or activation of a button or switch (not shown) on portable playback device 702. The computing device 706 may alternatively receive such an indication via a user command received via a graphical user interface (GUI) of the computing device 706.

In some embodiments, if the playback group stops playing audio content for some period of time (e.g., playback has been paused), then one or both of the portable playback devices 702 and 704 may enter into a sleep mode. When portable playback device 702 enters into a sleep mode, the portable playback device 702 also terminates the connection between portable playback device 702 and portable playback device 704 via peer-to-peer wireless link 753. Once the peer-to-peer wireless link 753 has been terminated, then portable playback device 704 can no longer maintain a connection to WLAN 750 and will also stop operating as a group member of the playback group with portable playback device 702.

To facilitate a fast re-establishment of the playback group when playback of the audio content is un-paused (or resumed), the portable playback device 702 in some embodiments can transmit a “wake up” message to portable playback device 704 (and any other playback devices that were members of the playback group with portable playback device 702 before portable playback device 702 entered the sleep mode). After receiving the “wake up” message (or perhaps in response to receiving the “wake up” message) from portable playback device 702, portable playback device 704 and portable playback device 702 reestablish the connection via peer-to-peer wireless link 753. After the connection has been reestablished via peer-to-peer link 753, portable playback device 704 resumes operating as a group member of the playback group with portable playback device 702.

In some embodiments, portable playback device 702 transmits the "wake up" message to the portable playback device 704 (and any other playback devices that were in the playback group with portable playback device 702 before portable playback device 702 entered the sleep mode) via different transmission protocol than the protocol of the peer-to-peer wireless link 753. For example, for embodiments where the peer-to-peer wireless link 753 operates according to one or more WiFi protocols, portable playback device 702 may transmit the "wake up" message via Bluetooth, Bluetooth Low Energy, or another protocol suitable for transmitting "wake up" messages. In some embodiments, portable playback device 702 broadcasts a "wake up" message that all other playback devices within range of portable playback device 702 can receive and, if applicable, respond to by reestablishing peer-to-peer wireless links with playback device 702 and rejoining the playback group with portable playback device 702 operating as the group coordinator for the playback group.

Figure 7B:
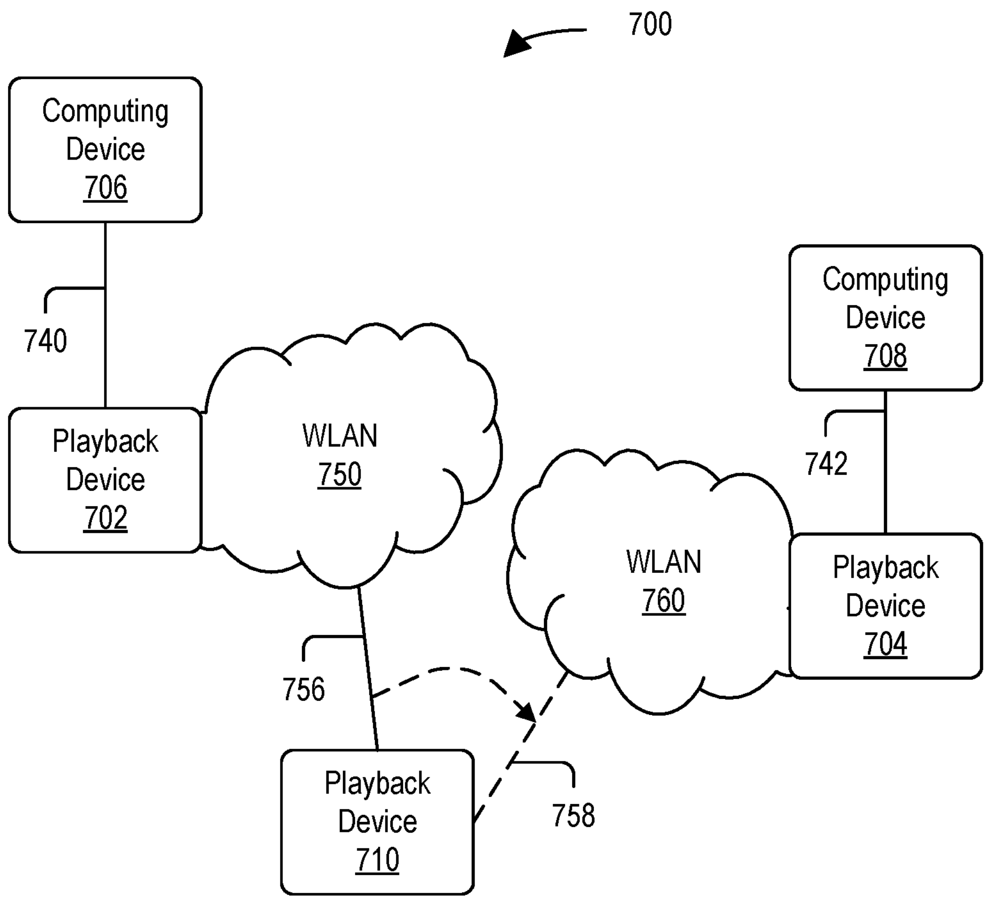
FIG. 7B shows an example configuration of a media playback system according to some embodiments.

FIG. 7B shows the example media playback system of FIG. 7A with the addition of computing device 708 and portable playback device 710 to illustrate additional aspects of disclosed embodiments in certain scenarios. In this example, portable playback devices 702, 704, and 710 are all members of the same media playback system, and all of the portable playback devices 702, 704, and 710 are operating in an area outside the range of their home WLAN (i.e., all of the portable playback devices are in an off-net location).

Portable playback device 710 is the same as or similar to portable playback devices 702 and 704, or at least operates in the same or substantially the same manner as portable playback devices 702 and 704 in terms of forming and joining playback groups and playing audio content in a groupwise manner with other playback devices.

In particular, if portable playback device 710 is connected to a computing device via a PAN link when the portable playback device 710 receives and/or detects an indication that a user wishes to group the portable playback device 710 with one or more other playback devices into a playback group for groupwise playback, then (like portable playback devices 702 and 704) portable playback device 710 will (i) establish a WLAN (or perhaps one or more peer-to-peer wireless links as described above) to facilitate playback group formation and groupwise (including synchronous) playback, where the WLAN (or peer-to-peer wireless link(s)) has an SSID based on the system identifier (e.g., an HHID or other identifier) of the media playback system of which portable playback device 710 is a member, and (ii) begin operating as a group coordinator for the playback group. But if portable playback device 710 is not connected to a computing device via a PAN link when the portable playback device 710 receives and/or detects an indication that a user wishes to group the portable playback device 710 with one or more other playback devices into a playback group for groupwise playback, then (like portable playback devices 702 and 704), portable playback device 710 will instead (i) search for a WLAN (or peer-to-peer wireless link) having the SSID based on the system identifier of the media playback system of which portable playback device 710 is a member, and (ii) after joining a WLAN (or establishing a connection with another playback device via a peer-to-peer wireless link), begin operating as a group member of the playback group.

In the example scenario shown in FIG. 7B, portable playback device 702 is connected to computing device 706 via PAN link 740 and has established WLAN 750. Portable playback device 702 may also be playing audio content based on audio information received from computing device 706 via PAN link 740. Additionally, portable playback device 704 is connected to computing device 708 via PAN link 742 and has established WLAN 760. Portable playback device 704 may also be playing audio content based on audio information received from computing device 706 via PAN link 742. In this example scenario, PAN link 742 operates in same or substantially the same manner as PAN link 740, and WLAN 760 operates in the same or substantially the same manner as WLAN 750.

The example scenario shown in FIG. 7B, because portable playback device 702 and portable playback device 704 are both members of the same media playback system, the SSID for WLAN 750 established by portable playback device 702 is the same as the SSID for WLAN 760 established by portable playback device 704.

In this instance, after the portable playback device 710 receives and/or detects an indication that a user wishes to group the portable playback device 710 with one or more other playback devices into a playback group for groupwise playback (or perhaps in response to receiving and/or detecting the indication), portable playback device 710 searches for a WLAN having an SSID based on the identifier (e.g., HHID or other identifier) associated with the media playback system of which portable playback device 710 is member. And because portable playback device 710 is a member of the same media playback system as portable playback devices 702 and 704, portable playback device 710 will search for the SSID that is common to WLAN 750 and WLAN 760.

After searching for a WLAN having the SSID based on the identifier associated with the media playback system and identifying both WLAN 750 and WLAN 760, portable playback device 710 selects one of WLAN 750 or WLAN 760 to join. In some embodiments, the portable playback device 710 may randomly select one of WLAN 750 or WLAN 760 to join. In some embodiments, portable playback device 710 may select the WLAN having the better wireless signal characteristics (e.g., higher receive power, best signal-to-noise ratio, etc.). Portable playback device 710 may alternatively select one of WLAN 750 or WLAN 760 based on other considerations or combinations of considerations, e.g., which WLAN the portable playback device 710 joined most recently, which playback device (of portable playback devices 702 and 704) the portable playback device 710 was most recently grouped with, individually or in combination with other factors.

In the example scenario shown in FIG. 7B, portable playback device 710 initially selects WLAN 750 to join first. After joining WLAN 750 and beginning to operate as a group member in a playback group with portable playback device 702, portable playback device 710 (*i*) receives audio information from portable playback device 702 via link 756 and (ii) plays audio content based on the audio information in a groupwise fashion with portable playback device 702, e.g., in synchrony with portable playback device 702.

If the audio content that portable playback device 710 starts playing is different than what the user expected, the user can cause the portable playback device 710 to switch to WLAN 760 instead. In some embodiments where the indication to join the portable playback device 710 with one or more other playback devices in a playback group comprises actuation or activation of a button or switch (not shown) on portable playback device 710, a second actuation or activation of that same button or switch on portable playback device 710 causes the portable playback device 710 to leave WLAN 750 and connect to WLAN 760.

In some embodiments where the first actuation or activation comprises a button press on the portable playback device 710, the second actuation or activation comprises a button press having a longer duration than the first button press. For example, the user presses and holds the button pressed down on the portable playback device 710 longer to cause the portable playback device 710 to switch to a different WLAN as compared to the initial button press to cause the portable playback device 710 to search for and join a WLAN in the first instance. However, in other embodiments, the duration of the button press to search for and join a WLAN in the first instance need not be shorter or longer than the duration of the button press to switch to a different WLAN.

Leaving WLAN 750 necessarily causes portable playback device 710 to stop operating as a group member in the playback group with portable playback device 702. After joining WLAN 760 and beginning to operate a group member in a playback group with portable playback device 704, portable playback device 710 (*i*) receives audio information from portable playback device 704 via link 758 and (ii) plays audio content based on the audio information in a groupwise fashion with portable playback device 704, e.g., in synchrony with portable playback device 704.

In alternative embodiments where the playback devices use peer-to-peer wireless links to configure playback groups and distribute audio and control information/signaling for playing audio together in a groupwise fashion, the portable playback device 710 can switch between multiple peer-to-peer wireless links having the same SSID in substantially the same way that the portable playback device 710 shown in FIG. 7B is described as switching between two WLANs having the same SSID. Additional aspects of this functionality are described in more detail with reference to methods 1000 and 1100 shown and described with reference to FIGS. 10 and 11.

Figure 7C:
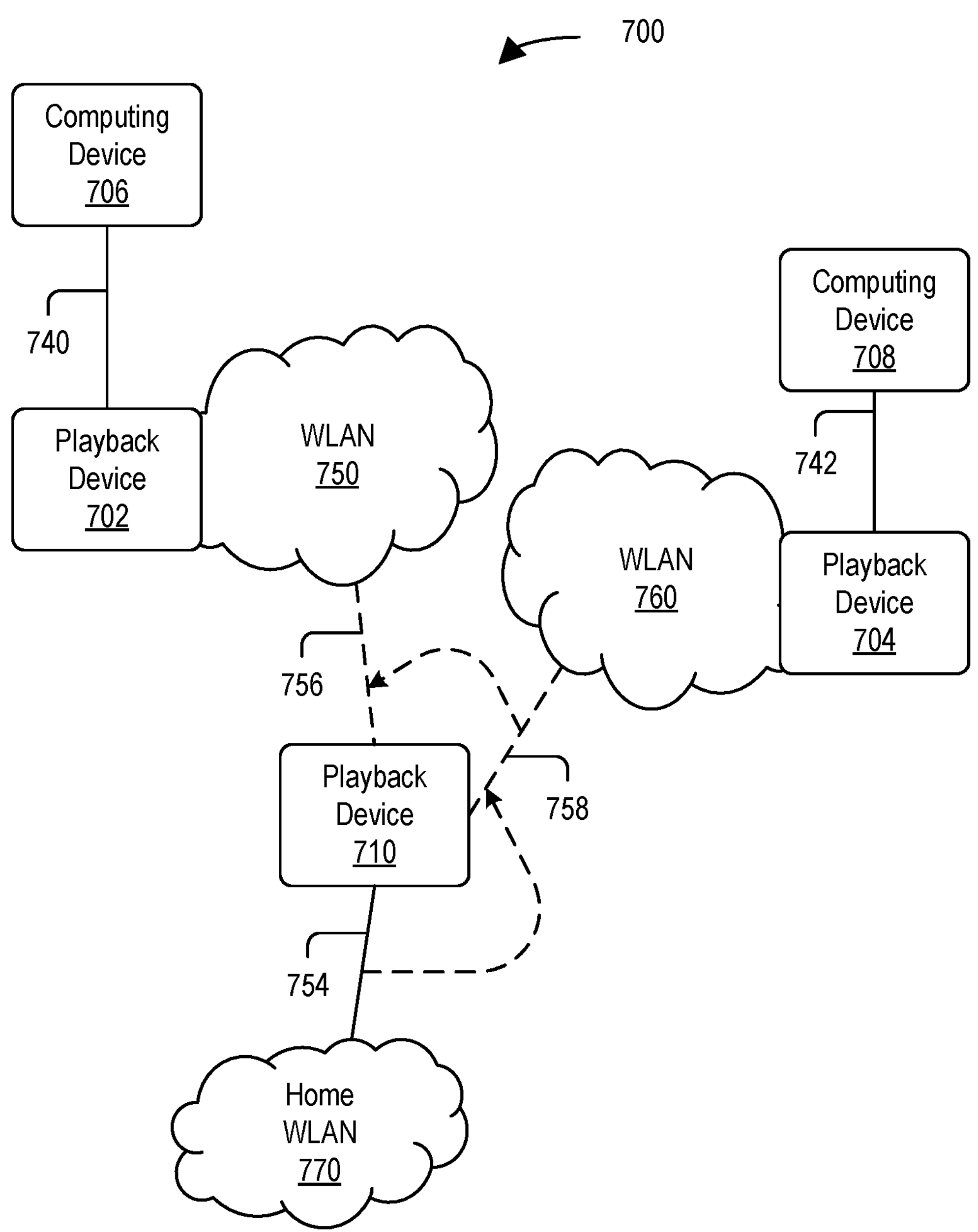
FIG. 7C shows an example configuration of a media playback system according to some embodiments.

FIG. 7C shows the example media playback system of FIGS. 7A and 7B with the addition of Home WLAN 770 to illustrate additional aspects of disclosed embodiments in certain scenarios. In FIG. 7C, portable playback devices 702 and 704 are operating in an area outside the range of their Home WLAN 770. But unlike the scenario in FIG. 7B, portable playback device 710 in FIG. 7C is operating in an area that is within range of the Home WLAN 770. This scenario could occur when a user has taken the portable playback devices 702, 704, and 710 into a backyard where portable playback devices 702 and 704 are out of range of the Home WLAN 770 but portable playback device 710 is still close enough to the house to still be within range of the Home WLAN 770.

In some embodiments, if portable playback device 710 is not connected to a computing device via a PAN link when the portable playback device 710 receives and/or detects an indication that a user wishes to group the portable playback device 710 with one or more other playback devices into a playback group for groupwise playback, then (like portable playback devices 702 and 704), portable playback device 710 will search for a WLAN having a known SSID. In some embodiments, portable playback devices may be configured to prioritize the SSID of the Home WLAN 770 over an SSID based on the system identifier (e.g., HHID or other identifier) of the media playback system of which portable playback device 710 is member.

In this instance, after the portable playback device 710 receives and/or detects a first indication that a user wishes to group the portable playback device 710 with one or more other playback devices into a playback group for groupwise playback (or perhaps in response to receiving and/or detecting the first indication), portable playback device 710 searches for and joins Home WLAN 770. After joining Home WLAN 770, the portable playback device 710 can receive audio information from other playback devices or audio sources via link 754.

If, after joining WLAN 770, the portable playback device 710 is either not playing audio content or playing audio content that is different than what the user expected, then the user can command the portable playback device 710 to switch to a different WLAN by, e.g., actuating or activating a switch or button (not shown) on the portable playback device 710, issuing a voice command, or otherwise causing the portable playback device 710 to receive a second indication, message, or command to switch to a different WLAN.

After receiving the second indication (or perhaps in response to receiving the second indication), the portable playback device 710 searches for a WLAN having an SSID based on the identifier (e.g., HHID or other identifier) associated with the media playback system of which portable playback device 710 is member. And because portable playback device 710 is a member of the same media playback system as portable playback devices 702 and 704, portable playback device 710 will search for the SSID that is common to both WLAN 750 and WLAN 760.

After searching for a WLAN having the SSID based on the identifier associated with the media playback system and identifying WLAN 750 and WLAN 760, portable playback device 710 selects one of WLAN 750 or WLAN 760 to join. In some embodiments, portable playback device 710 may select the WLAN having the better wireless signal characteristics (e.g., higher receive power, best signal-to-noise ratio, etc.). Portable playback device 710 may alternatively select one of WLAN 750 or WLAN 760 based on other considerations or combinations of considerations, e.g., which WLAN the portable playback device 710 joined most recently, which playback device (of portable playback devices 702 and 704) the portable playback device 710 was most recently grouped with, individually or in combination with other factors.

In the example scenario shown in FIG. 7C, portable playback device 710 selects WLAN 760 to join first after leaving Home WLAN 770. After joining WLAN 760 and beginning to operate a group member in a playback group with portable playback device 704, portable playback device 710 (*i*) receives audio information from portable playback device 704 via link 758 and (ii) plays audio content based on the audio information in a groupwise fashion with portable playback device 704, e.g., in synchrony with portable playback device 704.

If the audio content that portable playback device 710 is playing is still different than what the user expected, then the user can cause the portable playback device 710 to switch from WLAN 760 to WLAN 750 by causing the portable playback device 710 to receive or detect a third indication to change its playback grouping. In some embodiments where the indication comprises actuation or activation of a button or switch (not shown) on portable playback device 710, a third actuation or activation of that button or switch on portable playback device 710 causes the portable playback device 710 to leave WLAN 760 and connect to WLAN 750. Leaving WLAN 760 necessarily causes portable playback device 710 to stop operating as a group member in the playback group with portable playback device 704. After joining WLAN 750 and beginning to operate a group member in a playback group with portable playback device 702, portable playback device 710 (*i*) receives audio information from portable playback device 702 via link 756 and (ii) plays audio content based on the audio information in a groupwise fashion with portable playback device 702, e.g., in synchrony with portable playback device 702.

In alternative embodiments where the playback devices use peer-to-peer wireless links to configure playback groups and distribute audio and control information/signaling for playing audio together in a groupwise fashion, the portable playback device 710 can switch between multiple peer-to-peer wireless links having the same SSID in substantially the same way that the portable playback device 710 shown in FIG. 7C is described as switching between two WLANs having the same SSID. Additional aspects of this functionality are described in more detail with reference to methods 1000 and 1100 shown and described with reference to FIGS. 10 and 11.

VII. Example Methods

FIG. 8 shows an example method 800 performed by a portable playback device according to some embodiments. In operation, method 800 comprises steps performed by a portable playback device configured to operate as a group coordinator for a playback group. Any playback device can function as a group coordinator or a group member in a playback group. Accordingly, the method 800 can be performed by any of the playback devices shown and described herein, including but not limited to portable playback devices 702, 704, and/or 710.

Method 800 begins at block 802, which includes a first portable playback device, after receiving an indication to operate in a playback group while the first portable playback device is connected to a network device via a PAN and not connected to a first WLAN, the first portable playback establishing a second WLAN for the playback group. In some embodiments, the playback group comprises any of a synchrony group, a stereo pair, a bonded group, or any other grouping of playback devices for groupwise playback of audio content, including but not limited synchronous playback of audio content. In some embodiments, the PAN connection comprises a Bluetooth connection, and at least one of the first WLAN or the second WLAN comprises a WLAN operating according to one or more 802.11 or other WiFi protocols.

In some embodiments, the first portable playback device comprises at least one physical input (e.g., a physical button or switch), and the indication to operate in the synchrony group comprises a manual actuation or activation of the physical input by a user. In some embodiments, the indication to operate in the synchrony group comprises a command received from at least one of (i) the network device, (ii) another playback device, or (iii) a controller configured to control the first portable playback device. In some embodiments, the network device is configured to function as a controller to control the first portable playback device.

In some embodiments, the WLAN operated by the first portable playback device has a Service Set Identifier (SSID) known by the second portable playback device and a password known by the second portable playback device. For example, in some embodiments, the first portable playback device and the second portable playback device are associated with a common identifier, and least one of (i) an SSID for the second WLAN operated by the first portable playback device is based at least in part on the common identifier or (ii) a password for the second WLAN operated by the first portable playback device is based at least in part on the common identifier. In some embodiments, the common identifier comprises or includes a Household Identifier (HHID) or other identifier known by both the first and second portable playback devices.

In some embodiments where the first portable playback device and the second portable playback device may not be members of the same media playback system (or otherwise not know a common identifier), method 800 advances to optional block 804, which includes after receiving the indication to operate in the playback group, the first portable playback device transmitting, broadcasting, or otherwise advertising, via a transmission protocol that is different than a transmission protocol of the second WLAN, at least one of (i) an indication of an SSID for the second WLAN operated by the first portable playback device, (ii) an indication of a password for the second WLAN operated by the first portable playback device, (iii) information that a portable playback device can use to determine the SSID for the second WLAN operated by the first portable playback device, or (iv) information that a portable playback device can use to determine the password for the second WLAN operated by the first portable playback device.

After block 802 (or after block 804 in some embodiments), method 800 advances to block 806, which includes after a second portable playback device has joined the second WLAN operated by the first portable playback device, the first portable playback device (i) streaming audio content received via the PAN connection from the first network device to the second portable playback device via the second WLAN operated by the first portable playback device, and (ii) playing the audio content in synchrony with the second portable playback device.

In some embodiments, streaming audio content received via the PAN connection from the first network device to the second portable playback device via the second WLAN operated by the first portable playback device at block 806 includes: (A) extracting encoded audio data corresponding to the audio content from a first stream of frames received via the PAN connection from the network device, wherein an individual packet in the first stream of frames has a first format; (B) generating a second stream of frames, wherein an individual frame in the second stream of frames has a second format, and wherein the second stream of frames comprises (i) portions of the audio data extracted from the first stream of frames, and (ii) playback timing information for the audio data extracted from the first stream of frames; and (C) transmitting the second stream of frames comprising the audio data and the playback timing information for the audio data to the second portable playback device. And in some embodiments, playing the audio content in synchrony with the second portable playback device at block 806 includes using the playback timing information to play the portions of the encoded audio data extracted from the first stream of frames in synchrony with playback of the audio content by the second portable playback device.

In some embodiments, method 800 next advances to optional method block 808, which includes after a defined period of time has elapsed since ceasing playing the audio content received from the network device in synchrony with the second portable playback device, the first portable playback device discontinuing operating the second WLAN for the playback group.

Next, method 800 in some embodiments advances to optional block 810, which includes after receiving an indication to resume playing audio content received from the network device in the playback group with the second portable playback device, the first portable playback device: (i) resuming operating the second WLAN for the playback group, and (ii) via a transmission protocol that is different than a transmission protocol of the second WLAN, transmitting an instruction for the second portable playback device to rejoin the second WLAN operated by the first portable playback device.

Next method 800 in some embodiments advances to block 812, which includes after the second portable playback device has rejoined the second WLAN operated by the first portable playback device, the first portable playback device (i) streaming audio content received via the PAN connection from the network device to the second portable playback device via the second WLAN operated by the first portable playback device, and (ii) playing the audio content in synchrony with the second portable playback device.

Figure 9:
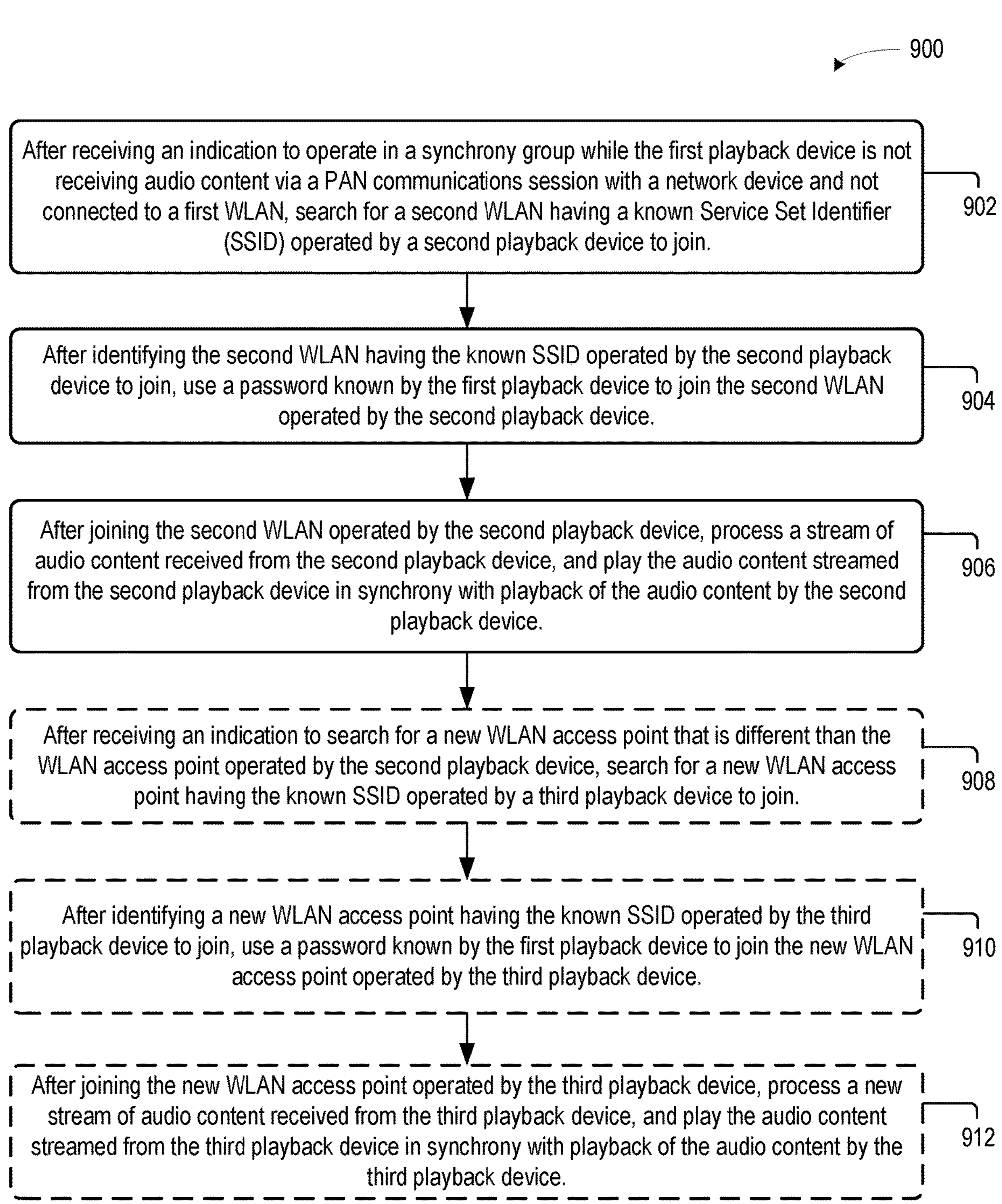
FIG. 9 shows an example method according to some embodiments.

FIG. 9 shows an example method 900 performed by a portable playback device according to some embodiments. In contrast to method 800, which comprises steps performed by a portable playback device configured to operate as a group coordinator for a playback group, method 900 comprises steps performed by a portable playback device configured to operate as a group member of a playback group. Any playback device can function as a group coordinator or a group member in a playback group. Accordingly, the method 900 can be performed by any of the playback devices shown and described herein, including but not limited to portable playback devices 702, 704, and/or 710.

Method 900 begins at block 902, which includes a first portable playback device, after receiving an indication to operate in a playback group while the first portable playback device is not receiving audio content via a PAN communications session with a network device and not connected to a first WLAN, the first portable playback device searching for a second WLAN having a known Service Set Identifier (SSID) operated by a second portable playback device to join. In some embodiments, searching for a WLAN access point having a known Service Set Identifier (SSID) operated by a second portable playback device to join at block 902 includes, when the first portable playback device has detected two or more WLAN access points having the same known SSID, either (i) randomly selecting one of the two or more WLAN access points as the WLAN access point to join, or (ii) selecting one of the two or more WLAN access points having the best WLAN signal conditions as the WLAN access point to join.

In some embodiments, the playback group comprises any of a synchrony group, a stereo pair, a bonded group, or any other grouping of playback devices for groupwise playback of audio content, including but not limited synchronous playback of audio content. In some embodiments, the PAN connection comprises a Bluetooth connection, and at least one of the first WLAN or the second WLAN comprises a WLAN operating according to one or more 802.11 or other WiFi protocols.

In some embodiments, the first portable playback device comprises at least one physical input (e.g., a physical button or switch), and the indication to operate in the synchrony group comprises a manual actuation or activation of the physical input by a user. In some embodiments, the indication to operate in the synchrony group comprises a command received from at least one of (i) the network device, (ii) another playback device, or (iii) a controller configured to control the first portable playback device. In some embodiments, the network device is configured to function as a controller to control the first portable playback device.

In some embodiments, the WLAN access point operated by the second portable playback device has a Service Set Identifier (SSID) known by the first portable playback device and a password known by the first portable playback device. For example, in some embodiments, the first portable playback device and the second portable playback device are associated with a common identifier, and at least one of (i) the SSID for the WLAN access point operated by the second portable playback device is based at least in part on the common identifier or (ii) the password for the WLAN access point operated by the second portable playback device is based at least in part on the common identifier.

But in some embodiments where the first portable playback device and the second portable playback device may not be members of the same media playback system (or otherwise not know a common identifier), method 900 may additionally include the first portable playback device: (A) before searching for a WLAN access point having a known SSID operated by the second portable playback device, the first portable playback device determining, based on data received via a transmission protocol that is different than a transmission protocol of the WLAN access point, the SSID of the WLAN access point operated by the second portable playback device based on at least one of (i) an indication of the SSID for the WLAN access point operated by the second portable playback device, or (ii) information that the first portable playback device can use to determine the SSID for the WLAN access point operated by the first portable playback device; and (B) before using the password known by the first portable playback device to join the WLAN access point operated by the second portable playback device, determining, based on data received via a transmission protocol that is different than a transmission protocol of the WLAN access point, the password for the WLAN access point operated by the second portable playback device based on at least one of (i) an indication of the password for the WLAN access point operated by the second portable playback device, and (ii) information that the first portable playback device can use to determine the password for the WLAN access point operated by the second portable playback device.

Next, method 900 advances to block 904, which includes the first portable playback device, after identifying the second WLAN having the known SSID operated by the second portable playback device to join, the first portable playback device using a password known by the first portable playback device to join the second WLAN operated by the second portable playback device.

Next, method 900 advances to block 906, which includes after joining the second WLAN operated by the second portable playback device, the first portable playback device (i) processing a stream of audio content received from the second portable playback device, and (ii) playing the audio content streamed from the second portable playback device in synchrony with playback of the audio content by the second portable playback device. In some embodiments, block 906 includes the first portable playback device: (A) receiving a stream of frames from the second portable playback device, wherein the stream of frames comprises (i) portions of audio data that the second portable playback device extracted from a content stream received from the network device, and (ii) playback timing information generated by the second portable playback device for the portions of audio data that the second portable playback device extracted from the content stream received from the network device; and (B) playing individual portions of audio data in synchrony with playback of the individual portions of audio data by the second portable playback device based on the playback timing information for the individual portions of audio data received from the second portable playback device.

After block 906, in some embodiments, method 900 advances to optional block 908, which includes after receiving an indication to search for a new WLAN access point that is different than the WLAN access point operated by the second playback device, the first portable playback device searching for a new WLAN access point having the known SSID operated by a third portable playback device to join.

After block 908, method 900 in some embodiments advances to optional block 910, which includes after identifying a new WLAN access point having the known SSID operated by the third portable playback device to join, the first portable playback device using a password known by the first portable playback device to join the new WLAN access point operated by the third portable playback device.

Next, after block 910, method 900 in some embodiments advances to optional block 912, which includes after joining the new WLAN access point operated by the third portable playback device, the first portable playback device: (i) processing a new stream of audio content received from the third portable playback device, and (ii) playing the audio content streamed from the third portable playback device in synchrony with playback of the audio content by the third portable playback device.

In some embodiments, method 900 additionally includes the first portable playback device: (A) after a defined period of time has elapsed since ceasing playing the audio content in synchrony with the second portable playback device, disconnecting from the WLAN access point operated by the second portable playback device; and (B) after receiving, via a transmission protocol that is different than a transmission protocol of the WLAN access point, an instruction for the first portable playback device to rejoin the WLAN access point operated by the second portable playback device, (i) searching for a WLAN access point having the known SSID operated by the second portable playback device, (ii) after identifying a WLAN access point having the known SSID operated by the second portable playback device, using the password known by the first portable playback device to join the WLAN access point operated by the second portable playback device, and (iii) after joining the WLAN access point operated by the second portable playback device, processing a new stream of audio content received from the second portable playback device, and play the new audio content streamed from the second portable playback device in synchrony with playback of the new audio content by the second portable playback device.

Figure 10:
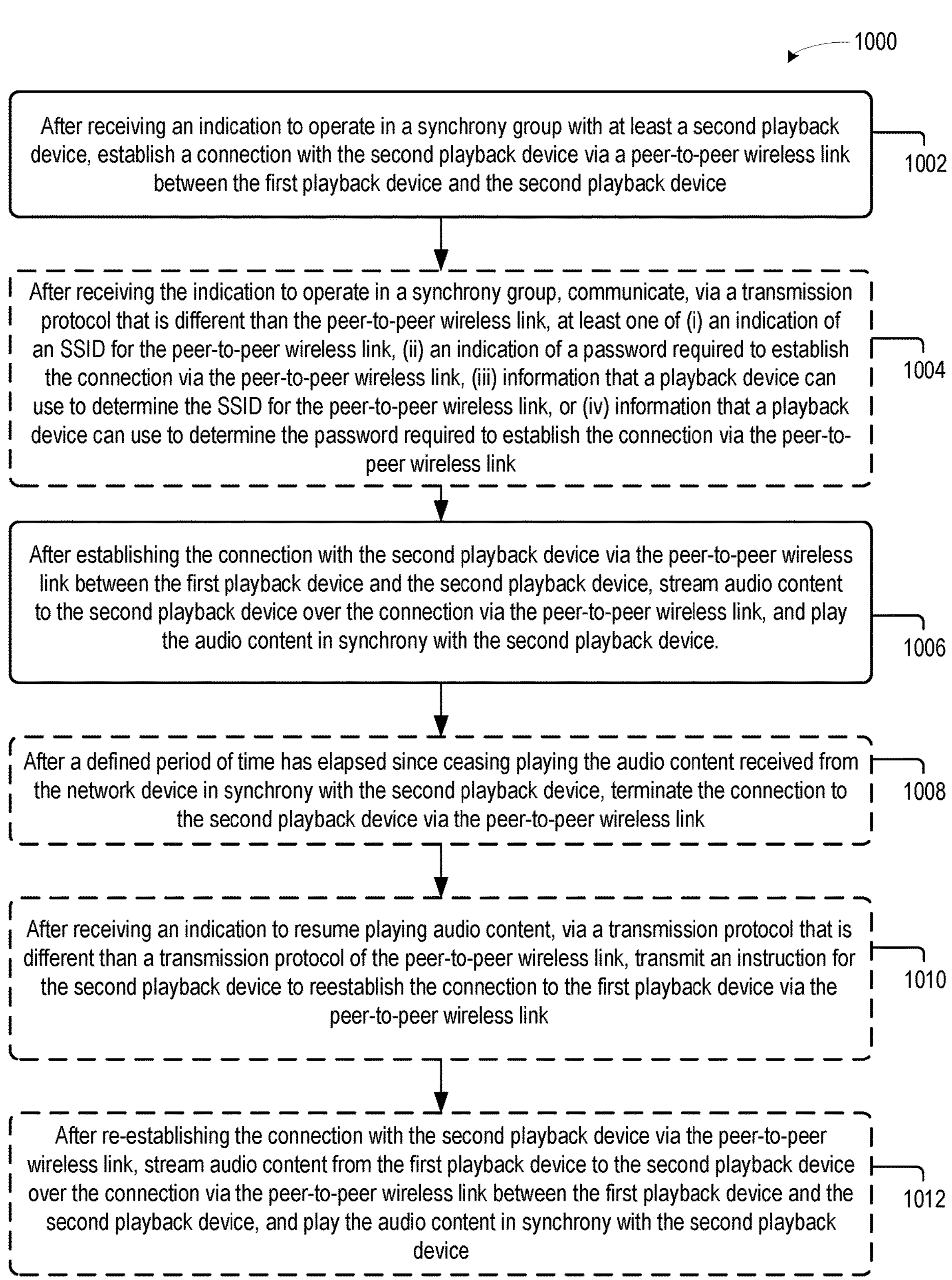
FIG. 10 shows an example method according to some embodiments.
Figure 11:
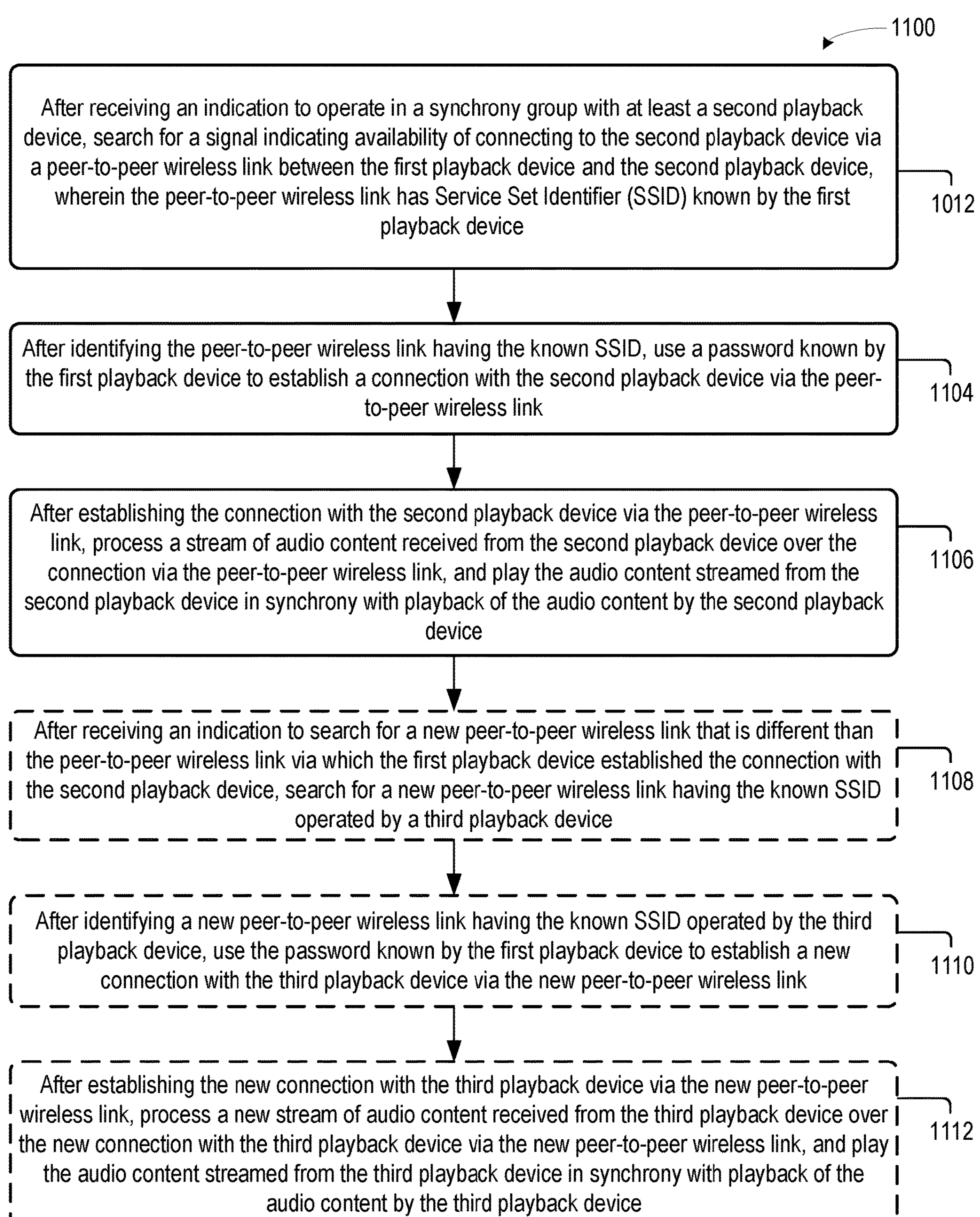
FIG. 11 shows an example method according to some embodiments.

FIG. 10 shows an example method 1000 performed by a playback device according to some embodiments. In operation, method 1000 comprises steps performed by a playback device configured to operate as a group coordinator for a playback group. Any playback device can function as a group coordinator or a group member in a playback group. Accordingly, the method 1000 can be performed by any of the playback devices shown and described herein, including but not limited to portable playback devices 702, 704, and/or 710. The method 1000 may be performed by a playback device in an Off-net scenario where the playback device is not connected to a WLAN to facilitate synchronous playback in various environments (e.g., at the beach, park, etc.) and/or by a playback device in an On-net scenario where the playback is connected to a WLAN to advantageously reduce network traffic that passes over the WLAN during synchronous playback.

Method 1000 begins at block 1002, which includes a first playback device, after receiving an indication to operate in a synchrony group with at least a second playback device, establishing a connection with the second playback device via a peer-to-peer wireless link between the first playback device and the second playback device.

In some embodiments, the playback group comprises any of a synchrony group, a stereo pair, a bonded group, or any other grouping of playback devices for groupwise playback of audio content, including but not limited synchronous playback of audio content.

In some embodiments where the first playback device and second playback device have been previously grouped in a playback group, the first playback device can be configured (and sometimes is configured) to establish a connection with the second playback device via a peer-to-peer wireless link between the first and second playback devices without the first playback device having received an indication to operation in a synchrony group with the second playback device. For example, rather than receiving an indication (e.g., a command, a manual button press or actuation, or other indication) to operate in a synchrony group, the first playback device may seek to establish a connection to the second playback device (and/or vice versa) by virtue of the first playback device and second playback device having been previously configured to operate in a synchrony group (e.g., a stereo pair, bonded group, or any other grouping). Thus, in such embodiments, method block 1002 may alternatively include establishing a connection with the second playback device via a peer-to-peer wireless link between the first playback device and the second playback device, but not include receiving any indication to operate in a synchrony group with at least a second playback device.

In some embodiments, the first playback device may establish the connection with the second playback device while the first playback device is connected to a network device (e.g., a user device such as a smartphone, tablet, laptop, etc.) via a PAN and not connected to a WLAN (e.g., the first playback device is away from home, such as at a beach or park). The PAN may operate according to a Bluetooth protocol, and at least one of the WLAN or the peer-to-peer wireless link operates according to an 802.11 protocol. In other embodiments, the first playback device may establish a connection with the second device while each of the first and second playback devices are connected to a WLAN (e.g., a common WLAN) (e.g., the first and second playback devices are stationary playback devices in a user's home).

In some embodiments, the first playback device comprises at least one physical input (e.g., a physical button or switch), and the indication to operate in the synchrony group comprises a manual actuation or activation of the physical input by a user. In some embodiments, the indication to operate in the synchrony group comprises a command received from at least one of (i) the network device, (ii) another playback device, or (iii) a controller configured to control the first playback device. In some embodiments, the network device is configured to function as a controller to control the first playback device.

In some embodiments, the peer-to-peer wireless link has a Service Set Identifier (SSID) known by the second playback device, and establishing the connection with the second playback device via the peer-to-peer wireless link between the first playback device and the second playback device comprises the first playback device receiving a password known by the second playback device.

For example, in some embodiments, the first playback device and the second playback device are associated with a common identifier, and at least one of (i) an SSID for the peer-to-peer wireless link is based at least in part on the common identifier or (ii) a password required for the connection via the peer-to-peer wireless link is based at least in part on the common identifier. In some embodiments, the common identifier comprises or includes a Household Identifier (HHID) or other identifier known by both the first and second playback devices.

In some embodiments where the first playback device and the second playback device may not be members of the same media playback system (or otherwise not know a common identifier), method 1000 advances to optional block 1004, which includes after receiving the indication to operate in the playback group, the first playback device transmitting, broadcasting, or otherwise communicating, via a transmission protocol that is different than the peer-to-peer wireless link, at least one of (i) an indication of an SSID for the peer-to-peer wireless link, (ii) an indication of a password required to establish the connection via the peer-to-peer wireless link, (iii) information that a playback device can use to determine the SSID for the peer-to-peer wireless link, or (iv) information that a playback device can use to determine the password required to establish the connection via the peer-to-peer wireless link.

After block 1002 (or after block 1004 in some embodiments), method 1000 advances to block 1006, which includes after establishing the connection with the second playback device via the peer-to-peer wireless link between the first playback device and the second playback device, streaming audio content from the first playback device to the second playback device over the connection via the peer-to-peer wireless link, and playing the audio content in synchrony with the second playback device.

In some embodiments, the first playback device receives the streaming audio content from the network device over a PAN. In these embodiments, streaming audio content received via the PAN connection from the first playback device to the second playback device over the connection via the peer-to-peer wireless link at block 1006 may include: (A) extracting encoded audio data corresponding to the audio content from a first stream of frames received via the PAN connection from the network device, where an individual packet in the first stream of frames has a first format; (B) generating a second stream of frames, where an individual frame in the second stream of frames has a second format, and where the second stream of frames comprises (i) portions of the audio data extracted from the first stream of frames, and (ii) playback timing information for the audio data extracted from the first stream of frames; and (C) transmitting the second stream of frames comprising the audio data and the playback timing information for the audio data to the second playback device over the connection via the peer-to-peer wireless link. In some embodiments, the first playback device receives the streaming audio content via a WLAN from another device (e.g., one or more cloud servers, one or more network-attached-storage (NAS) devices, etc.).

And in some embodiments, playing the audio content in synchrony with the second playback device at block 1006 includes the first playback device using the playback timing information to play the portions of the encoded audio data extracted from the first stream of frames in synchrony with playback of the audio content by the second playback device.

In some embodiments, method 1000 next advances to optional method block 1008, which includes after a defined period of time has elapsed since ceasing playing the audio content received from the network device in synchrony with the second playback device, the first playback device terminating the connection to the second playback device via the peer-to-peer wireless link (or simply terminating the peer-to-peer wireless link).

Next, method 1000 in some embodiments advances to optional block 1010, which includes after receiving an indication to resume playing audio content received from the network device in the synchrony group with the second playback device, via a transmission protocol that is different than a transmission protocol of the peer-to-peer wireless link, transmitting an instruction for the second playback device to reestablish the connection to the first playback device via the peer-to-peer wireless link.

Next method 1000 in some embodiments advances to block 1012, which includes after re-establishing the connection with the second playback device via the peer-to-peer wireless link, the first playback device (i) streaming audio content (e.g., received via the PAN connection from the network device and/or received via a WLAN) from the first playback device to the second playback device over the connection via the peer-to-peer wireless link between the first playback device and the second playback device, and (ii) playing the audio content in synchrony with the second playback device.

FIG. 1100 shows an example method 1100 performed by a playback device according to some embodiments. In contrast to method 1000, which comprises steps performed by a playback device configured to operate as a group coordinator for a playback group, method 1100 comprises steps performed by a playback device configured to operate as a group member of a playback group. Any playback device can function as a group coordinator or a group member in a playback group. Accordingly, the method 1100 can be performed by any of the playback devices shown and described herein, including but not limited to portable playback devices 702, 704, and/or 710. As described above with respect to method 1000, the method 1100 may be performed by a playback device in an Off-net scenario where the playback device is not connected to a WLAN to facilitate synchronous playback in various environments (e.g., at the beach, park, etc.) and/or by a playback device in an On-net scenario where the playback is connected to a WLAN to advantageously reduce network traffic that passes over the WLAN during synchronous playback.

Method 1100 begins at block 1102, which includes a first playback device, after receiving an indication to operate in a synchrony group with at least a second playback device, searching for a signal indicating availability of connecting to the second playback device via a peer-to-peer wireless link between the first playback device and the second playback device, where the peer-to-peer wireless link has a Service Set Identifier (SSID) known by the first playback device.

In some embodiments, the first playback device may search for the signal indicating availability of a connection while the first playback device is connected to a WLAN (e.g., the first and second playback devices are stationary playback devices in a user's home). In other embodiments, the first playback device may search for the signal indicating availability of a connection while the first playback device is not connected to a WLAN and also not connected to a PAN (e.g., the first playback device is operating away from a user's home in a park).

In some embodiments, searching for a signal indicating availability of connecting to the second playback device via a peer-to-peer wireless link between the first playback device and the second playback device at block 1102 includes, when the first playback device has detected two or more peer-to-peer wireless links having the same known SSID, either (i) randomly selecting one of the two or more peer-to-peer wireless links over which to establish a connection, or (ii) selecting one of the two or more peer-to-peer wireless links having the best wireless signal as the peer-to-peer wireless links via which to establish a connection.

In some embodiments, the playback group comprises any of a synchrony group, a stereo pair, a bonded group, or any other grouping of playback devices for groupwise playback of audio content, including but not limited synchronous playback of audio content. In some embodiments, the PAN connection operates according to a Bluetooth protocol, and at least one of the WLAN or the peer-to-peer wireless link operates according to an 802.11 protocol.

In some embodiments, the first playback device comprises at least one physical input (e.g., a physical button or switch), and the indication to operate in the synchrony group comprises a manual actuation or activation of the physical input by a user. In some embodiments, the indication to operate in the synchrony group comprises a command received from at least one of (i) the network device, (ii) another playback device, or (iii) a controller configured to control the first playback device. In some embodiments, the network device is configured to function as a controller to control the first playback device.

In some embodiments where the first playback device and second playback device have been previously grouped in a playback group, the first playback device can be configured (and sometimes is configured) to establish a connection with the second playback device via a peer-to-peer wireless link between the first and second playback devices without the first playback device having received an indication to operation in a synchrony group with the second playback device. For example, rather than receiving an indication (e.g., a command, a manual button press or actuation, or other indication) to operate in a synchrony group, the first playback device may seek to establish a connection to the second playback device (and/or vice versa) by virtue of the first playback device and second playback device having been previously configured to operate in a synchrony group (e.g., a stereo pair, bonded group, or any other grouping). In such embodiments, method block 1102 may alternatively include searching for a signal indicating availability of connecting to the second playback device via a peer-to-peer wireless link between the first playback device and the second playback device, wherein the peer-to-peer wireless link has a Service Set Identifier (SSID) known by the first playback device, but not include receiving any particular indication to operate in a synchrony group with at least a second playback device.

In some embodiments, the peer-to-peer wireless link has a Service Set Identifier (SSID) known by the first playback device, where establishing the connection with the second playback device via the peer-to-peer wireless link between the first playback device and the second playback device comprises the first playback device providing (to the second playback device) a password known by the first playback device. For example, in some embodiments, the first playback device and the second playback device are associated with a common identifier, and at least one of (i) the SSID for the peer-to-peer wireless link is based at least in part on the common identifier or (ii) the password for the connection via the peer-to-peer wireless link is based at least in part on the common identifier.

But in some embodiments where the first playback device and the second playback device may not be members of the same media playback system (or otherwise not know a common identifier), method 1100 may additionally include the first playback device: (A) before searching for a signal indicating availability of connecting to the second playback device via the peer-to-peer wireless link between the first playback device and the second playback device, where the peer-to-peer wireless link has a Service Set Identifier (SSID) known by the first playback device, determining, based on data received via a transmission protocol that is different than a transmission protocol of the peer-to-peer wireless link, the SSID of the peer-to-peer wireless link based on at least one of (i) an indication of the SSID for the peer-to-peer wireless link, or (ii) information that the first playback device can use to determine the SSID for the peer-to-peer wireless link; and (B) before using the password known by the first playback device to establish the connection with the second playback device via the peer-to-peer wireless link, determining, based on data received via a transmission protocol that is different than a transmission protocol of the peer-to-peer wireless link, the password for the connection via the peer-to-peer wireless link based on at least one of (i) an indication of the password for the connection via the peer-to-peer wireless link, and (ii) information that the first playback device can use to determine the password for the connection via the peer-to-peer wireless link.

Next, method 1100 advances to block 1104, which includes the first playback device, after identifying the peer-to-peer wireless link having the known SSID, using a password known by the first playback device to establish a connection with the second playback device via the peer-to-peer wireless link.

Next, method 1100 advances to block 1106, which includes the first playback device, after establishing the connection with the second playback device via the peer-to-peer wireless link, (i) processing a stream of audio content received from the second playback device over the connection via the peer-to-peer wireless link, and (ii) playing the audio content streamed from the second playback device in synchrony with playback of the audio content by the second playback device.

In some embodiments, block 1106 includes the first playback device: (A) receiving a stream of frames from the second playback device over the connection via the peer-to-peer wireless link, where the stream of frames comprises (i) portions of audio data that the second playback device extracted from a content stream received from the network device, and (ii) playback timing information generated by the second playback device for the portions of audio data that the second playback device extracted from the content stream received from the network device; and (B) playing individual portions of audio data in synchrony with playback of the individual portions of audio data by the second playback device based on the playback timing information for the individual portions of audio data received from the second playback device.

After block 1106, in some embodiments, method 1100 advances to optional block 1108, which includes the first playback device, after receiving an indication to search for a new peer-to-peer wireless link that is different than the peer-to-peer wireless link via which the first playback device established the connection with the second playback device, searching for a new peer-to-peer wireless link having the known SSID operated by a third playback device.

After block 1108, method 1100 in some embodiments advances to optional block 1110, which includes, after identifying a new peer-to-peer wireless link having the known SSID operated by the third playback device, the first playback device using the known password to establish a new connection with the third playback device via the new peer-to-peer wireless link.

Next, after block 1110, method 1100 in some embodiments advances to optional block 1112, which includes after establishing the new connection with the third playback device via the new peer-to-peer wireless link, the first playback device (i) processing a new stream of audio content received from the third playback device over the new connection with the third playback device via the new peer-to-peer wireless link, and (ii) playing the audio content streamed from the third playback device in synchrony with playback of the audio content by the third playback device.

In some embodiments, method 1100 additionally includes the first playback device: (A) after a defined period of time has elapsed since ceasing playing the audio content in synchrony with the second playback device, terminating the connection to the second playback device via the peer-to-peer wireless link; and (B) after receiving, via a transmission protocol that is different than a transmission protocol of the peer-to-peer wireless link, an instruction for the first playback device to reestablish the connection to the second playback device via the peer-to-peer wireless link, the first playback device (i) searching for a signal indicating availability of connecting to the second playback device via a peer-to-peer wireless link between the first playback device and the second playback device having the known SSID, (ii) after identifying the peer-to-peer wireless link having the known SSID, using the password known by the first playback device to reestablish the connection with the second playback device via the peer-to-peer wireless link, and (iii) after reestablishing the connection with the second playback device via the peer-to-peer wireless link, processing a new stream of audio content received from the second playback device, and playing the new audio content streamed from the second playback device over the reestablished connection via the peer-to-peer wireless link in synchrony with playback of the new audio content by the second playback device.

VIII. Example Configurations

Additional examples of playback devices that facilitate extending audio synchronization technologies to portable playback devices operating in any of a variety of operating conditions are described below by way of groups of example configurations. The examples embodiments in these groups include playback devices that execute software that cause the playback devices to perform various operations. Accordingly, some embodiments include tangible, non-transitory computer readable media that includes program code executable by the playback devices to perform any combination of the playback device operations disclosed and described herein.

a. First Group of Example Configurations

A first example of a first playback device comprises (i) one or more processors; (ii) one or more network interfaces configured to facilitate communication over at least one Personal Area Network (PAN) and at least one Wireless Local Area Network (WLAN); (iii) a tangible, non-transitory computer-readable memory; and (iv) program instructions stored on the tangible, non-transitory computer-readable memory. The program instructions are executable by the one or more processors such that the first playback device is configured to (i) after receiving an indication to operate in a synchrony group while the first playback device is connected to a network device via a PAN and not connected to a first WLAN, establish a second WLAN for the synchrony group; and (ii) after a second playback device has joined the second WLAN operated by the first playback device, stream audio content received via the PAN connection from the first network device to the second playback device via the second WLAN operated by the first playback device, and play the audio content in synchrony with the second playback device.

In a second example of a first playback device that includes all of the features of the first example, the second WLAN operated by the first playback device has a Service Set Identifier (SSID) known by the second playback device and a password known by the second playback device.

In a third example of a first playback device that includes any combination of the features of the preceding examples, the program instructions further comprise program instructions that are executable by the one or more processors such that the first playback device is configured to, after receiving the indication to operate in a synchrony group, broadcast, via a transmission protocol that is different than a transmission protocol of the second WLAN, at least one of (i) an indication of an SSID for the second WLAN operated by the first playback device, (ii) an indication of a password for the second WLAN operated by the first playback device, (iii) information that a playback device can use to determine the SSID for the second WLAN operated by the first playback device, or (iv) information that a playback device can use to determine the password for the second WLAN operated by the first playback device.

In a fourth example of a first playback device that includes any combination of the features of the preceding examples, the first playback device and the second playback device are associated with a common identifier, and at least one of (i) an SSID for the second WLAN operated by the first playback device is based at least in part on the common identifier or (ii) a password for the second WLAN operated by the first playback device is based at least in part on the common identifier.

A fifth example of a first playback device that includes any combination of the features of the preceding examples comprises at least one physical input, where the indication to operate in the synchrony group comprises a manual actuation of the physical input by a user.

In a sixth example of a first playback device that includes any combination of the features of the preceding examples, the indication to operate in the synchrony group comprises a command received from the network device.

In a seventh example of a first playback device that includes any combination of the features of the preceding examples, the PAN connection comprises a Bluetooth connection, and at least one of the first WLAN or the second WLAN comprises an 802.11 WLAN.

In an eighth example of a first playback device that includes any combination of the features of the preceding examples, the program instructions that are executable by the one or more processors such that the first playback device is configured to stream the audio content received via the PAN connection from the network device to the second playback device via the second WLAN operated by the first playback device comprise program instructions executable by the one or more processors such that the first playback device is configured to (i) extract encoded audio data corresponding to the audio content from a first stream of frames received via the PAN connection from the network device, where an individual packet in the first stream of frames has a first format; (ii) generate a second stream of frames, where an individual frame in the second stream of frames has a second format, and where the second stream of frames comprises (i) portions of the audio data extracted from the first stream of frames and (ii) playback timing information for the audio data extracted from the first stream of frames; and (iii) transmit the second stream of frames comprising the audio data and the playback timing information for the audio data to the second playback device.

In a ninth example of a first playback device that includes all of features of the eighth example, the program instructions executable by the one or more processors such that the first playback device is configured to play the audio content in synchrony with the second playback device comprises program instructions executable by the one or more processors such that the first playback device is configured to use the playback timing information to play the portions of the encoded audio data extracted from the first stream of frames in synchrony with playback of the audio content by the second playback device.

In a tenth example of a first playback device that includes any combination of features of the preceding examples, the program instructions further comprise program instructions that are executable by the one or more processors such that the first playback device is configured to (i) after a defined period of time has elapsed since ceasing playing the audio content received from the network device in synchrony with the second playback device, discontinue operating the second WLAN for the synchrony group; (ii) after receiving an indication to resume playing audio content received from the network device in the synchrony group with the second playback device, (i) resume operating the second WLAN for the synchrony group, and (ii) via a transmission protocol that is different than a transmission protocol of the second WLAN, transmit an instruction for the second playback device to rejoin the second WLAN operated by the first playback device; and (iii) after the second playback device has rejoined the second WLAN operated by the first playback device, stream audio content received via the PAN connection from the network device to the second playback device via the second WLAN operated by the first playback device, and play the audio content in synchrony with the second playback device.

b. Second Group of Example Configurations

A first example of a first playback device comprises (i) one or more processors; (ii) one or more network interfaces configured to communicate via at least one Personal Area Network (PAN) and at least one Wireless Local Area Network (WLAN); (iii) a tangible, non-transitory computer-readable memory; and (iv) program instructions stored on the tangible, non-transitory computer-readable memory. The program instructions are executable by the one or more processors such that the playback device is configured to (i) after receiving an indication to operate in a synchrony group while the first playback device is not receiving audio content via a PAN communications session with a network device and not connected to a first WLAN, search for a second WLAN having a known Service Set Identifier (SSID) operated by a second playback device to join; (ii) after identifying the second WLAN having the known SSID operated by the second playback device to join, use a password known by the first playback device to join the second WLAN operated by the second playback device; and (iii) after joining the second WLAN operated by the second playback device, process a stream of audio content received from the second playback device, and play the audio content streamed from the second playback device in synchrony with playback of the audio content by the second playback device.

In a second example of a first playback device that includes all of the features of the first example, the WLAN access point operated by the second playback device has a Service Set Identifier (SSID) known by the first playback device and a password known by the first playback device.

In a third example of a first playback device that includes all of the features of any of the preceding examples, the program instructions further comprise program instructions that are executable by the one or more processors such that the first playback device is configured to, before searching for a WLAN access point having a known SSID operated by the second playback device, determine, based on data received via a transmission protocol that is different than a transmission protocol of the WLAN access point, the SSID of the WLAN access point operated by the second playback device based on at least one of (i) an indication of the SSID for the WLAN access point operated by the second playback device, or (ii) information that the first playback device can use to determine the SSID for the WLAN access point operated by the first playback device.

In a fourth example of a first playback device that includes all of the features of any of the preceding examples, the program instructions further comprise program instructions that are executable by the one or more processors such that the first playback device is configured to, before using the password known by the first playback device to join the WLAN access point operated by the second playback device, determine, based on data received via a transmission protocol that is different than a transmission protocol of the WLAN access point, the password for the WLAN access point operated by the second playback device based on at least one of (i) an indication of the password for the WLAN access point operated by the second playback device, and (ii) information that the first playback device can use to determine the password for the WLAN access point operated by the second playback device.

In a fifth example of a first playback device that includes all of the features of any of the preceding examples, the first playback device and the second playback device are associated with a common identifier, and where at least one of (i) the SSID for the WLAN access point operated by the second playback device is based at least in part on the common identifier or (ii) the password for the WLAN access point operated by the second playback device is based at least in part on the common identifier.

A sixth example of a first playback device that includes all of the features of any of the preceding examples comprises at least one physical input, and where the indication to operate in the synchrony group comprises a manual actuation of the physical input by a user.

In a seventh example of a first playback device that includes all of the features of any of the preceding examples, the indication to operate in the synchrony group comprises a command received from the network device.

In an eighth example of a first playback device that includes all of the features of any of the preceding examples, the one or more network interfaces configured to communicate via a Personal Area Network (PAN) and a Wireless Local Area Network (WLAN) comprises a Bluetooth network interface and an 802.11 network interface.

In a ninth example of a first playback device that includes all of the features of any of the preceding examples, the program instructions that are executable by the one or more processors such that the first playback device is configured to process a stream of audio content received from the second playback device, and play the audio content streamed from the second playback device in synchrony with playback of the audio content by the second playback device comprise program instructions that are executable by the one or more processors such that the first playback device is configured to (i) receive a stream of frames from the second playback device, where the stream of frames comprises (i) portions of audio data that the second playback device extracted from a content stream received from the network device, and (ii) playback timing information generated by the second playback device for the portions of audio data that the second playback device extracted from the content stream received from the network device; and (ii) play individual portions of audio data in synchrony with playback of the individual portions of audio data by the second playback device based on the playback timing information for the individual portions of audio data received from the second playback device.

In a tenth example of a first playback device that includes all of the features of any of the preceding examples, the program instructions that are executable by the one or more processors such that the first playback device is configured to search for a WLAN access point having a known Service Set Identifier (SSID) operated by a second playback device to join comprise program instructions that are executable by the one or more processors such that the first playback device is configured to, when the first playback device has detected two or more WLAN access points having the same known SSID, either (i) randomly select one of the two or more WLAN access points as the WLAN access point to join, or (ii) select one of the two or more WLAN access points having the best WLAN signal conditions as the WLAN access point to join.

In an eleventh example of a first playback device that includes all of the features of the tenth example, the program instructions further comprise program instructions that are executable by the one or more processors such that the first playback device is configured to (i) after receiving an indication to search for a new WLAN access point that is different than the WLAN access point operated by the second playback device, search for a new WLAN access point having the known SSID operated by a third playback device to join; (ii) after identifying a new WLAN access point having the known SSID operated by the third playback device to join, use a password known by the first playback device to join the new WLAN access point operated by the third playback device; and (iii) after joining the new WLAN access point operated by the third playback device, process a new stream of audio content received from the third playback device, and play the audio content streamed from the third playback device in synchrony with playback of the audio content by the third playback device.

In a twelfth example of a first playback device that includes all of the features of any of the preceding examples, the program instructions further comprise program instructions that are executable by the one or more processors such that the first playback device is configured to (i) after a defined period of time has elapsed since ceasing playing the audio content in synchrony with the second playback device, disconnect from the WLAN access point operated by the second playback device; and (ii) after receiving, via a transmission protocol that is different than a transmission protocol of the WLAN access point, an instruction for the first playback device to rejoin the WLAN access point operated by the second playback device, (i) search for a WLAN access point having the known SSID operated by the second playback device, (ii) after identifying a WLAN access point having the known SSID operated by the second playback device, use the password known by the first playback device to join the WLAN access point operated by the second playback device, and (iii) after joining the WLAN access point operated by the second playback device, process a new stream of audio content received from the second playback device, and play the new audio content streamed from the second playback device in synchrony with playback of the new audio content by the second playback device.

c. Third Group of Example Configurations

A first example of a first playback device comprises (i) one or more processors; (ii) one or more network interfaces configured to facilitate communication over at least one Personal Area Network (PAN) and at least one Wireless Local Area Network (WLAN); (iii) a tangible, non-transitory computer-readable memory; and (iv) program instructions stored on the tangible, non-transitory computer-readable memory, where the program instructions are executable by the one or more processors such that the first playback device is configured to, (i) after receiving an indication to operate in a synchrony group with at least a second playback device while the first playback device is connected to a network device via a PAN and not connected to a WLAN, establish a connection with the second playback device via a peer-to-peer wireless link between the first playback device and the second playback device; and (ii) after establishing the connection with the second playback device via the peer-to-peer wireless link between the first playback device and the second playback device, stream audio content received via the PAN connection from the first playback device to the second playback device over the connection via the peer-to-peer wireless link, and play the audio content in synchrony with the second playback device.

In a second example of a first playback device that includes all of the features of the first example, the peer-to-peer wireless link has a Service Set Identifier (SSID) known by the second playback device, and where establishing the connection with the second playback device via the peer-to-peer wireless link between the first playback device and the second playback device comprises the first playback device receiving a password known by the second playback device.

In a third example of a first playback device that includes all of the features of any of the preceding examples, the program instructions further comprise program instructions that are executable by the one or more processors such that the first playback device is configured to, after receiving the indication to operate in a synchrony group, broadcast, via a transmission protocol that is different than the peer-to-peer wireless link, at least one of (i) an indication of an SSID for the peer-to-peer wireless link, (ii) an indication of a password required to establish the connection via the peer-to-peer wireless link, (iii) information that a playback device can use to determine the SSID for the peer-to-peer wireless link, or (iv) information that a playback device can use to determine the password required to establish the connection via the peer-to-peer wireless link.

In a fourth example of a first playback device that includes all of the features of any of the preceding examples, the first playback device and the second playback device are associated with a common identifier, and where at least one of (i)

an SSID for the peer-to-peer wireless link is based at least in part on the common identifier or (ii) a password required for the connection via the peer-to-peer wireless link is based at least in part on the common identifier.

A fifth example of a first playback device that includes all of the features of any of the preceding examples comprises at least one physical input, and where the indication to operate in the synchrony group comprises a manual actuation of the physical input by a user.

In a sixth example of a first playback device that includes all of the features of any of the preceding examples, the indication to operate in the synchrony group comprises a command received from the network device.

In a seventh example of a first playback device that includes all of the features of any of the preceding examples, the PAN connection operates according to a Bluetooth protocol, and where at least one of the WLAN or the peer-to-peer wireless link operates according to an 802.11 protocol.

In an eighth example of a first playback device that includes all of the features of any of the preceding examples, the program instructions that are executable by the one or more processors such that the first playback device is configured to stream audio content received via the PAN connection from the first playback device to the second playback device over the connection via the peer-to-peer wireless link comprises program instructions executable by the one or more processors such that the first playback device is configured to (i) extract encoded audio data corresponding to the audio content from a first stream of frames received via the PAN connection from the network device, where an individual packet in the first stream of frames has a first format; (ii) generate a second stream of frames, where an individual frame in the second stream of frames has a second format, and where the second stream of frames comprises (i) portions of the audio data extracted from the first stream of frames and (ii) playback timing information for the audio data extracted from the first stream of frames; and (iii) transmit the second stream of frames comprising the audio data and the playback timing information for the audio data to the second playback device over the connection via the peer-to-peer wireless link.

In a ninth example of a first playback device that includes all of the features of the eighth example, the program instructions executable by the one or more processors such that the first playback device is configured to play the audio content in synchrony with the second playback device comprises program instructions executable by the one or more processors such that the first playback device is configured to use the playback timing information to play the portions of the encoded audio data extracted from the first stream of frames in synchrony with playback of the audio content by the second playback device.

In a tenth example of a first playback device that includes all of the features of any of the preceding examples, the program instructions further comprise program instructions that are executable by the one or more processors such that the first playback device is configured to (i) after a defined period of time has elapsed since ceasing playing the audio content received from the network device in synchrony with the second playback device, terminate the connection to the second playback device via the peer-to-peer wireless link; (ii) after receiving an indication to resume playing audio content received from the network device in the synchrony group with the second playback device, via a transmission protocol that is different than a transmission protocol of the peer-to-peer wireless link, transmit an instruction for the second playback device to reestablish the connection to the first playback device via the peer-to-peer wireless link; and (iii) after re-establishing the connection with the second playback device via the peer-to-peer wireless link, stream audio content received via the PAN connection from the first playback device to the second playback device over the connection via the peer-to-peer wireless link between the first playback device and the second playback device, and play the audio content in synchrony with the second playback device.

d. Fourth Group of Example Configurations

A first example of a first playback device comprises (i) one or more processors; (ii) one or more network interfaces configured to communicate via at least one Personal Area Network (PAN) and at least one peer-to-peer wireless link; (iii) a tangible, non-transitory computer-readable memory; and (iv) program instructions stored on the tangible, non-transitory computer-readable memory, where the program instructions are executable by the one or more processors such that the playback device is configured to, (i) after receiving an indication to operate in a synchrony group with at least a second playback device while the first playback device is not receiving audio content via a PAN communications session with a network device and not connected to a Wireless Local Area Network (WLAN), search for a signal indicating availability of connecting to the second playback device via a peer-to-peer wireless link between the first playback device and the second playback device, where the peer-to-peer wireless link has a Service Set Identifier (SSID) known by the first playback device; (ii) after identifying the peer-to-peer wireless link having the known SSID, use a password known by the first playback device to establish a connection with the second playback device via the peer-to-peer wireless link; and (iii) after establishing the connection with the second playback device via the peer-to-peer wireless link, process a stream of audio content received from the second playback device over the connection via the peer-to-peer wireless link, and play the audio content streamed from the second playback device in synchrony with playback of the audio content by the second playback device.

In a second example of a first playback device that includes all of the features of the first example, the peer-to-peer wireless link has a Service Set Identifier (SSID) known by the first playback device, and where establishing the connection with the second playback device via the peer-to-peer wireless link between the first playback device and the second playback device comprises the first playback device providing a password known by the first playback device to the second playback device.

In a third example of a first playback device that includes all of the features of any of the preceding examples, the program instructions further comprise program instructions that are executable by the one or more processors such that the first playback device is configured to, before searching for a signal indicating availability of connecting to the second playback device via the peer-to-peer wireless link between the first playback device and the second playback device, where the peer-to-peer wireless link has a Service Set Identifier (SSID) known by the first playback device, determine, based on data received via a transmission protocol that is different than a transmission protocol of the peer-to-peer wireless link, the SSID of the peer-to-peer wireless link based on at least one of (i) an indication of the SSID for the peer-to-peer wireless link, or (ii) information that the first playback device can use to determine the SSID for the peer-to-peer wireless link.

In a fourth example of a first playback device that includes all of the features of any of the preceding examples, the program instructions further comprise program instructions that are executable by the one or more processors such that the first playback device is configured to, before using the password known by the first playback device to establish the connection with the second playback device via the peer-to-peer wireless link, determine, based on data received via a transmission protocol that is different than a transmission protocol of the peer-to-peer wireless link, the password for the connection via the peer-to-peer wireless link based on at least one of (i) an indication of the password for the connection via the peer-to-peer wireless link, and (ii) information that the first playback device can use to determine the password for the connection via the peer-to-peer wireless link.

In a fifth example of a first playback device that includes all of the features of any of the preceding examples, the first playback device and the second playback device are associated with a common identifier, and where at least one of (i) the SSID for the peer-to-peer wireless link is based at least in part on the common identifier or (ii) the password for the connection via the peer-to-peer wireless link is based at least in part on the common identifier.

In a sixth example of a first playback device that includes all of the features of any of the preceding examples comprises at least one physical input, and where the indication to operate in the synchrony group comprises a manual actuation of the physical input by a user.

In a seventh example of a first playback device that includes all of the features of any of the preceding examples, the indication to operate in the synchrony group comprises a command received from the network device.

In an eighth example of a first playback device that includes all of the features of any of the preceding examples, one or more network interfaces configured to communicate via at least one Personal Area Network (PAN) and at least one peer-to-peer wireless link comprises a Bluetooth network interface and an 802.11 network interface.

In a ninth example of a first playback device that includes all of the features of any of the preceding examples, the program instructions that are executable by the one or more processors such that the first playback device is configured to process the stream of audio content received from the second playback device over the connection via the peer-to-peer wireless link, and play the audio content streamed from the second playback device in synchrony with playback of the audio content by the second playback device comprise program instructions that are executable by the one or more processors such that the first playback device is configured to (i) receive a stream of frames from the second playback device over the connection via the peer-to-peer wireless link, where the stream of frames comprises (i) portions of audio data that the second playback device extracted from a content stream received from the network device, and (ii) playback timing information generated by the second playback device for the portions of audio data that the second playback device extracted from the content stream received from the network device; and (ii) play individual portions of audio data in synchrony with playback of the individual portions of audio data by the second playback device based on the playback timing information for the individual portions of audio data received from the second playback device.

In an tenth example of a first playback device that includes all of the features of any of the preceding examples, the program instructions that are executable by the one or more processors such that the first playback device is configured to search for the signal indicating availability of connecting to the second playback device via the peer-to-peer wireless link between the first playback device and the second playback device, where the peer-to-peer wireless link has a Service Set Identifier (SSID) known by the first playback device, comprise program instructions that are executable by the one or more processors such that the first playback device is configured to, when the first playback device has detected two or more peer-to-peer wireless links having the same known SSID, either (i) randomly select one of the two or more peer-to-peer wireless links over which to establish a connection, or (ii) select one of the two or more peer-to-peer wireless links having the best wireless signal as the peer-to-peer wireless links via which to establish a connection.

In an eleventh example of a first playback device that includes all of the features of the tenth example, the program instructions further comprise program instructions that are executable by the one or more processors such that the first playback device is configured to (i) after receiving an indication to search for a new peer-to-peer wireless link that is different than the peer-to-peer wireless link via which the first playback device established the connection with the second playback device, search for a new peer-to-peer wireless link having the known SSID operated by a third playback device; (ii) after identifying a new peer-to-peer wireless link having the known SSID operated by the third playback device, use the password known by the first playback device to establish a new connection with the third playback device via the new peer-to-peer wireless link; and (iii) after establishing the new connection with the third playback device via the new peer-to-peer wireless link, process a new stream of audio content received from the third playback device over the new connection with the third playback device via the new peer-to-peer wireless link, and play the audio content streamed from the third playback device in synchrony with playback of the audio content by the third playback device.

In a twelfth example of a first playback device that includes all of the features of any of the preceding examples, the program instructions further comprise program instructions that are executable by the one or more processors such that the first playback device is configured to (i) after a defined period of time has elapsed since ceasing playing the audio content in synchrony with the second playback device, terminate the connection to the second playback device via the peer-to-peer wireless link; and (ii) after receiving, via a transmission protocol that is different than a transmission protocol of the peer-to-peer wireless link, an instruction for the first playback device to reestablish the connection to the second playback device via the peer-to-peer wireless link, (i) search for a signal indicating availability of connecting to the second playback device via a peer-to-peer wireless link between the first playback device and the second playback device having the known SSID, (ii) after identifying the peer-to-peer wireless link having the known SSID, use the password known by the first playback device to reestablish the connection with the second playback device via the peer-to-peer wireless link, and (iii) after reestablishing the connection with the second playback device via the peer-to-peer wireless link, process a new stream of audio content received from the second playback device, and play the new audio content streamed from the second playback device over the reestablished connection via the peer-to-peer wireless link in synchrony with playback of the new audio content by the second playback device.

IX. Conclusions

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A first playback device, wherein the first playback device comprises:
- one or more processors;
- one or more network interfaces configured to facilitate communication over at least one Personal Area Network (PAN) and at least one Wireless Local Area Network (WLAN);
- a tangible, non-transitory computer-readable memory; and
- program instructions stored on the tangible, non-transitory computer-readable memory, wherein the program instructions are executable by the one or more processors such that the first playback device is configured to:
- after receiving an indication to operate in a synchrony group while the first playback device is connected to a network device via a PAN and not connected to a first WLAN, establish a second WLAN for the synchrony group, wherein the second WLAN has a Service Set Identifier (SSID) known by a second playback device; and
- after the second playback device has joined the second WLAN operated by the first playback device, stream audio content received via the PAN from the network device to the second playback device via the second WLAN operated by the first playback device, and play the audio content in synchrony with the second playback device.

2. The first playback device of claim 1, wherein the SSID for the second WLAN is based on a string known by the second playback device and wherein the second WLAN operated by the first playback device has a password based on the string known by the second playback device.

3. The first playback device of claim 1, wherein the program instructions further comprise program instructions that are executable by the one or more processors such that the first playback device is configured to:
- after receiving the indication to operate in the synchrony group, broadcast, via a transmission protocol that is different than a transmission protocol of the second WLAN, at least one of (i) an indication of the SSID for the second WLAN operated by the first playback device, (ii) an indication of a password for the second WLAN operated by the first playback device, (iii) information that a playback device can use to determine the SSID for the second WLAN operated by the first playback device, or (iv) information that a playback device can use to determine the password for the second WLAN operated by the first playback device.

4. The first playback device of claim 1, wherein the first playback device and the second playback device are associated with a common identifier, and wherein at least one of (i) the SSID for the second WLAN operated by the first playback device is based at least in part on the common identifier or (ii) a password for the second WLAN operated by the first playback device is based at least in part on the common identifier.

5. The first playback device of claim 1, further comprising at least one physical input, and wherein the indication to operate in the synchrony group comprises detection of a manual actuation of the at least one physical input by a user.

6. The first playback device of claim 1, wherein the indication to operate in the synchrony group comprises a command received from the network device.

7. The first playback device of claim 1, wherein the PAN comprises a Bluetooth connection, and wherein at least one of the first WLAN or the second WLAN comprises an 802.11 WLAN.

8. The first playback device of claim 1, wherein the program instructions that are executable by the one or more processors such that the first playback device is configured to stream the audio content received via the PAN from the network device to the second playback device via the second WLAN operated by the first playback device comprises program instructions executable by the one or more processors such that the first playback device is configured to:

extract audio data corresponding to the audio content from a first stream of frames received via the PAN from the network device, wherein an individual packet in the first stream of frames has a first format;

generate a second stream of frames, wherein an individual frame in the second stream of frames has a second format, and wherein the second stream of frames comprises (i) portions of the audio data extracted from the first stream of frames and (ii) playback timing information for the audio data extracted from the first stream of frames; and transmit the second stream of frames comprising the audio data and the playback timing information for the audio data to the second playback device.

9. The first playback device of claim 8, wherein the program instructions executable by the one or more processors such that the first playback device is configured to play the audio content in synchrony with the second playback device comprises program instructions executable by the one or more processors such that the first playback device is configured to use the playback timing information to play the portions of the audio data extracted from the first stream of frames in synchrony with playback of the audio content by the second playback device.

10. The first playback device of claim 1, wherein the program instructions further comprise program instructions that are executable by the one or more processors such that the first playback device is configured to:

after a defined period of time has elapsed since the first playback device has ceased playing the audio content received from the network device in synchrony with the second playback device, discontinue operating the second WLAN for the synchrony group;

after receiving an indication to resume playing audio content received from the network device in the synchrony group with the second playback device, (i) resume operating the second WLAN for the synchrony group, and (ii) via a transmission protocol that is different than a transmission protocol of the second WLAN, transmit an instruction for the second playback device to rejoin the second WLAN operated by the first playback device; and after the second playback device has rejoined the second WLAN operated by the first playback device, stream audio content received via the PAN from the network device to the second playback device via the second WLAN operated by the first playback device, and play the audio content in synchrony with the second playback device.

11. A first playback device comprising:

one or more processors;

one or more network interfaces configured to communicate via at least one Personal Area Network (PAN) and at least one Wireless Local Area Network (WLAN);

a tangible, non-transitory computer-readable memory; and program instructions stored on the tangible, non-transitory computer-readable memory, wherein the program instructions are executable by the one or more processors such that the first playback device is configured to:

after receiving an indication to operate in a synchrony group while the first playback device is not receiving audio content via a PAN communications session with a network device and not connected to a first WLAN, search for a second WLAN having a Service Set Identifier (SSID) known by the first playback device and operated by a second playback device to join;

after identifying the second WLAN having the SSID known by the first playback device, join the second WLAN operated by the second playback device using a password known by the first playback device; and after joining the second WLAN operated by the second playback device, (i) process a stream of audio content received from the second playback device via the second WLAN operated by the second playback device, and (ii) play the audio content streamed from the second playback device in synchrony with playback of the audio content by the second playback device.

12. The first playback device of claim 11, wherein the SSID for the second WLAN is based on a string known by the first playback device and the password for the second WLAN is based on the string known by the first playback device.

13. The first playback device of claim 11, wherein the program instructions further comprise program instructions that are executable by the one or more processors such that the first playback device is configured to:

before searching for the second WLAN having the SSID known by the first playback device and operated by the second playback device, determine, based on data received via a transmission protocol that is different than a transmission protocol of the second WLAN, the SSID of the second WLAN operated by the second playback device based on at least one of (i) an indication of the SSID for the second WLAN operated by the second playback device, or (ii) information that the first playback device can use to determine the SSID for the second WLAN operated by the first playback device.

14. The first playback device of claim 11, wherein the program instructions further comprise program instructions that are executable by the one or more processors such that the first playback device is configured to:

before joining the second WLAN operated by the second playback device using the password known by the first playback device, determine, based on data received via a transmission protocol that is different than a transmission protocol of the second WLAN, the password for the second WLAN operated by the second playback device based on at least one of (i) an indication of the password for the second WLAN operated by the second playback device, and (ii) information that the first playback device can use to determine the password for the second WLAN operated by the second playback device.

15. The first playback device of claim 11, wherein the first playback device and the second playback device are associated with a common identifier, and wherein at least one of (i) the SSID for the second WLAN operated by the second playback device is based at least in part on the common identifier or (ii) the password for the second WLAN operated by the second playback device is based at least in part on the common identifier.

16. The first playback device of claim 11, further comprising at least one physical input, and wherein the indication to operate in the synchrony group comprises receipt of a manual actuation of the at least one physical input by a user.

17. The first playback device of claim 11, wherein the indication to operate in the synchrony group comprises a command received from the network device.

18. The first playback device of claim 11, wherein the one or more network interfaces configured to communicate via the at least on PAN and the at least one WLAN comprises a Bluetooth network interface and an 802.11 network interface.

19. The first playback device of claim 11, wherein the program instructions that are executable by the one or more processors such that the first playback device is configured to process a stream of audio content received from the second playback device, and play the audio content streamed from the second playback device in synchrony with playback of the audio content by the second playback device comprise program instructions that are executable by the one or more processors such that the first playback device is configured to:

receive a stream of frames from the second playback device, wherein the stream of frames comprises (i) portions of audio data that the second playback device extracted from a content stream received from the network device, and (ii) playback timing information generated by the second playback device for the portions of audio data that the second playback device extracted from the content stream received from the network device; and play individual portions of audio data in synchrony with playback of the individual portions of audio data by the second playback device based on the playback timing information for the individual portions of audio data received from the second playback device.

20. The first playback device of claim 11, wherein the program instructions further comprise program instructions that are executable by the one or more processors such that the first playback device is configured to:

after a defined period of time has elapsed since the first playback device has ceased playing the audio content in synchrony with the second playback device, disconnect from the second WLAN operated by the second playback device; and after receiving, via a transmission protocol that is different than a transmission protocol of the second WLAN, an instruction for the first playback device to rejoin the second WLAN operated by the second playback device, (i) search for a WLAN having the SSID known by the first playback device, (ii) after identifying the second WLAN operated by the second playback device, joining the second WLAN using the password known by the first playback device, and (iii) after joining the second WLAN operated by the second playback device, (a) process a stream of new audio content received from the second playback device via the second WLAN, and (b) play the new audio content streamed from the second playback device in synchrony with playback of the new audio content by the second playback device.

* * * * *